US012668480B2

(12) United States Patent
Watkins, Jr. et al.

(10) Patent No.: US 12,668,480 B2
(45) Date of Patent: Jun. 30, 2026

(54) POST-MIX BEVERAGE FLUIDS FLOW CONTROLLER AND ACCESSORIES THEREFOR

(71) Applicant: LANCER CORPORATION, San Antonio, TX (US)

(72) Inventors: Paul V. Watkins, Jr., Conifer, CO (US); Brandon Ojeda, Garden Ridge, TX (US); Anthony Joseph Behe, Jr., Converse, TX (US); Ricardo Abugarade Rodriguez, Schertz, TX (US)

(73) Assignee: Lancer Corporation, San Antonio, TX (US)

( * ) Notice: Subject to any disclaimer, the term of this patent is extended or adjusted under 35 U.S.C. 154(b) by 141 days.

(21) Appl. No.: 18/809,900

(22) Filed: Aug. 20, 2024

(65) Prior Publication Data

US 2024/0409387 A1 Dec. 12, 2024

Related U.S. Application Data

(63) Continuation-in-part of application No. PCT/US2023/025905, filed on Jun. 21, 2023, and a continuation-in-part of application No. 18/126,410, filed on Mar. 25, 2023, now Pat. No. 12,157,659, which is a continuation of application No. 17/737,469, filed on May 5, 2022, now Pat. No. 11,643,318, which is a continuation of application No. 17/339,917, filed on Jun. 4, 2021, now Pat. No. 11,345,584.

(60) Provisional application No. 63/354,224, filed on Jun. 21, 2022, provisional application No. 63/129,380, filed on Dec. 22, 2020, provisional application No. 63/034,762, filed on Jun. 4, 2020.

(51) Int. Cl.
*B67D 1/00* (2006.01)
*B67D 1/14* (2006.01)

(52) U.S. Cl.
CPC ......... *B67D 1/0084* (2013.01); *B67D 1/1438* (2013.01); *B67D 2001/0094* (2013.01)

(58) Field of Classification Search
CPC ................ B67D 1/0084; B67D 1/1438; B67D 2001/0094; B67D 2210/0006
See application file for complete search history.

(56) References Cited

U.S. PATENT DOCUMENTS

| | | | | |
|---|---|---|---|---|
| 3,942,685 | A | 3/1976 | Lindner | |
| 4,887,740 | A | 12/1989 | Smith | |
| 5,042,692 | A * | 8/1991 | Valiyee | B67D 1/0084 285/305 |
| 6,286,721 | B1 * | 9/2001 | Pellegrini | B67D 1/08 137/340 |

(Continued)

OTHER PUBLICATIONS

International Preliminary Report on Patentability for PCT Application No. PCT/US2023/025905, Issued Aug. 9, 2024 for PCT Application Counterpart to U.S. Appl. No. 18/809,900.

*Primary Examiner* — Donnell A Long
(74) *Attorney, Agent, or Firm* — Christopher L. Makay

(57) ABSTRACT

A flow control assembly, as particularly for use with a hand-held beverage dispenser of the bar gun class, provides ON-OFF flow control and regulated flow of beverage products and diluents to a hand-held beverage dispenser. The fluid flow controller includes a toolless (manually affixed) splash cover and an inlet connector retaining mechanism.

11 Claims, 63 Drawing Sheets

(56) References Cited

U.S. PATENT DOCUMENTS

| | | | | |
|---|---|---|---|---|
| 6,322,051 | B1 | 11/2001 | Salmela | |
| 7,028,864 | B2 | 4/2006 | McCann et al. | |
| 7,080,525 | B2 | 7/2006 | McCann et al. | |
| 7,658,006 | B2 | 2/2010 | Schroeder | |
| 7,931,382 | B2 | 4/2011 | Hecht | |
| 8,109,413 | B2 | 2/2012 | Schroeder et al. | |
| 8,123,079 | B2 | 2/2012 | Schroeder et al. | |
| 8,162,182 | B2 | 4/2012 | Martindale | |
| 8,177,100 | B2 | 5/2012 | Salmela et al. | |
| 8,251,087 | B2 | 8/2012 | Hecht | |
| 8,261,945 | B2 * | 9/2012 | Haworth .............. | A47K 5/1207 222/509 |
| 8,272,536 | B2 | 9/2012 | Valiyee | |
| 8,336,736 | B2 | 12/2012 | Schroeder et al. | |
| 8,387,829 | B2 | 3/2013 | Schroeder et al. | |
| 8,418,888 | B2 | 4/2013 | Schroeder et al. | |
| 8,448,821 | B2 | 5/2013 | Hecht | |
| 8,459,505 | B2 | 6/2013 | Martindale et al. | |
| 8,479,954 | B2 | 7/2013 | Schroeder et al. | |
| 8,573,254 | B2 | 11/2013 | Martindale et al. | |
| 8,622,490 | B2 * | 1/2014 | Wang ...................... | F16B 5/125 312/265.5 |
| 8,770,442 | B2 | 7/2014 | Santy et al. | |
| 8,814,003 | B2 | 8/2014 | Santy et al. | |
| 8,881,949 | B2 | 11/2014 | Schroeder et al. | |
| 9,010,579 | B2 | 4/2015 | Baker et al. | |
| 9,038,986 | B2 | 5/2015 | Hecht | |
| 9,085,451 | B2 | 7/2015 | Santy | |
| 9,192,191 | B2 | 11/2015 | Hecht et al. | |
| 9,284,176 | B2 | 3/2016 | Tuyls et al. | |
| 9,417,652 | B2 | 8/2016 | Hecht et al. | |
| 9,546,085 | B2 | 1/2017 | Baron et al. | |
| 9,622,615 | B2 | 4/2017 | Hecht et al. | |
| 9,655,985 | B2 | 5/2017 | Hecht et al. | |
| 9,840,406 | B2 | 12/2017 | Santy et al. | |
| 9,964,234 | B2 | 5/2018 | Hecht et al. | |
| 9,988,256 | B2 | 6/2018 | Salem | |
| 10,053,353 | B2 | 8/2018 | Tuyls et al. | |
| 10,065,847 | B2 | 9/2018 | Tuyls et al. | |
| 2007/0131711 | A1 | 6/2007 | Minard et al. | |
| 2011/0095668 | A1 * | 4/2011 | Wang ...................... | F16B 5/125 29/890.035 |
| 2013/0026187 | A1 * | 1/2013 | Kim .................... | B05B 11/1052 222/162 |
| 2015/0190827 | A1 * | 7/2015 | Ophardt .............. | B05B 11/0038 222/153.09 |
| 2021/0380389 | A1 | 12/2021 | Martin et al. | |

* cited by examiner

POST-MIX BEVERAGE FLUIDS FLOW CONTROLLER AND ACCESSORIES THEREFOR

BACKGROUND OF THE INVENTION

1. Field of the Invention

The present invention relates to post-mix drink dispensing, and, more particularly, but not by way of limitation, to flow control assemblies used in connection with hand-held beverage dispensers.

2. Description of the Related Art

Post-mix type hand-held beverage dispensers, such as are often referred to as bar guns or soda guns are well known conveniences in the food and bar service industries, enabling beverages to be prepared as they are dispensed by mixing together a beverage product, such as, for example, a syrup or like concentrate, and a diluent, such as, for example, plain water or carbonated water. Beverage product and diluent sources connect with a flow control assembly utilized to provide ON-OFF flow control and regulated flow of the beverage products and diluents to a hand-held beverage dispenser. A fluid line connector arrangement couples the flow control assembly with the hand-held beverage dispenser to deliver the beverage products and diluents from the flow control assembly to the hand-held beverage dispenser while allowing portability of the hand-held beverage dispenser.

SUMMARY OF THE INVENTION

A fluid flow controller includes a toolless (manually affixed) splash cover and an inlet connector retaining mechanism. The splash cover is configured to engage a gusset in a frictional fit for assembly of the splash cover as well as a quick release connector. The inlet connector retaining mechanism includes an independently operated multiplicity of individual connector retainers having selectively employed common restriction. Each independently operated individual connector retainer is implemented as a purpose built slide lock with a selectively employed common restriction such as a common clip stop. The purpose built slide lock includes a linear guide and an L-shaped clip, configured to translate within the constraints of a corresponding common clip stop. A retaining plate is provided for the additional purpose of retaining the L-shaped clips within the linear guide of the slide locks.

BRIEF DESCRIPTION OF THE DRAWINGS

FIG. 1 depicts the fluid flow controller with no splash cover; and

FIG. 2 depicts the fluid flow controller with a splash cover operably in place.

FIG. 3A is a top front end isometric view;

FIG. 3B is a bottom rear end isometric view;

FIG. 3C is a top plan view;

FIG. 3D is a bottom plan view;

FIG. 3E front corner isometric view;

FIG. 3F is a front end elevation view; and

FIG. 3G is a rear end elevation view.

FIG. 4A is taken along line 4A-4A of FIG. 3C; and

FIG. 4B is taken along line 4B-4*b* of FIG. 3C.

FIG. 6A depicts a first arrangement suitable for beverage products; and

FIG. 6B depicts a second arrangement suitable for diluents.

FIG. 7A is a bottom rear end isometric view; and

FIG. 7B is a bottom plan view.

FIG. 8A is taken along line 8A-8A of FIG. 7B; and

FIG. 8B is taken along line 8B-8B of FIG. 7B.

FIG. 11A is a bottom rear end view; and

FIG. 11B is a bottom front end view.

FIG. 12A is a top isometric view;

FIG. 12B is a bottom isometric view;

FIG. 12C is a first side elevation view;

FIG. 12D is a second side elevation view;

FIG. 13A is a cross-sectional elevation view taken along line 13A-13A of FIG. 12C; and FIG. 13B is a cross-sectional elevation view taken along line 13B-13B of FIG. 12D.

FIG. 14A is a bottom isometric view;

FIG. 14B is a side elevation view;

FIG. 15 is a cross-sectional elevation view taken along line 15-15 of FIG. 14B.

FIG. 16 shows a first stage of insertion, as the shutoff valve trim assembly is prepared for insertion;

FIG. 17 shows a second stage of insertion;

FIG. 18 shows a third stage of insertion;

FIG. 19 shows a fourth stage of insertion; and

FIG. 20 shows a fifth stage of insertion, as the shutoff valve trim assembly is operably positioned within the assembly body.

FIG. 21A is a bottom rear end isometric view of the view of FIG. 20; and FIG. 21B is a bottom front end isometric view of the view of FIG. 20.

FIG. 22A is a first side elevation view;

FIG. 22B is a second side elevation view; and

FIG. 23 is a cross-section elevation view taken along line 23-23 of FIG. 22B.

FIG. 25A is a bottom rear end isometric view of the view of FIG. 24; and FIG. 25B is a bottom front end isometric view of the view of FIG. 24.

FIG. 26A is a first side elevation view;

FIG. 26B is a second side elevation view; and

FIG. 27 is a cross-section elevation view taken along line 27-27 of FIG. 26B.

FIG. 28A is a partially exploded bottom rear end isometric view; and

FIG. 28B is a partially exploded rear end elevation view.

FIG. 29A is a top accessible side isometric view;

FIG. 29B is an accessible side elevation view;

FIG. 29C is a bottom mating side isometric view; and

FIG. 29D is a transverse side elevation view.

FIG. 30A is a detail view taken from FIG. 28A; and

FIG. 30B is a detail view taken from FIG. 28B.

FIG. 31A is a side elevation view;

FIG. 31B is a cross-sectional view taken along line 31B-31B of FIG. 31A;

FIG. 31C is a top barbed end isometric view.

FIG. 32A is a side elevation view generally corresponding to the view of FIG. 31A; and FIG. 32B is a cross-sectional view taken along line 32B-32B of FIG. 32A generally corresponding to the view of FIG. 31B.

FIG. 33A is a top barbed connector end isometric view;

FIG. 33B is a bottom quick connector end isometric view;

FIG. 33C side elevation view;

FIG. 33D top plan view;

FIG. 33E is a cross-sectional view taken along line 33E-33E of FIG. 33D; and FIG. 33F is a cross-sectional view taken along line 33F-33F of FIG. 33D.

FIG. 34A is a top barbed connector end isometric view;

FIG. 34B is a bottom quick connector end isometric view;

FIG. 34C side elevation view;

FIG. 34D top plan view;

FIG. 34E is a cross-sectional view taken along line 34E-34E of FIG. 34D; and FIG. 34F is a cross-sectional view taken along line 34F-34F of FIG. 34D.

FIG. 36A is an exterior side isometric view;

FIG. 36B is a mating side isometric view; and

FIG. 36C is an exterior side plan view.

FIG. 39A is a bottom rear end isometric view; and

FIG. 39B is a bottom plan view.

FIG. 47A is top rear end isometric view;

FIG. 47B is a bottom rear end isometric view;

FIG. 48A is a detail view taken from FIG. 47A; and

FIG. 48B is a detail view taken from FIG. 47B.

FIG. 49A is a detail view generally corresponding to the view of FIG. 48A; and FIG. 49B is a detail view generally corresponding to the view of FIG. 48B.

FIG. 50A is a detail view generally corresponding to the view of FIG. 48A; and FIG. 50B is a detail view generally corresponding to the view of FIG. 48B.

FIG. 51A is a detail view generally corresponding to the view of FIG. 48A; and FIG. 51B is a detail view generally corresponding to the view of FIG. 48B.

FIG. 52A is a detail view generally corresponding to the view of FIG. 48A; and FIG. 52B is a detail view generally corresponding to the view of FIG. 48B.

FIG. 53A is a top rear end isometric view;

FIG. 53B is a bottom rear end isometric view; and

FIG. 53C is a rear end elevation view.

FIGS. 54A-54B illustrate aspects of the fluid flow paths through the operably configured fluid flow controller, where:

FIG. 54A depicts a first flow path through a shutoff valve and a flow rate controller of the fluid flow controller, each of which is implemented in an upstream rank; and FIG. 54B depicts a second flow path through a shutoff valve and a flow rate controller of the fluid flow controller, each of which is implemented in a downstream rank.

FIG. 55 is a partially exploded bottom front end isometric view illustrating various aspects of the securement attachment about the assembly body of a splash cover.

FIGS. 56A-56B illustrate various aspects of the splash cover, where:

FIG. 56A is a top rear end isometric view; and

FIG. 56B is a front end elevation view.

FIGS. 57A-57C illustrate aspects of splash cover as securely attached about the assembly body, where:

Figure 57A:
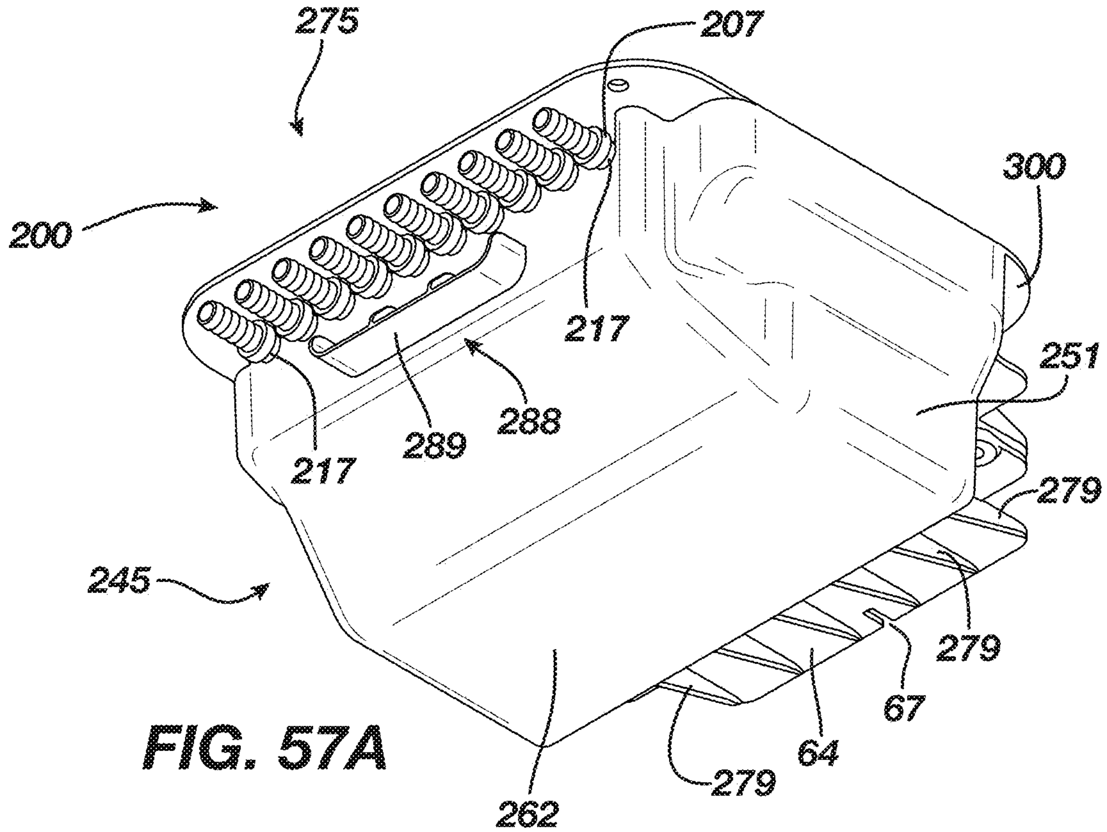
Figure 57B:
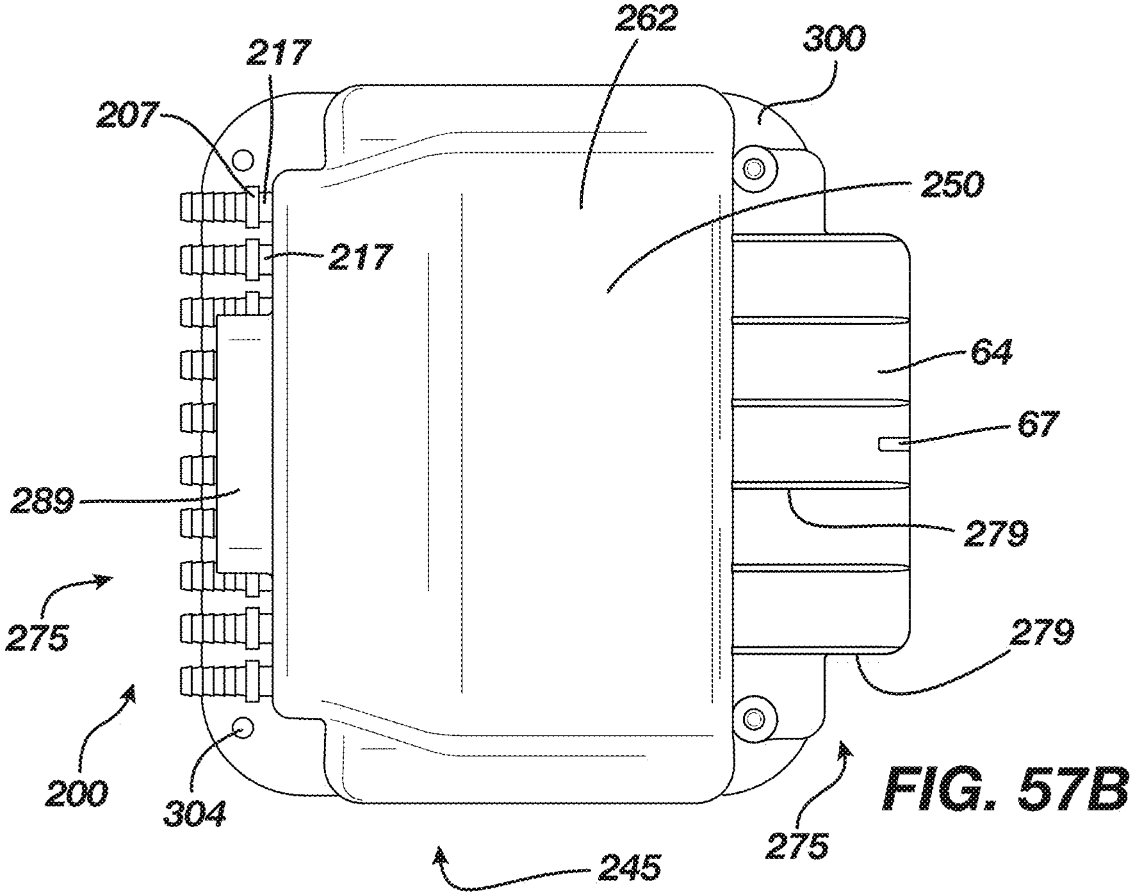

FIG. 57A bottom rear end isometric view;

FIG. 57B is a bottom plan view; and

Figure 57C:
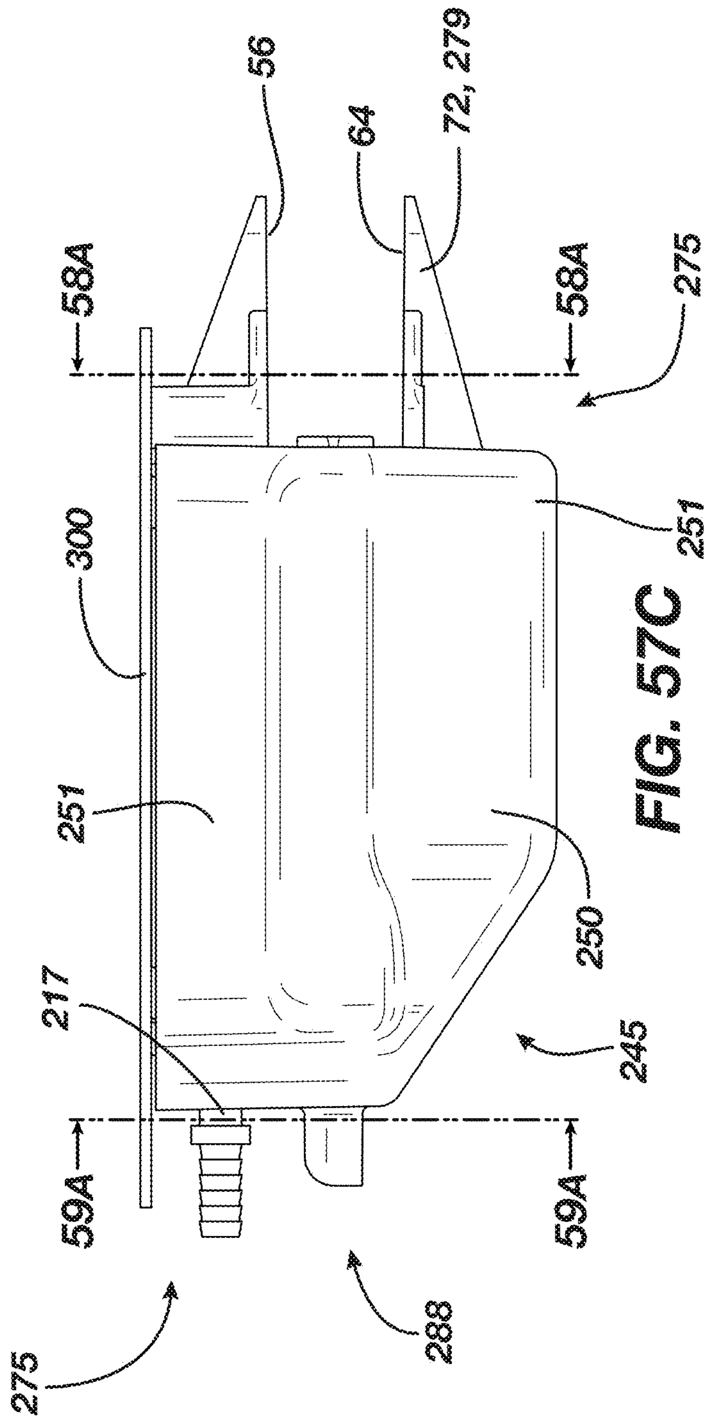

FIG. 57C is a side elevation view.

Figure 58A:
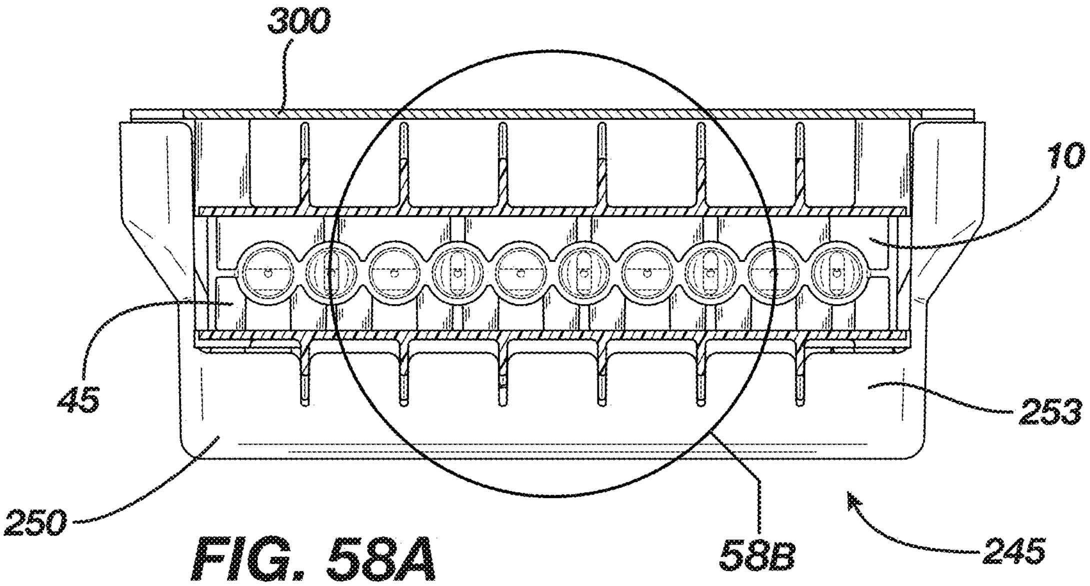
Figure 58B:
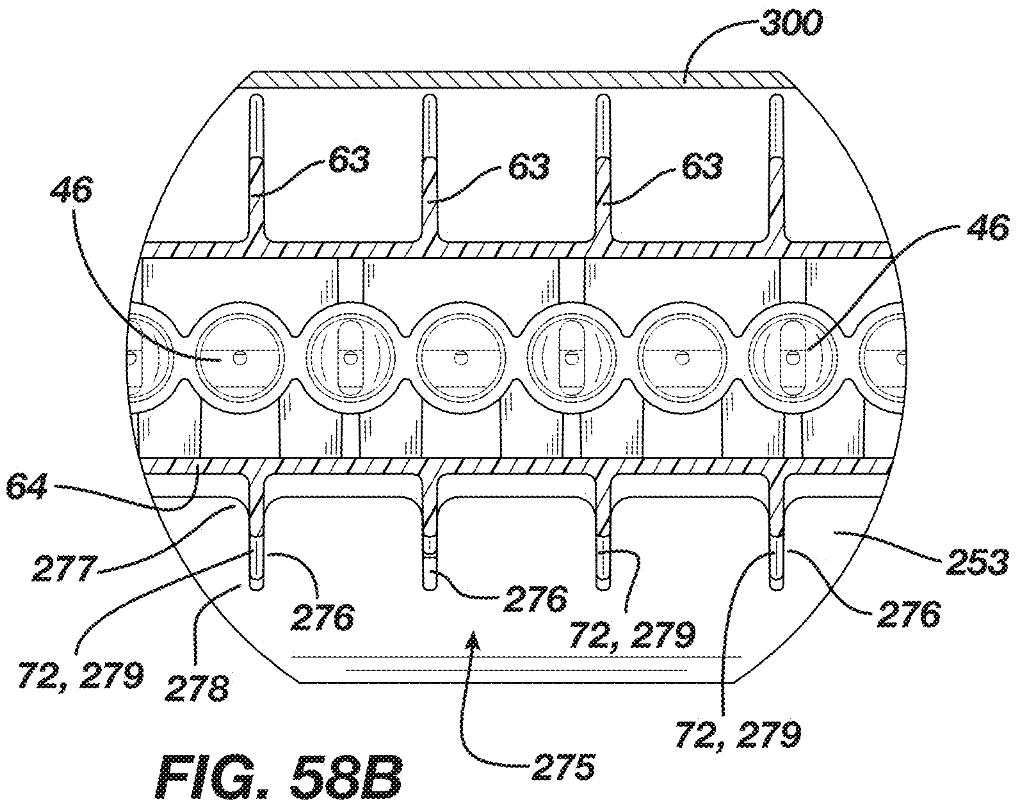

FIGS. 58A-58B illustrate aspects of the secure attachment of the splash cover at the front end of the assembly body, where:

FIG. 58A is a cross-sectional elevation view taken along line 58A-58A of FIG. 57C; and FIG. 58B is a detail view taken from FIG. 58A.

Figure 59A:
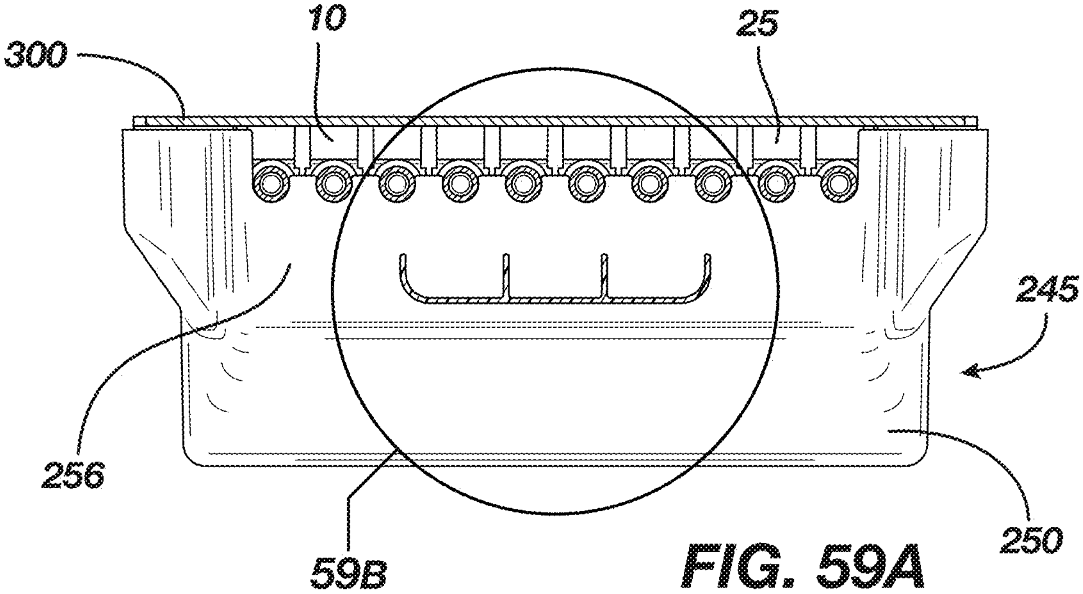
Figure 59B:
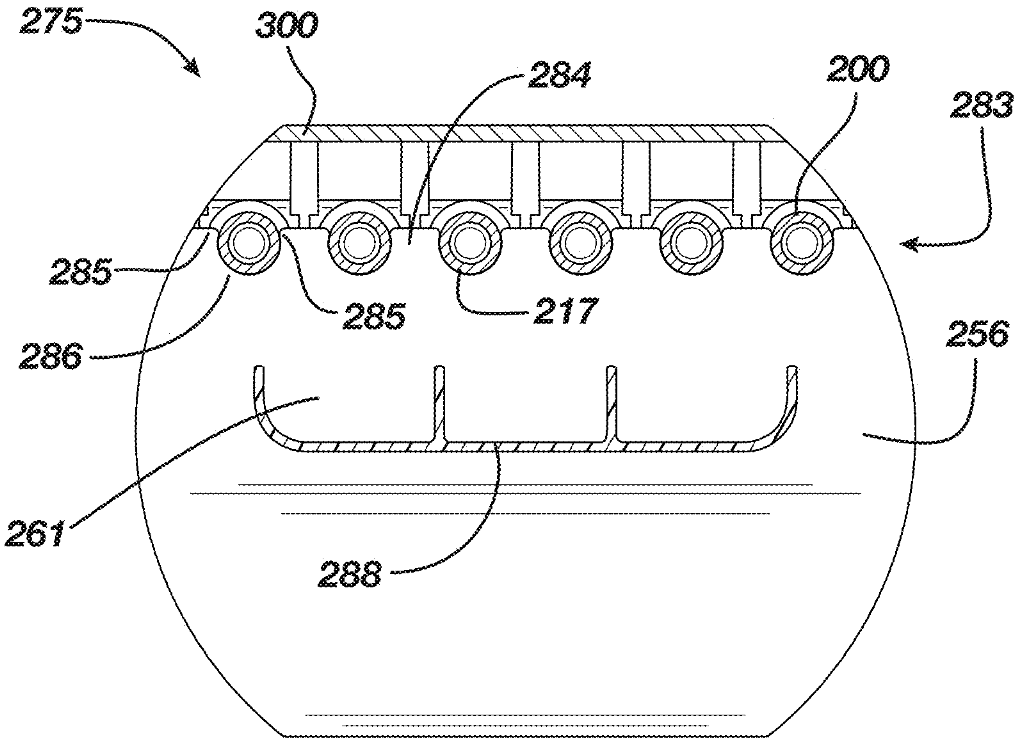

FIGS. 59A-59B illustrate aspects of the secure attachment of the splash cover at the rear end of the assembly body, where:

FIG. 59A is a cross-sectional elevation view taken along line 59A-59A of FIG. 57C; and FIG. 59B is a detail view taken from FIG. 59A.

Figure 60:
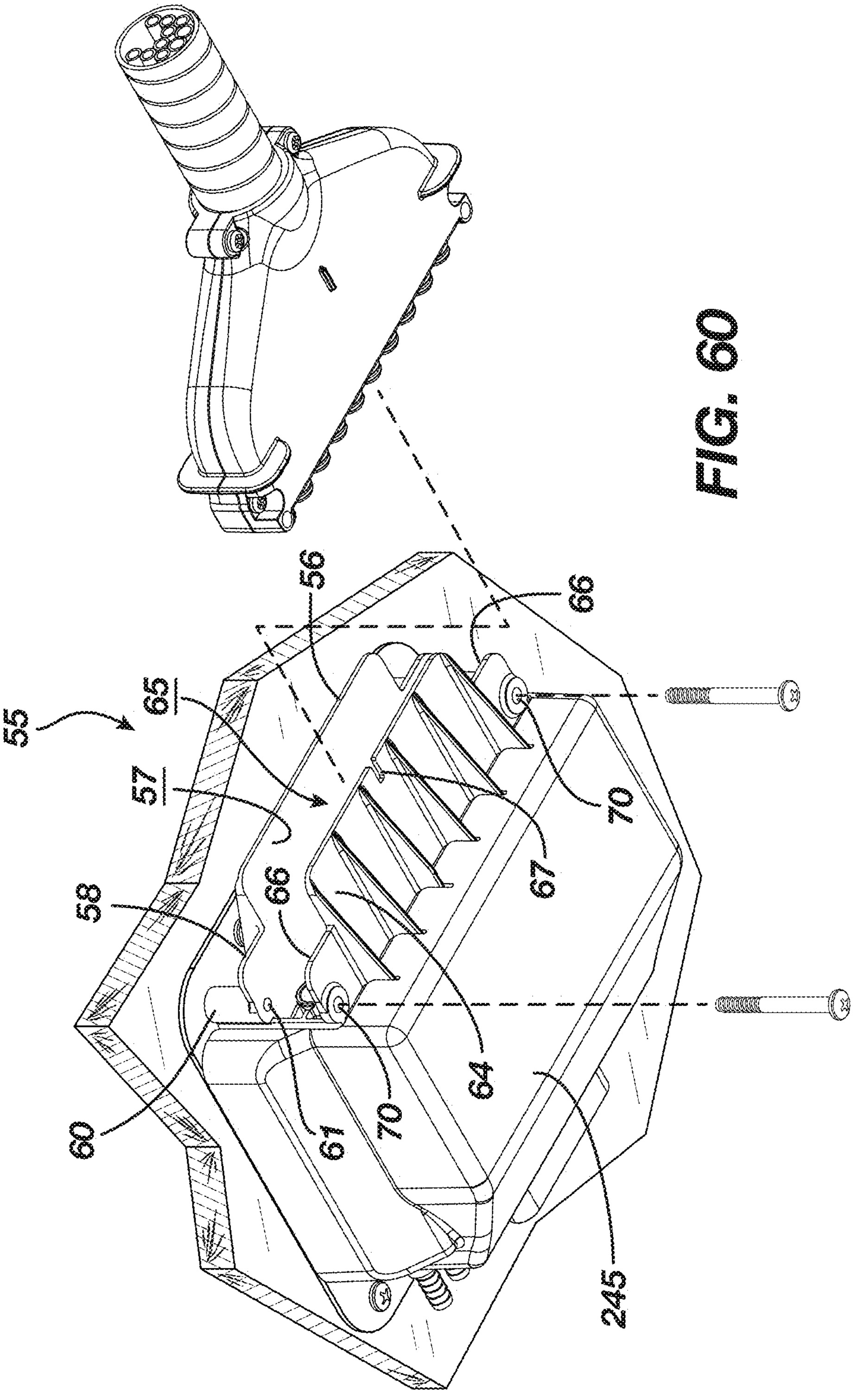

FIG. 60 is a bottom front end isometric view illustrating aspects of the attachment and securement of an exemplary fluid line connector assembly at the front end of the assembly body.

Figure 61:
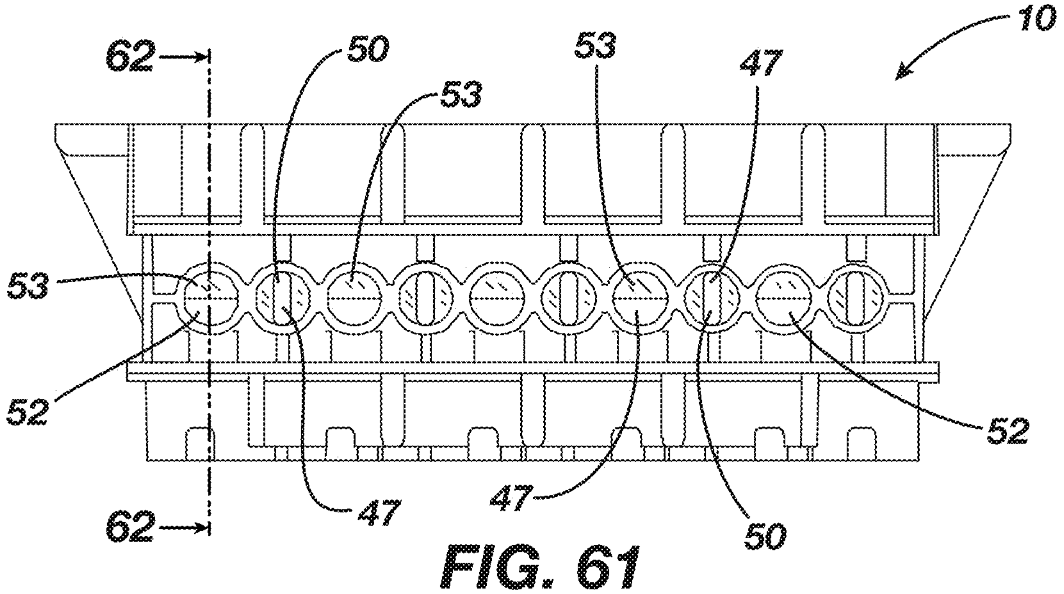
Figure 62:
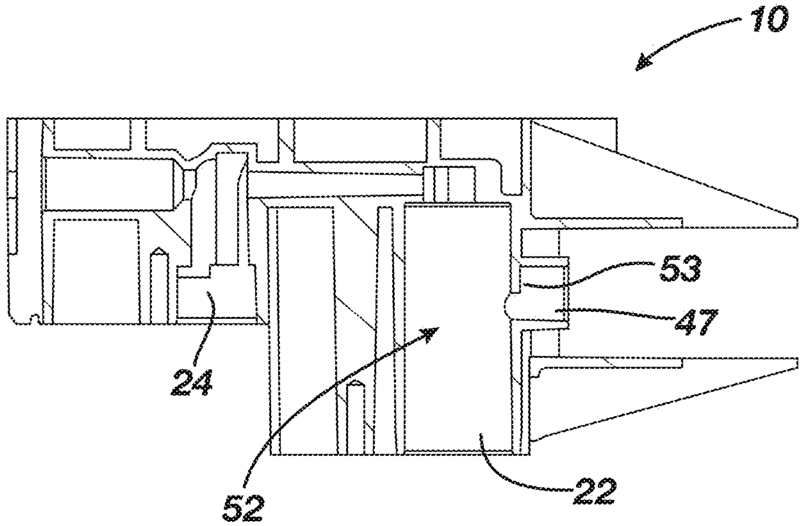

FIGS. 61-62 illustrate various aspects of an alternative implementation of the fluid outlet channels of the fluid flow controller, as may be required or otherwise desired in a particular implementation of the fluid flow controller, and where:

FIG. 61 is a front end elevation view; and

FIG. 62 is a cross-sectional view taken along line 62-62 of FIG. 61.

Figure 63:
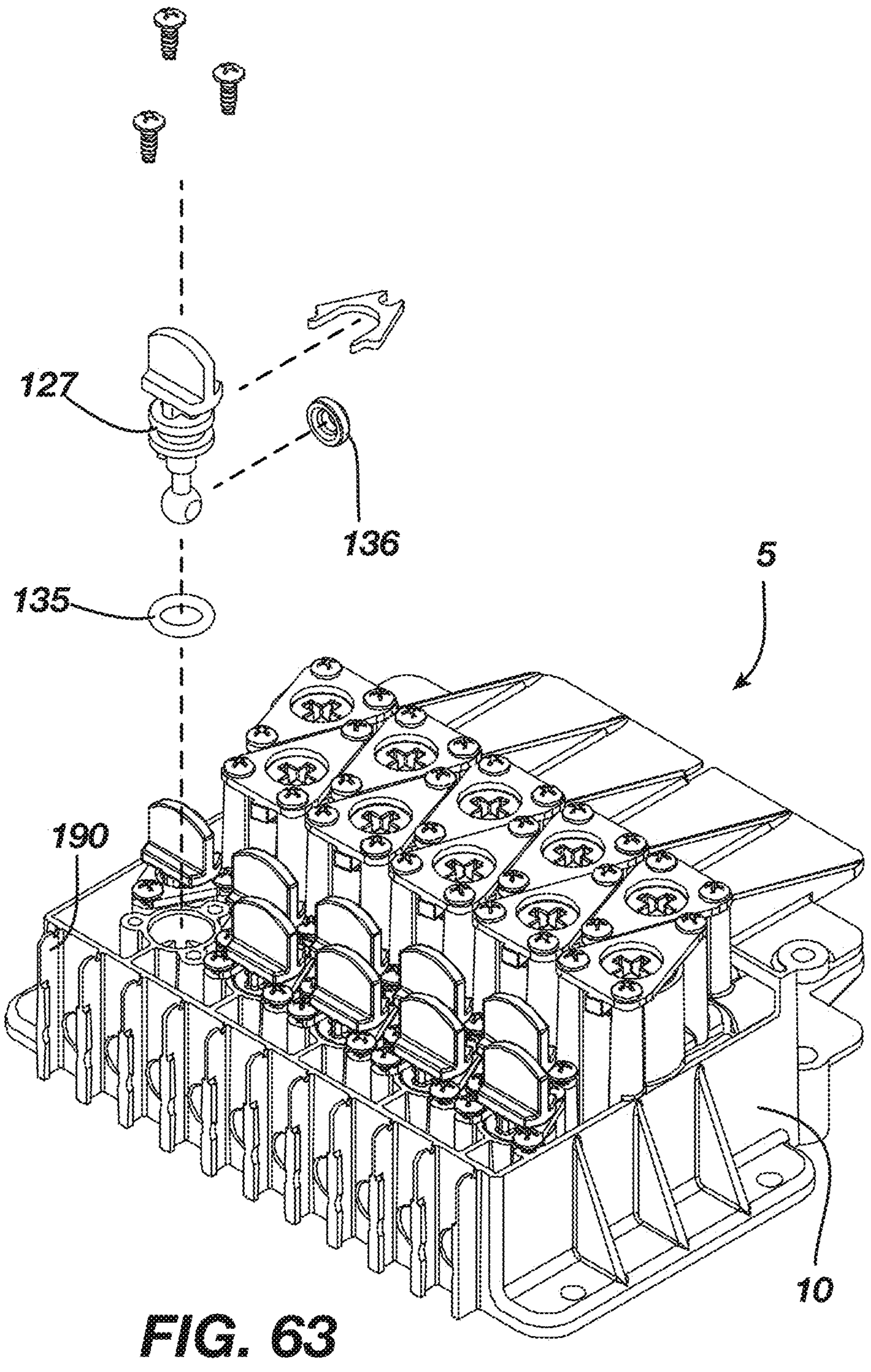

FIG. 63 is a partially exploded top rear end isometric view illustrating various aspects of an alternative implementation of a shutoff valve trim retainer arrangement of the fluid flow controller.

Figure 65:
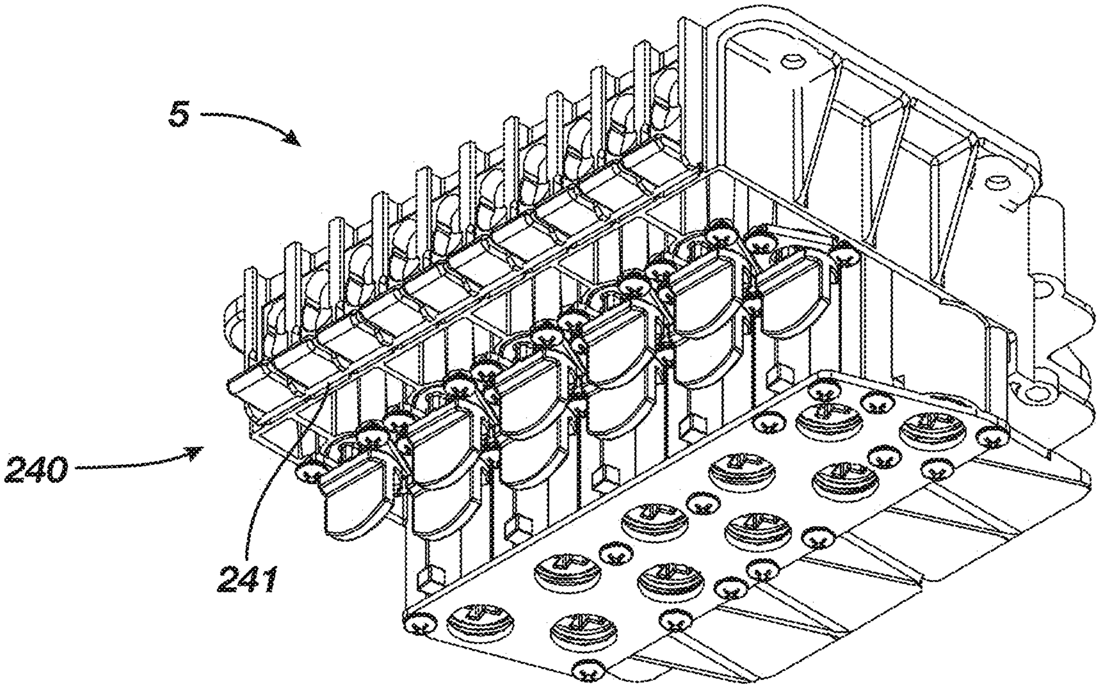
Figure 64:
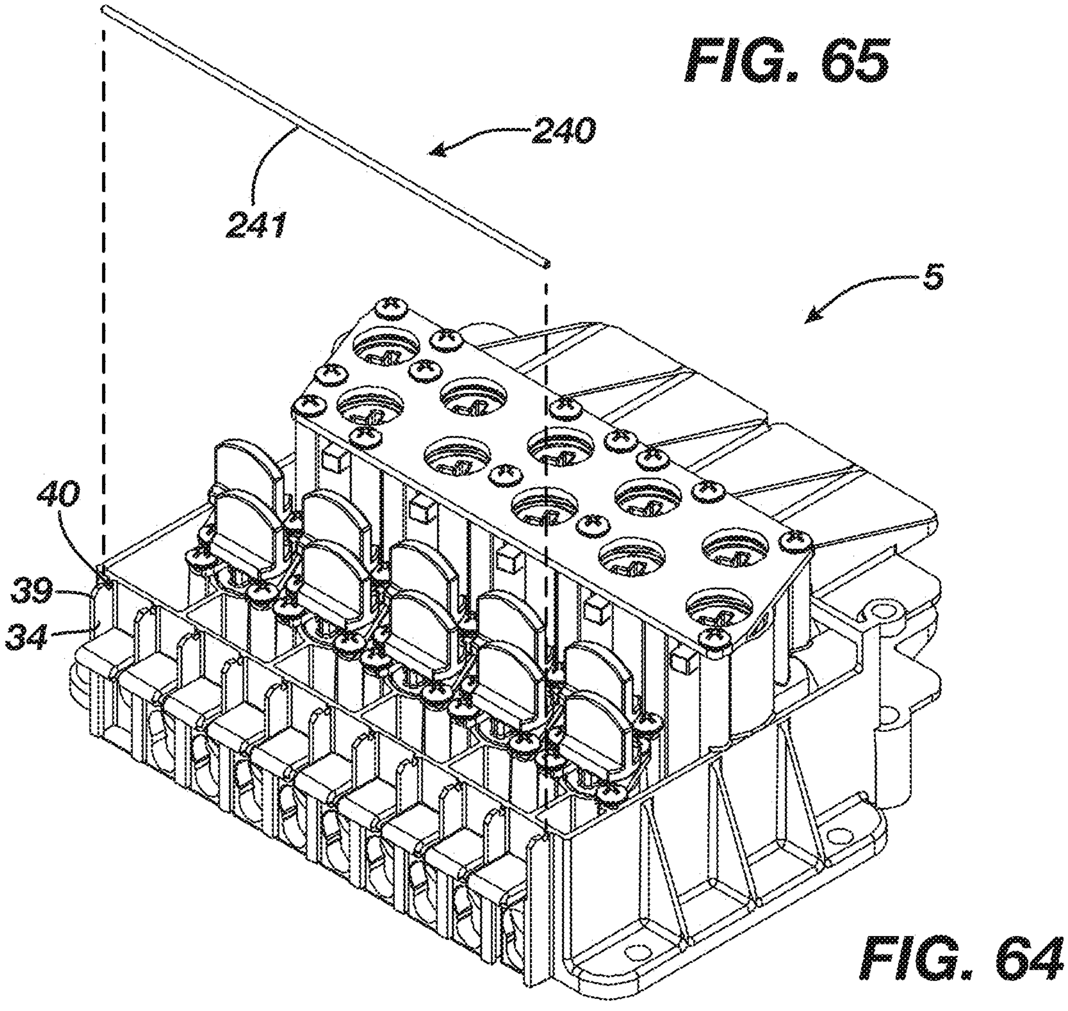

FIGS. 64-65 illustrate various aspects of an alternative implementation of a common clip stop of the fluid flow controller, and various aspects of an alternative implementation of a flow control trim retainer arrangement of the fluid flow controller, and where:

FIG. 64 is a partially exploded top rear end isometric view; and

FIG. 65 is a bottom rear end isometric view.

Figure 66:
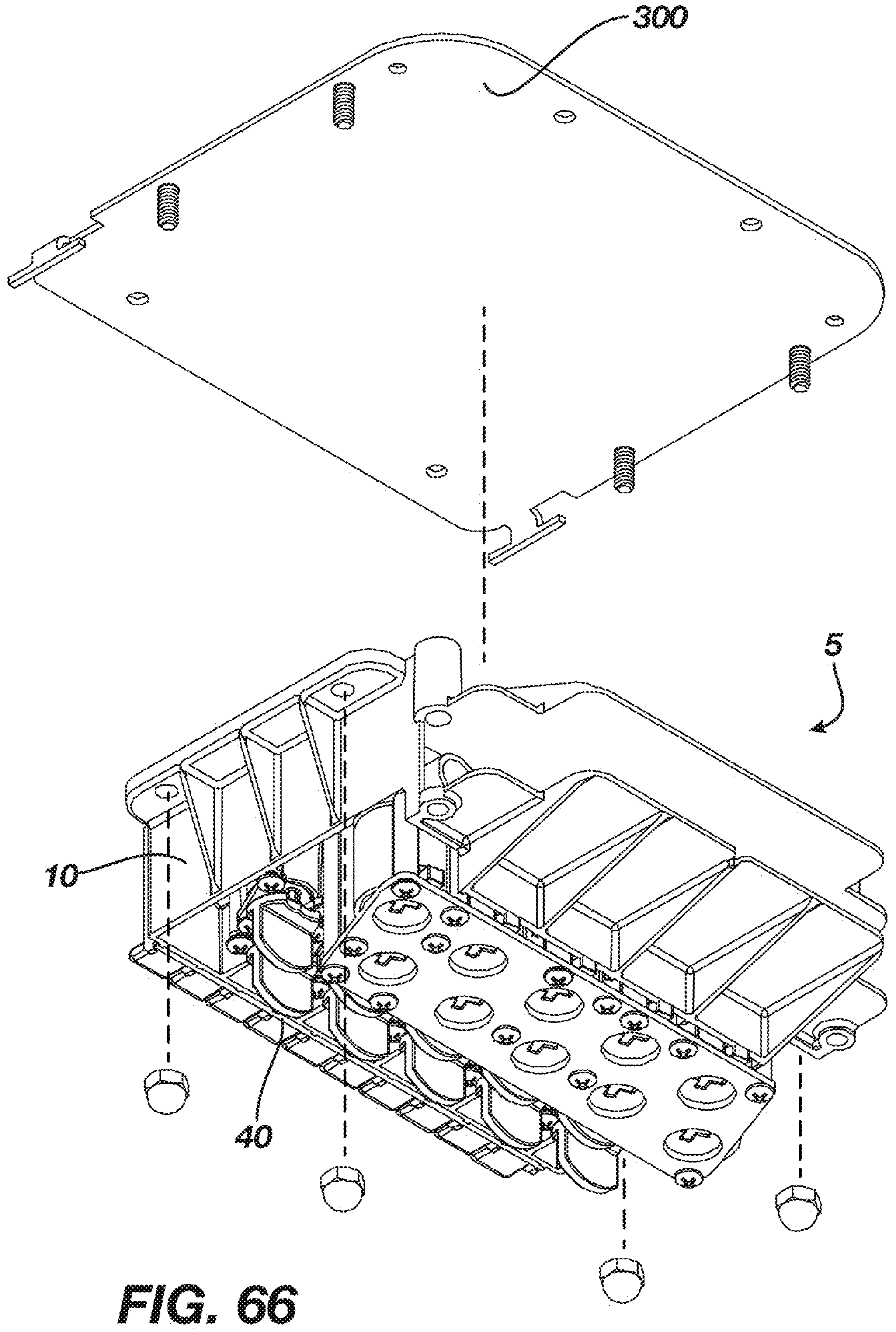

FIG. 66 is a partially exploded bottom front end isometric view illustrating various aspects of an alternative implementation of a mounting plate of the fluid flow controller.

DETAILED DESCRIPTION OF THE PREFERRED EMBODIMENTS

As required, a detailed embodiment of the present invention is disclosed herein; however, it is to be understood that the disclosed embodiment is merely exemplary of the invention, which may be embodied in various forms. It is further to be understood that the figures are not necessarily to scale, and some features may be exaggerated to show details of particular components or steps.

Figure 1:
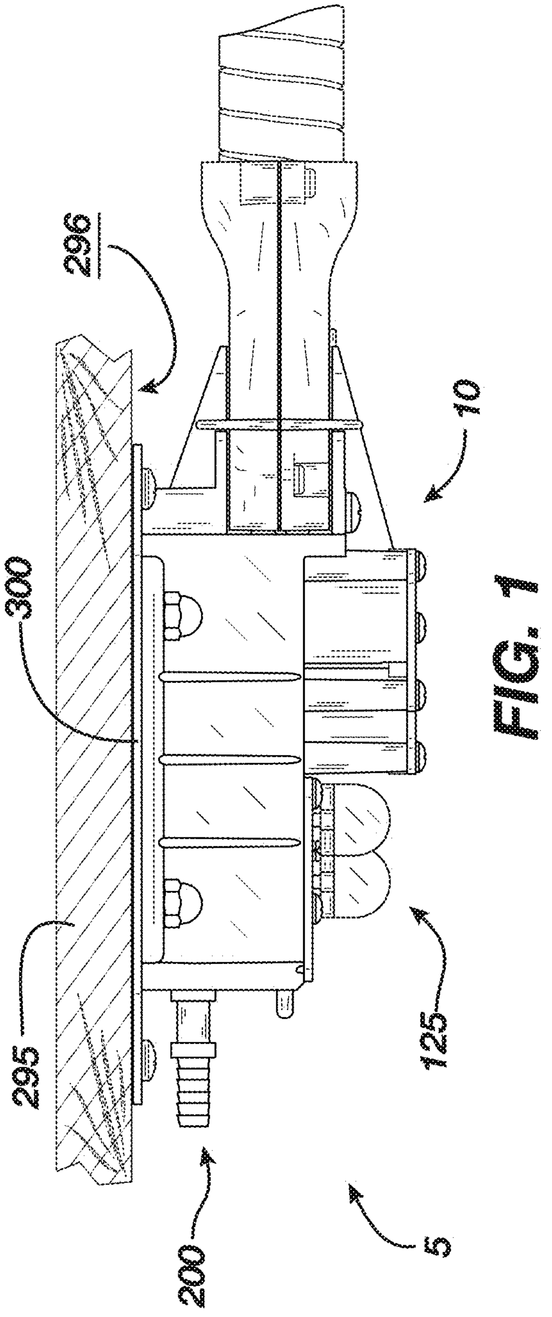
FIGS. 1 and 2 are side elevation views illustrating a fluid flow controller according to a preferred embodiment as deployed for use, where.
Figure 2:
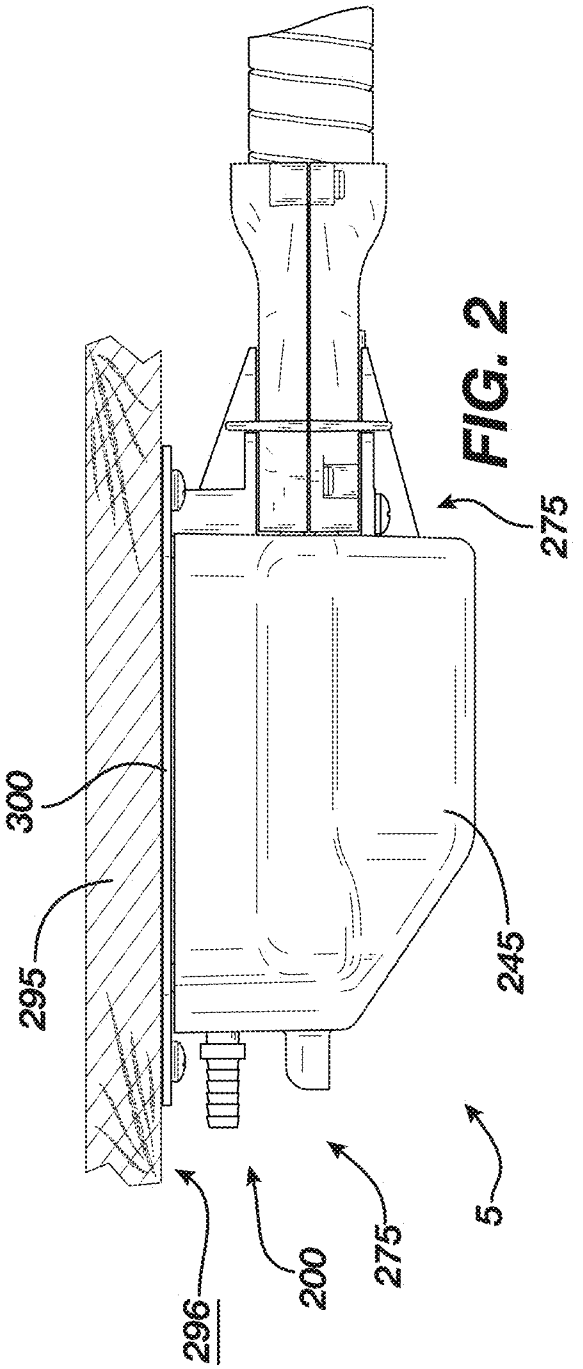

FIGS. 1 and 2 illustrate a fluid flow controller 5 according to a preferred embodiment of the present invention, as deployed in use, and which is implemented as a feature-rich arrangement of a multiplicity of independently adjustable flow rate controllers and an equal multiplicity of independently operable shutoff valves, all of which are formed or otherwise provided substantially within a highly compact unitary assembly body 10. The flow rate controllers and shutoff valves are pairwise provided in connection with a corresponding discrete fluid flow path between a single provided fluid inlet port into the assembly body 10 and a single provided outlet port from the assembly body 10, thereby establishing a multiplicity of independently fully controllable discrete fluid flow paths through the fluid flow controller 5.

Each flow rate controller is configured or otherwise adapted to establish and maintain a volumetric rate of fluid flow through the corresponding fluid flow path, thereby enabling the establishment of desired volumetric ratios of user determined sets of fluid flows through the fluid flow controller 5. Each shutoff valve is configured or otherwise adapted to enable or disable fluid flow through the corresponding fluid flow path.

Notwithstanding implementation of a minimalized under-counter or like mounting footprint, the exemplary fluid flow controller 5 implements a full complement of features for protecting the flow rate controllers, shutoff valves and connector fittings establishing upstream and downstream fluid communications; for ensuring that all of the implemented flow rate controllers, shutoff valves and connector fittings are readily accessible for operation, adjustment or other configuration or reconfiguration, maintenance or repair, or for any other requirement; and even for avoiding inadvertent misconfiguration of the fluid flow controller 5. In use of the exemplary implementation according to the preferred embodiment, these features, including even individual replacement of one or more flow rate controllers, are fully available without dismounting or otherwise disturbing the operable deployment of the fluid flow controller 5, and without any need to depressurize any upstream system or fluid flow line providing fluid communication from an upstream system to the operably deployed fluid flow controller 5.

FIGS. 3A-3G illustrate an exemplary assembly body 10, which in accordance with the preferred embodiment of the fluid flow controller 5 unitarily forms substantially all of the fixed elements of the fluid flow controller 5. In the exemplary implementation of the fluid flow controller 5 according to the preferred embodiment, the assembly body 10 is highly optimized for injection molding, whereby the assembly body 10 generally includes highly optimized walls 11 forming various individual features disposed among liberally provided bosses 12, ribs 13, gussets 14 and like structural reinforcements, which are patterned to stiffen the assembly body 10 to produce a lightweight yet stable and durable arrangement of the individual features in a readily manufactured unitary form, all of which are economically implemented in furtherance of the objects of the invention. In the exemplary implementation of the fluid flow controller 5, the assembly body 10 includes a substantially planar top side 15, first and second sidewalls 18, a bottom side 20, a rear end 25, and a front end 45.

Although the upstream fluid connections for the fluid flow controller 5 are generally described as being implemented or otherwise accommodated at the rear end 25 of the assembly body 10, the designation of rear end per se, versus for example front end, is arbitrary. Accordingly, the designation of front end per se is also arbitrary, notwithstanding that the downstream fluid connections for the fluid flow controller 5 are generally described as being implemented or otherwise accommodated at the front end 45 of the assembly body 10. In any case, neither should be ascribed any import not otherwise expressed beyond their use in providing a frame of reference for the detailed descriptions set forth herein of the relationships of various features of exemplary fluid flow controller 5.

Figure 3A:
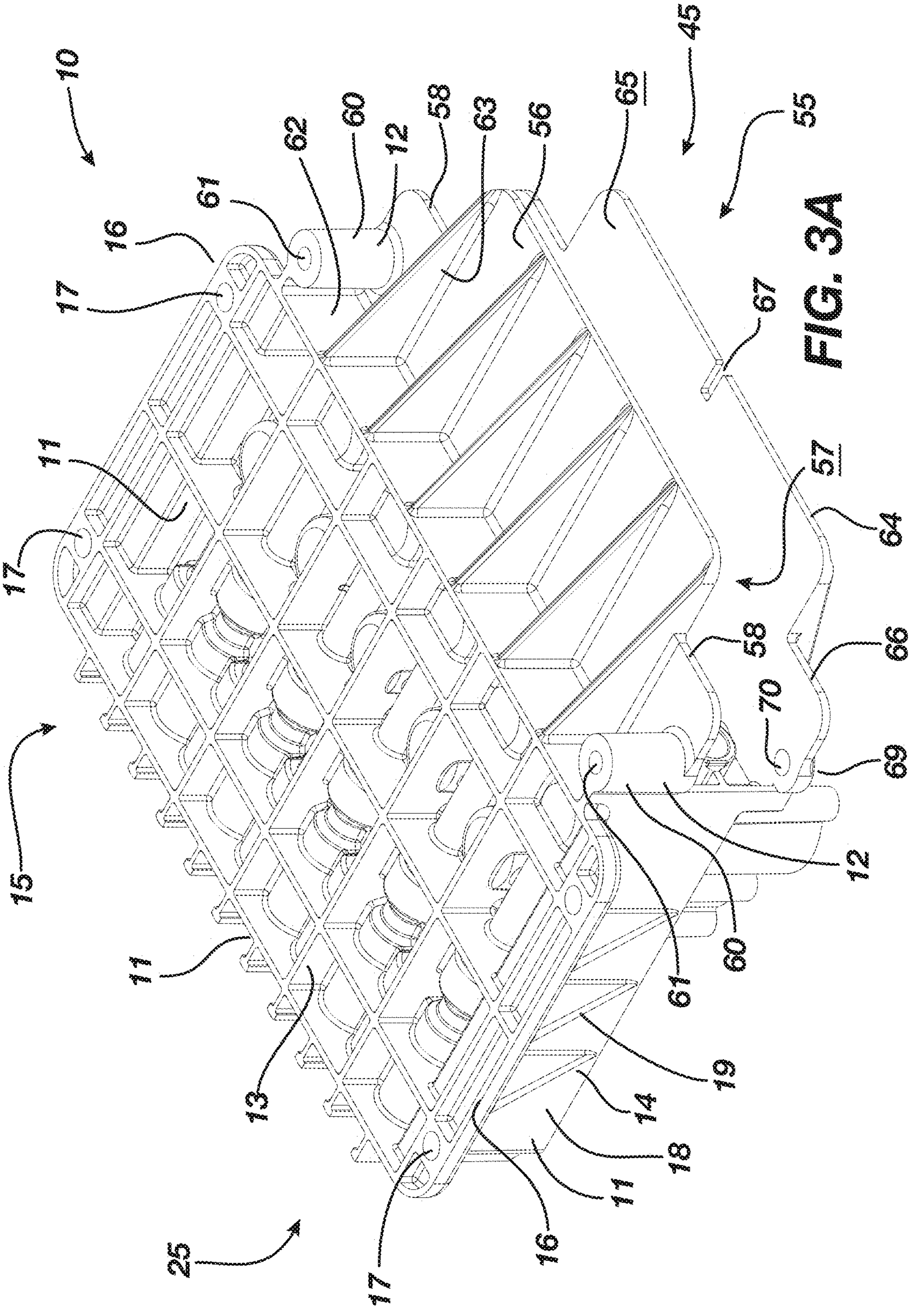
FIGS. 3A-3G illustrate various aspects of an assembly body of the fluid flow controller, where.
Figure 3B:
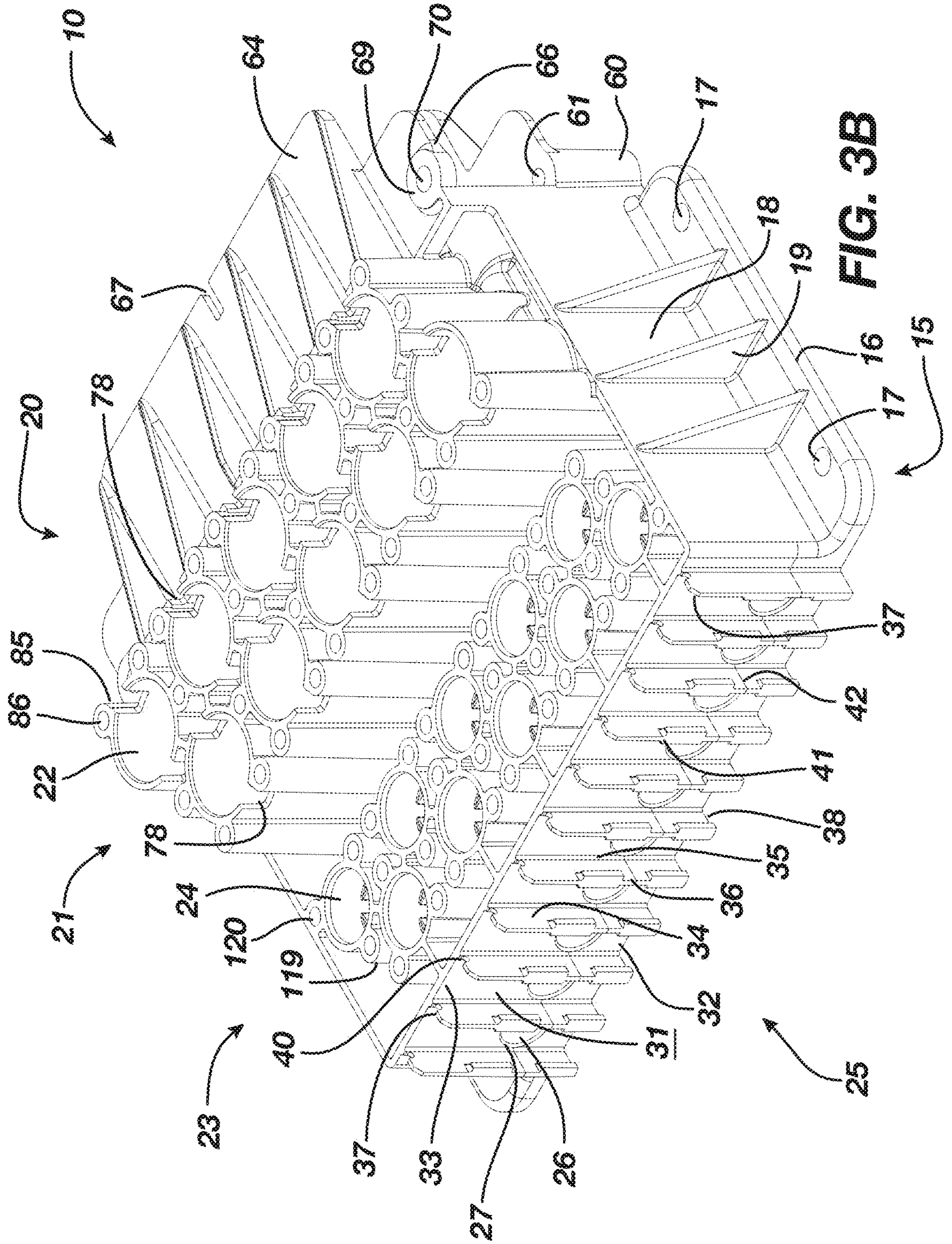
Figure 3D:
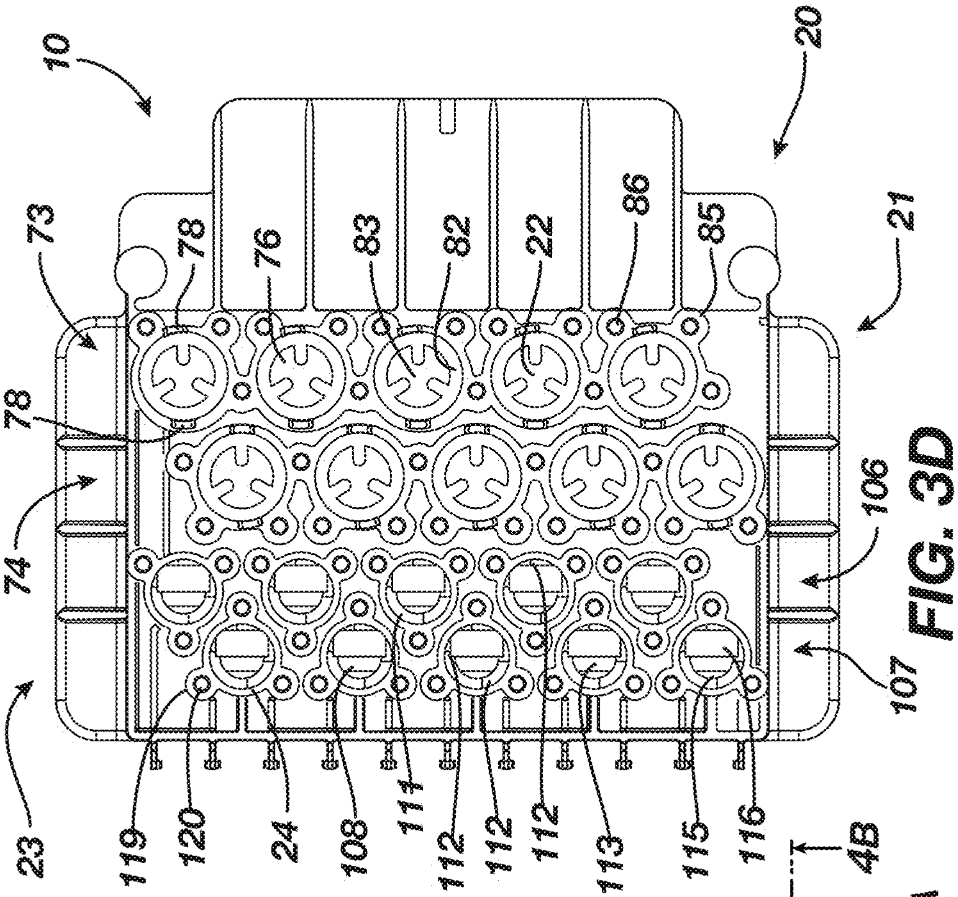
Figure 3C:
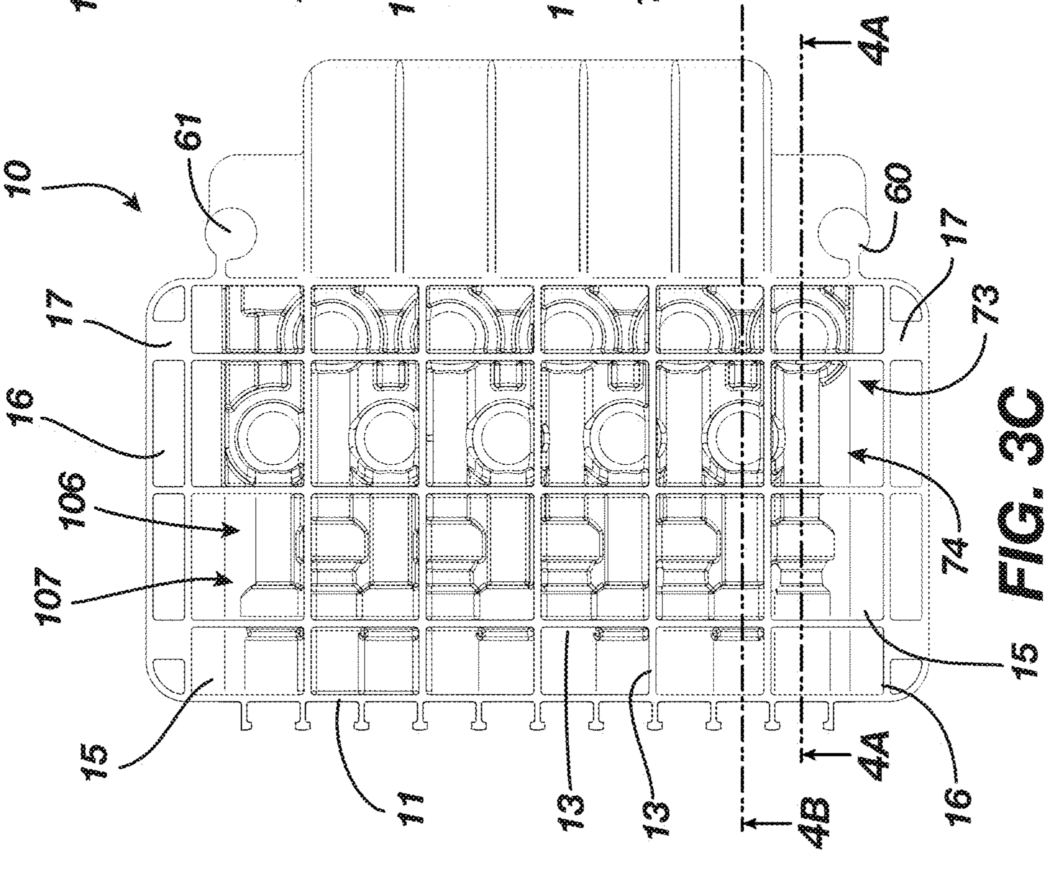

As illustrated in FIGS. 3A and 3C, the substantially planar top side 15 of the assembly body 10 is generally formed by the tops of adjacent walls, and includes flanges 16 extending over first and second sidewalls 18 of the assembly body 10. Clearance holes 17 are provided through the flanges 16 for mounting the assembly body 10 in deployment of the fluid flow controller 5. To this end, a plurality of gussets 19 is provided between each flange 16 and the adjacent sidewall 18.

FIGS. 3B and 3D illustrate a bottom side 20 of the assembly body 10, which is formed or otherwise provided in a tiered arrangement conforming to the internal and related features of the fluid flow controller 5. Beyond contributing to the desired highly compact nature of the assembly body 10, the tiered arrangement of the bottom side 20 of the assembly body 10 facilitates implementation of features for configuration or reconfiguration of the fluid flow controller 5. In particular, the tiered bottom side 20 of the assembly body 10 is specially devised to enable an inventive aspect of an inlet connector retaining mechanism 150 of the exemplary fluid flow controller 5, as will be described more fully herein.

In any case, a first tier 21 of the bottom side 20 of the assembly body 10 accommodates a collective arrangement of those aspects of the exemplary fluid flow controller 5 generally requiring the greatest distance between the top side 15 and the bottom side 20 of the assembly body 10 for implementation. In particular, one of a multiplicity of controller bodies 22 is formed or otherwise provided at and through the first tier 21 of bottom side 20 of the assembly body 10 for each of the equal multiplicity of implemented independently operable flow rate controllers 90. Similarly, a second tier 23 of the bottom side 20 of the assembly body 10 accommodates a collective arrangement of aspects of the exemplary fluid flow controller 5 as may be collectively implemented within substantially less distance between the top side 15 and the bottom side 20 of the assembly body 10 relative to that defined by the first tier 21 of the bottom side 20. In particular, one of a multiplicity of valve bodies 24 is formed or otherwise provided at and through the bottom side 20 of the assembly body 10 for each of the equal multiplicity of implemented independently operable shutoff valves.

Figure 3E:
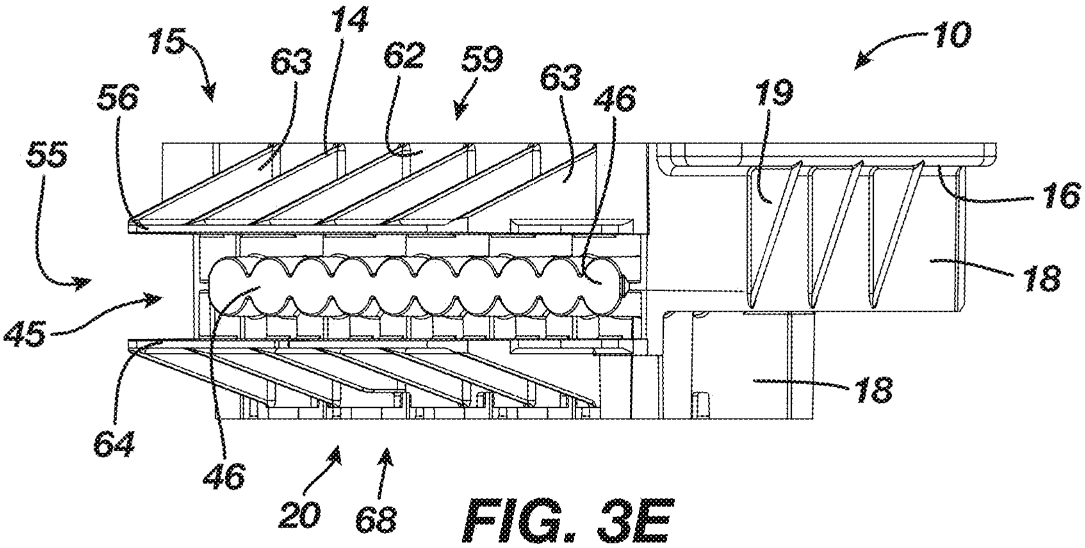
Figure 3F:
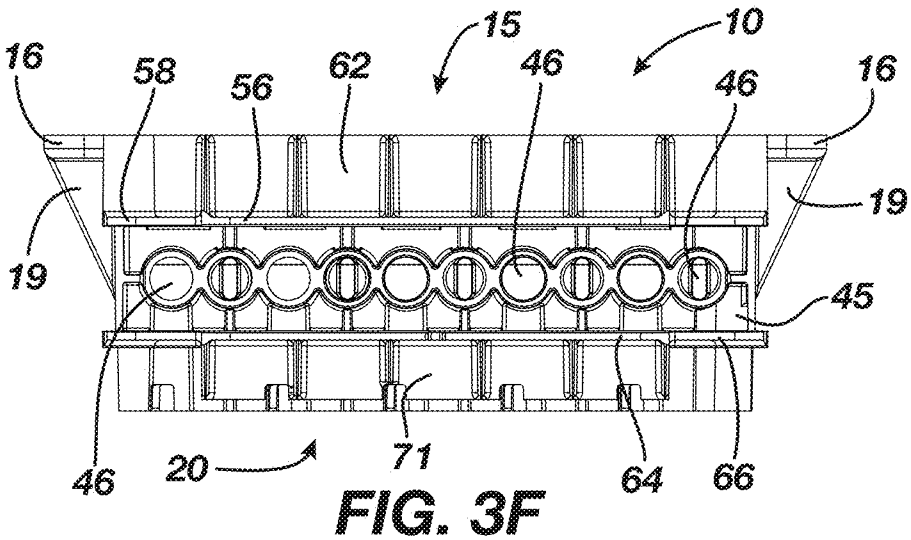
Figure 3G:
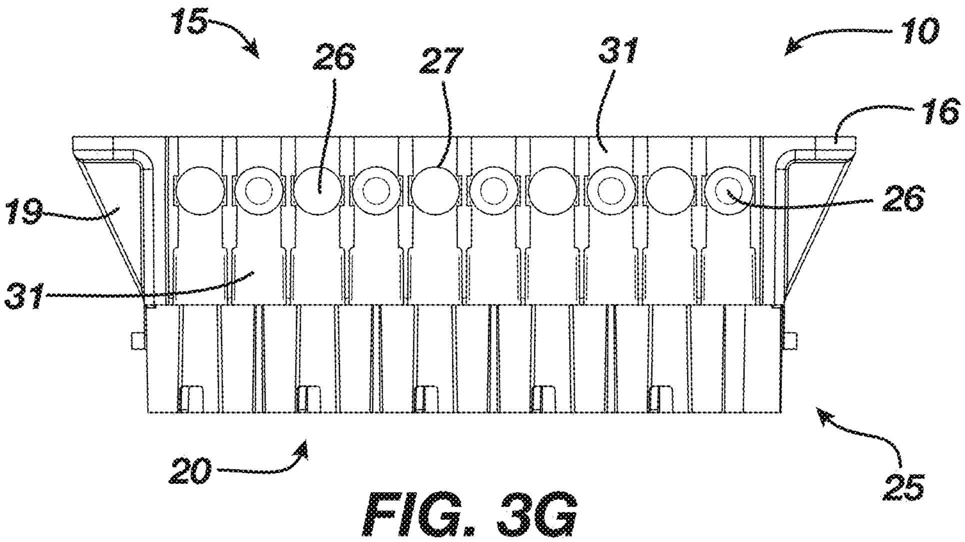

FIGS. 3B and 3G illustrate the rear end 25 of the assembly body 10, at which a multiplicity of cylindrical inlet ports 26 is formed or otherwise provided about parallel axes. In the exemplary preferred embodiment, the inlet ports 26 are vertically aligned and evenly spaced horizontally across the rear end 25 of the assembly body 10, and each inlet port 26 is also sized, shaped or otherwise adapted to receive a male quick-connector 208 of a barbed quick-connect fitting 200 conventionally terminating a fluid line from a source of pressurized fluid, such as a source of a pressurized beverage product or diluent. The circular outer edges 27 of the inlet ports 26 are each preferably filleted, chamfered or otherwise relieved to facilitate insertion of the male quick-connector 208, and to lessen risk of damage to other features as may be provided in connection with a fluid fitting, especially soft body features such as O-rings or like seals. Each inlet port 26 terminates in open fluid communication with the upstream end 29 of an inlet fluid passage 28, which is configured or otherwise adapted within the assembly body 10 to channel an upstream fluid flow from the inlet port 26 to a corresponding shutoff valve as described more fully herein.

A substantially planar vertical face 31 is formed or otherwise provided at the rear end 25 of the assembly body 10, and extends orthogonally through the axes of the inlet ports 26, thereby establishing a coplanar arrangement of circular outer edges 27 of the inlet ports 26. Substantially planar, vertical panels 34 extending orthogonally rearward from the rearmost provided face are formed or otherwise provided as unitary elements of the assembly body 10. In particular, the panels 34 are provided equidistantly about the inlet ports 26, each inlet port 26 thereby being centrally bounded by a set of adjacent panels 34, each of which includes an inside, proximal edge 35 and an outside, distal edge 36. The inside, proximal edge 35 of each panel 34 is unitary with or otherwise intersects the vertical face 31. The outside, distal edge 36 of each panel 34 is rearward facing, partially flanged, and preferably substantially vertical. A bottom corner 37 of the outside, distal edge 36, which is located where an end user may be expected to reach, may be and preferably is filleted, chamfered or otherwise relieved.

In the exemplary preferred embodiment of the assembly body 10, the top end 38 of each vertical panel 34 is substantially coextensive with the top edge 32 of the vertical face 31, and the bottom end 39 of each vertical panel 34 is substantially coextensive with the bottom edge 33 of the vertical face 31. A shallow slot 40 is provided at the bottom end 39 of each vertical panel 34 for receiving an interference-fit or snap-fit wire rod 241. A common intermediate position 41 is selectively defined along the outside, distal edges of the vertical panels 34 for locating a lower flange element. In the exemplary preferred embodiment the intermediate position 41 is generally at or about the vertical midpoint between the center of each inlet port 26 and the bottom end 39 of each vertical panel 34. As implemented in the exemplary assembly body 10 a draft ridge 42 is formed by the intersection along a dividing line of the injection mold where oppositely disposed structures of an upper and lower mold body meet. To facilitate manufacture of the assembly body 10, the dividing line creating this draft ridge 42 is aligned with the axes about which the inlet ports 26 are provided.

A multiplicity of cylindrical outlet ports 46 is formed or otherwise provided about parallel axes at the front end of the assembly body 10, which is particularly illustrated in FIGS. 3A and 3E-3F. In particular, one outlet port 46 is provided corresponding to each provided inlet port 26 at the rear end 25 of the assembly body 10. In the exemplary preferred embodiment, the outlet ports 46 are vertically aligned and evenly spaced horizontally across the front end of the assembly body 10, and each outlet port 46 is sized, shaped or otherwise adapted to receive a male quick-connector of a barbed quick-connect fitting as is typically utilized to terminate the upstream end 48 of a fluid line providing fluid communication with a downstream consumer of pressurized fluid, such as a bar gun configured or otherwise adapted to dispense pressurized beverage products and diluents. Each outlet port 46 terminates within the assembly body 10 at a downstream end 49 of a corresponding outlet fluid passage 47, the upstream end 48 of which is in open fluid communication with the fluid outlet provided through the controller body 22 for the respective flow rate controller 90. Importantly, each outlet fluid passage 47 is sized, shaped, configured or otherwise adapted within the assembly body 10 to openly channel a fluid flow from the corresponding flow rate controller 90 to and through the corresponding outlet port 46 at the rate established by the flow rate controller 90.

An upstream set 50 of outlet fluid passages 47 includes each of the outlet fluid passages 47 from the upstream rank of controller bodies 22, and thus the upstream rank of flow rate controllers 90. In the exemplary implementation of the fluid flow controller 5 of the preferred embodiment, all but one of the upstream set 50 of outlet fluid passages 47 passes between adjacent controller bodies 22 of the downstream rank of controller bodies 22. As particularly illustrated in FIG. 3D the controller bodies 22 of the fluid flow controller 5 according to the exemplary preferred embodiment are the widest features of the fluid flow controller 5 between the first and second sidewalls 18 of the assembly body 10. It is therefore particularly important in the exemplary implementation of the fluid flow controller 5 that each controller body 22 of a respective rank is spaced as closely together between the first and second sidewalls 18 of the assembly body 10 as may practicably be implemented consistent with the various objects of the invention. Accordingly, at least those outlet fluid passages 47 of the upstream set 50 that pass between adjacent controller bodies 22 of the downstream rank are specially formed to minimize the horizontal space occupied by each respective outlet fluid passage 47 between adjacent controller bodies 22, in furtherance of Applicant's object to provide increased functionality within a highly compact form factor. As particularly illustrated in FIGS. 11A-11B, a specially implemented length 51 of at least each outlet fluid passage 47 that is formed or otherwise provided between adjacent controller bodies 22 of the downstream rank has a vertically oriented generally slot-shaped internal cross section. In the exemplary implementation of the fluid flow controller 5, however, each outlet fluid passage 47 of the upstream set 50 has a specially implemented length 51 to ensure consistent fluid flow characteristics through the upstream set 50 of outlet fluid passages 47, thereby facilitating relative adjustments of the flow rate controllers 90 of the fluid flow controller 5.

A downstream set 52 of outlet fluid passages 47 includes each of the outlet fluid passages 47 from the downstream rank of controller bodies 22, and thus the downstream rank of flow rate controllers 90. In furtherance of Applicant's object to provide increased functionality within a highly compact form factor each of the downstream set 52 of outlet fluid passages 47 may be of minimal length. In the exemplary implementation of the preferred embodiment of the flow rate controller 90, the downstream end 49 of each of the downstream set 52 of outlet fluid passages 47, as terminates a corresponding outlet port 46, merges together with the upstream end 48 of the outlet fluid passage 47 at the fluid outlet provided through the controller body 22 for the respective flow rate controller 90. Accordingly, each of the downstream set 52 of outlet fluid passages 47 for the exemplary implementation both terminates the outlet port 46 and defines or is defined by the fluid outlet of the corresponding flow rate controller 90, whereat a single structure of the unitary assembly body 10 forms or otherwise provides each end of and the outlet fluid passage 47, and also the fluid outlet of the flow rate controller 90.

As previously noted, each independently adjustable flow rate controller 90 is configured or otherwise adapted to establish and maintain a set volumetric rate of fluid flow therethrough of a pressurized beverage fluid introduced to a corresponding discrete fluid flow path through the fluid flow controller 5. As described more fully herein, each flow rate controller 90 is adjusted or otherwise calibrated to establish and maintain a flow rate for a particular beverage fluid flowing therethrough that is volumetrically proportional in a desired ratio with the flow rate of another particular beverage fluid as established and maintained by a separate corresponding one of the implemented flow rate controllers 90. Typical countertop or freestanding post-mix beverage dispensers, which are not so limited in space as are hand-held beverage dispensers, generally include an integral set of independent flow rate controllers 90 dedicated to each post-mix beverage dispensed. Unlike countertop beverage dispensers, the implementation space for hand-held beverage dispensers is universally severely limited. Accordingly, hand-held beverage dispensers are generally configured or otherwise adapted for fluid communication with a single flow rate controlled source of each of a limited number of diluents, such as the common configuration including one flow rate controlled source of pressurized carbonated water—also known as soda or seltzer, and one flow rate controlled source of pressurized plain water—also known as still water.

As described more fully herein, the exemplary implementation of the fluid flow controller 5 includes one discrete fluid flow path through the assembly body 10 that is utilized to provide a flow rate controlled first diluent, and a separate discrete fluid flow path through the assembly body 10 that is utilized to provide a flow rate controlled second diluent. Each discrete fluid flow path through the assembly body 10 that is not utilized to provide a flow rate controlled diluent may then be utilized to provide a typically distinct flow rate controlled beverage product. To more readily illustrate the preferred exemplary implementation, a "diluent outlet path" includes a flow rate controller 90 as operably arranged with a fluid flow path designated for supply of a diluent, and all aspects of the designated fluid flow path from the flow rate controller 90 to and through the respective outlet port 46. Similarly, a "product outlet path" includes a flow rate controller 90 as operably arranged with a fluid flow path designated for supply of a beverage product, and all aspects of the designated fluid flow path from the flow rate controller 90 to and through the respective outlet port 46. For clarity, "aspects of the fluid flow path from a flow rate controller 90," as characterize a diluent outlet path or a product outlet path, include the fluid outlet provided through the controller body 22 for the respective flow rate controller 90, and any other aspect of the controller body 22 affecting fluid flow from a flow rate controller 90 into or through the respective outlet fluid passage 47.

In accordance with the exemplary implementation of the fluid flow controller 5, each implemented diluent outlet path is cooperatively configured or otherwise adapted with each product outlet path to pairwise provide a flow rate controlled source of a diluent and a flow rate controlled source of a post-mix beverage product, wherein each source of a post-mix beverage product is provided with the correspondingly provided diluent in a user selected volumetric ratio, as specified for the particular combination of beverage product and diluent. Thus as described, any two discrete fluid flow paths through the assembly body 10 may be selected by a user for providing first and second diluents, and any discrete fluid flow path through the assembly body 10 not selected by the user for providing a diluent may be selected by the user for providing a first beverage product concurrently with either the first or second diluent as selected by the user, in accordance with the configuration of any otherwise compatible user selected downstream consumer of pressurized fluid, and in the volumetric ratio specified for the beverage product and selected diluent. Having selected the discrete fluid flow paths through the assembly body 10 for providing the first and second diluents and first beverage product, each discrete fluid flow path not selected by the user for providing a diluent, the first beverage product, or a subsequently provisioned beverage product may be selected by the user for providing a further beverage product concurrently with either the first or second diluent as selected by the user, in accordance with the configuration of the downstream consumer of pressurized fluid, and in the volumetric ratio specified for the further beverage product and selected diluent.

Figure 11A:
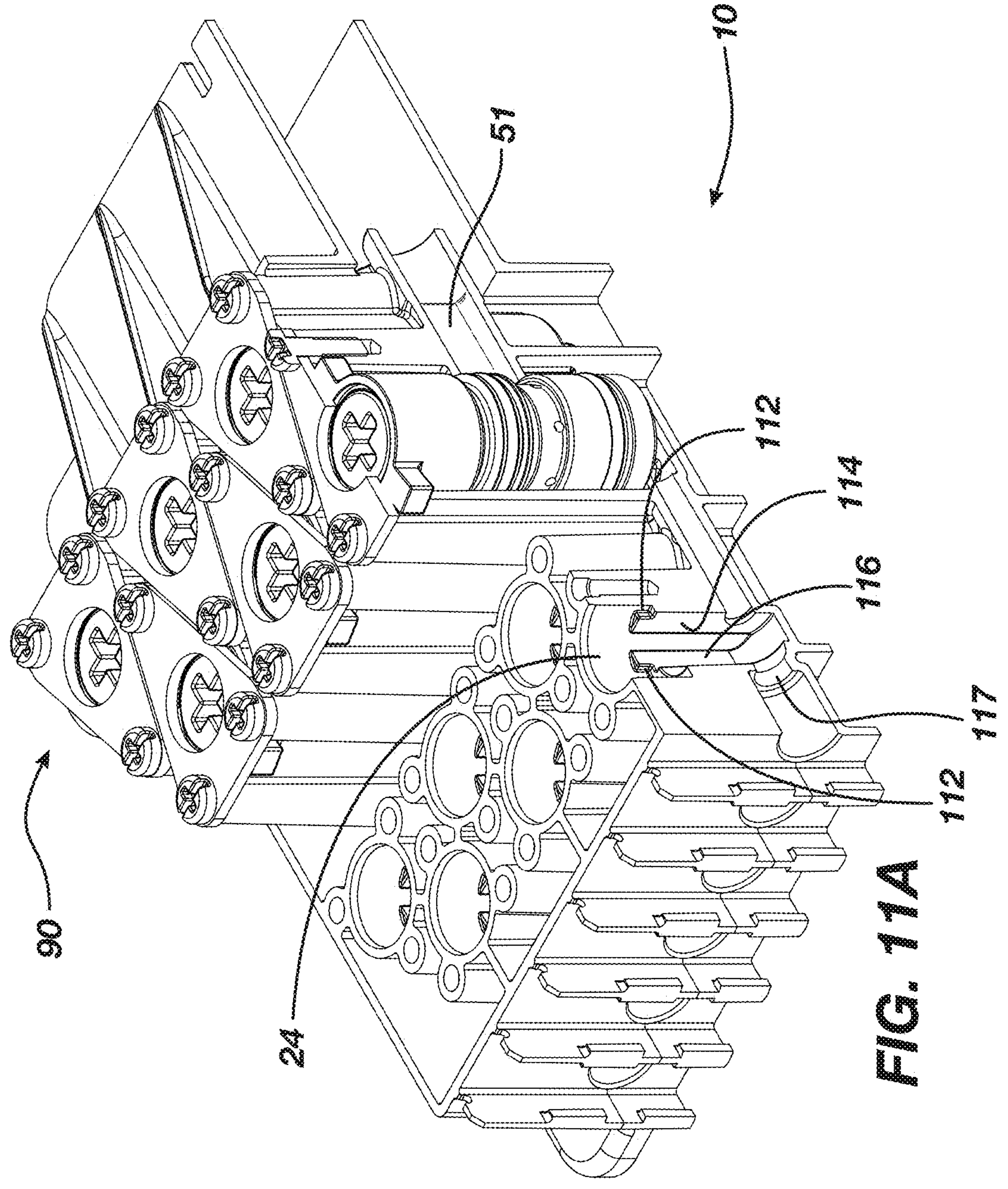
FIGS. 11A-11B are isometric views of the view of FIG. 10 further illustrating the various aspects of the shutoff valve body and the flow rate controller, where.
Figure 11B:
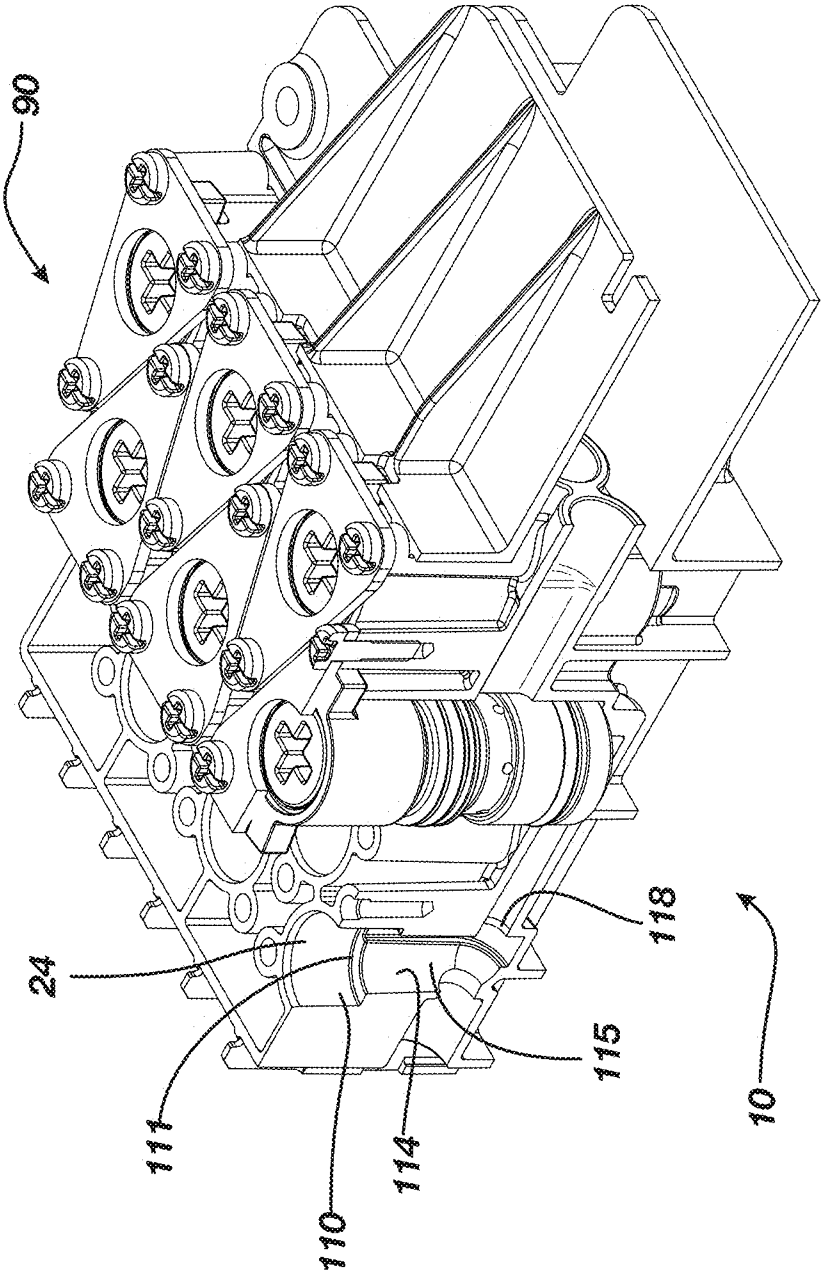
Figures 12C, 12D, 13A, 13B:
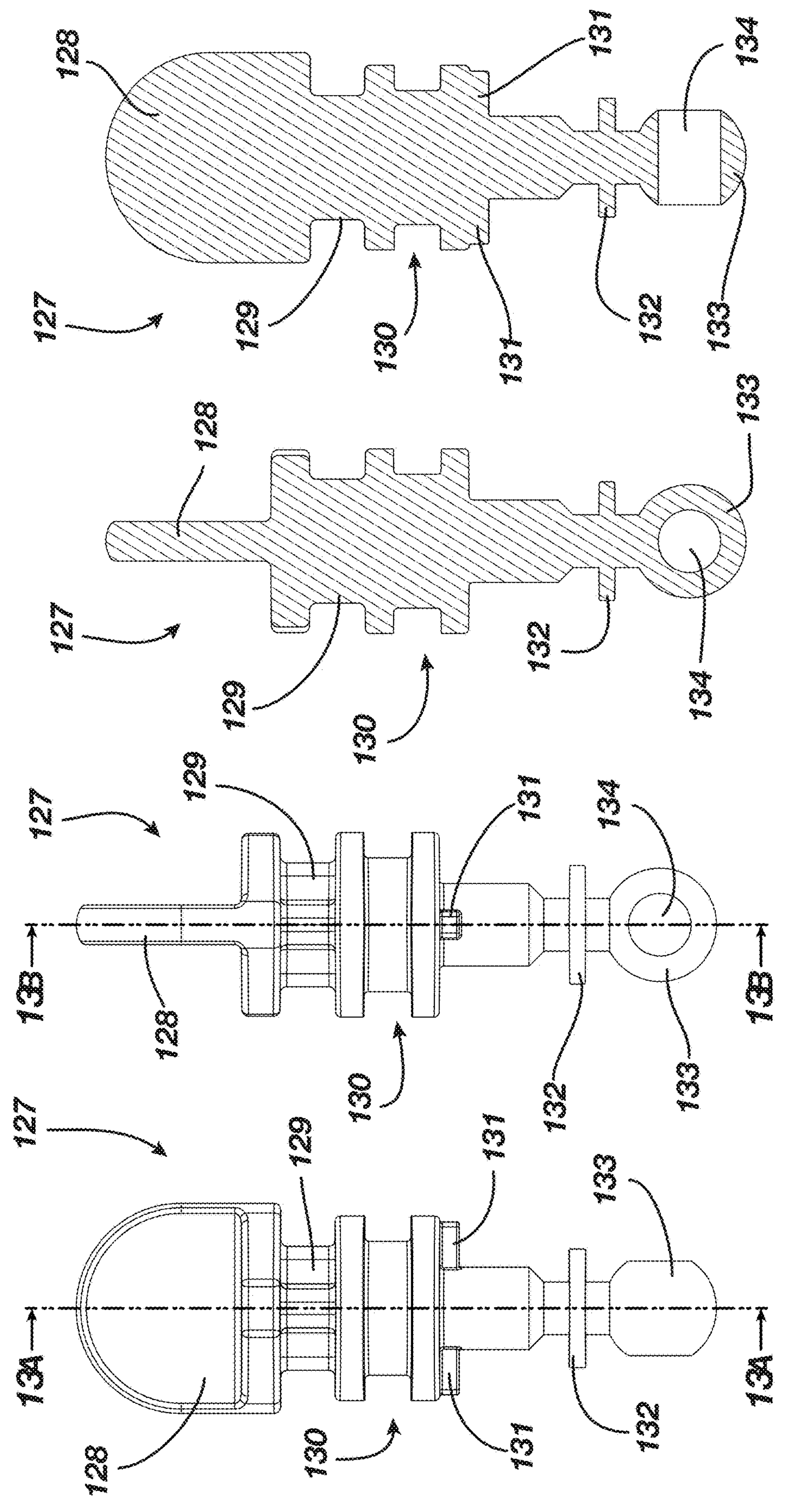
Figure 15:
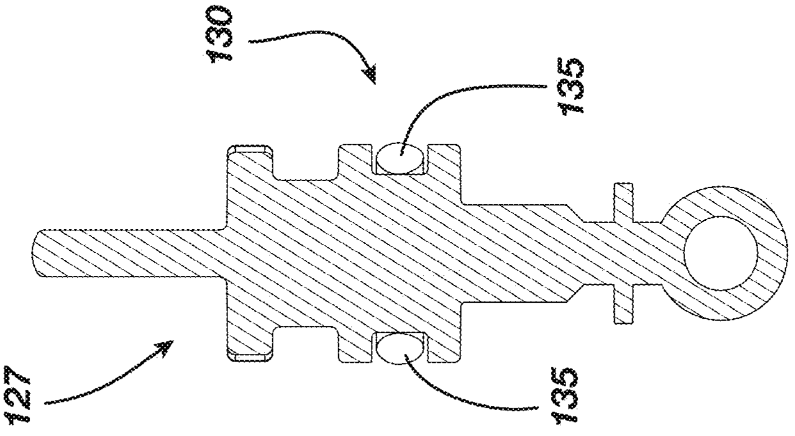
FIGS. 14A-14B and 15 illustrate various aspects of the integral valve trim member and a first seal for the integral valve trim member, where
Figure 14B:
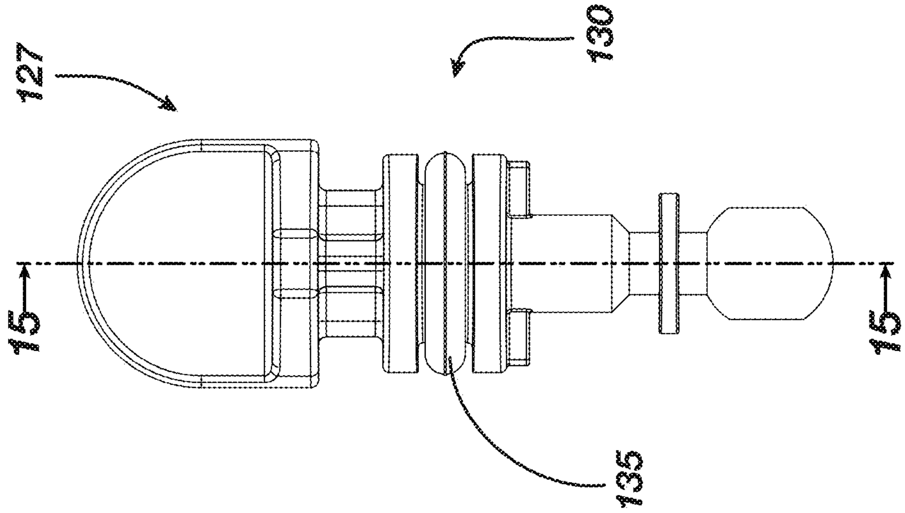
Figure 14A:
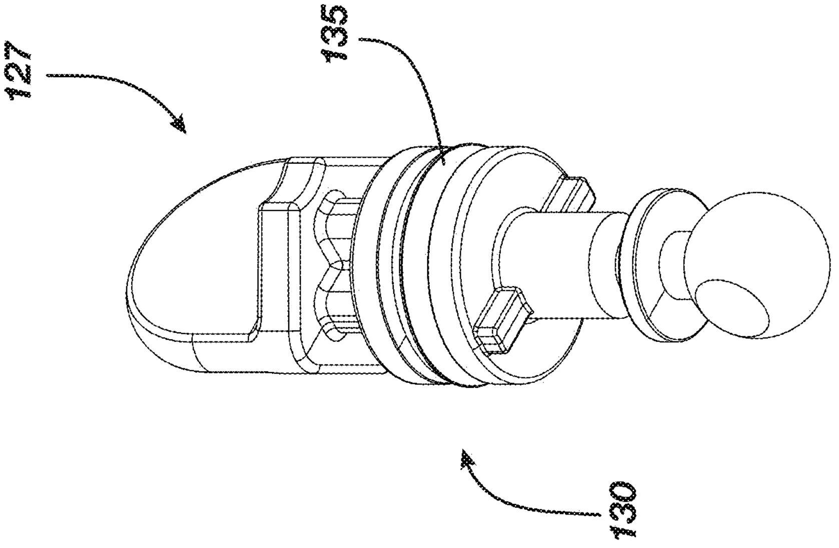
Figure 16:
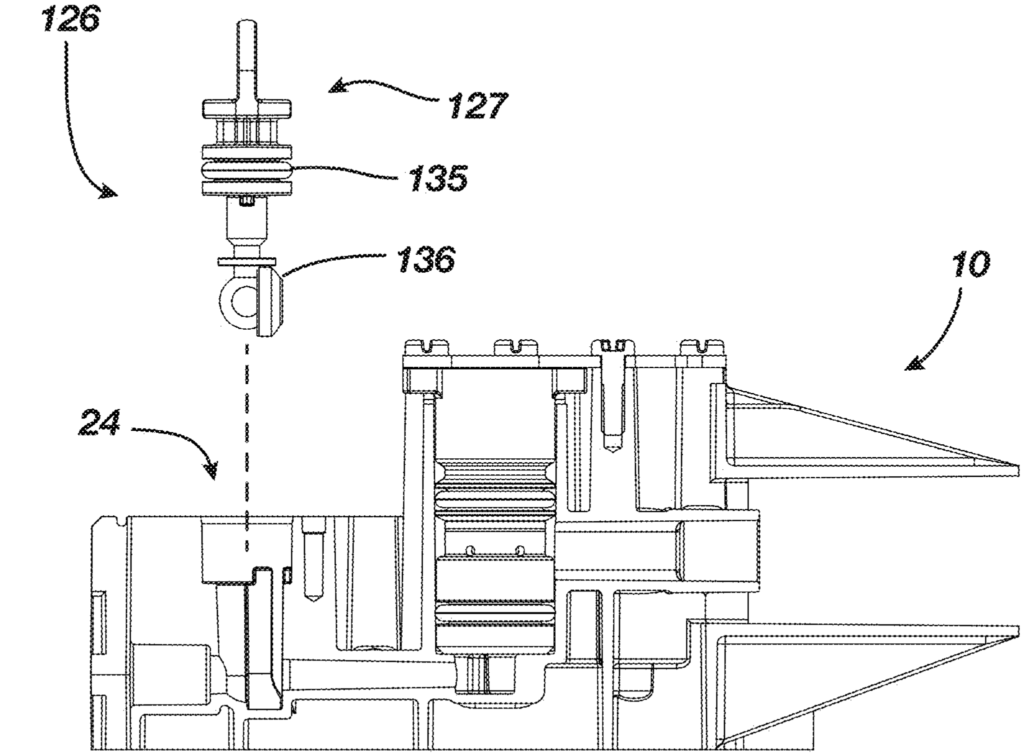
FIGS. 16-20 are side elevation views illustrating various aspects of the assembly body and flow rate controller, as depicted in the cross-sectional view of FIG. 10, and a shutoff valve trim assembly in various stages of operable insertion within the assembly body, where.
Figure 17:
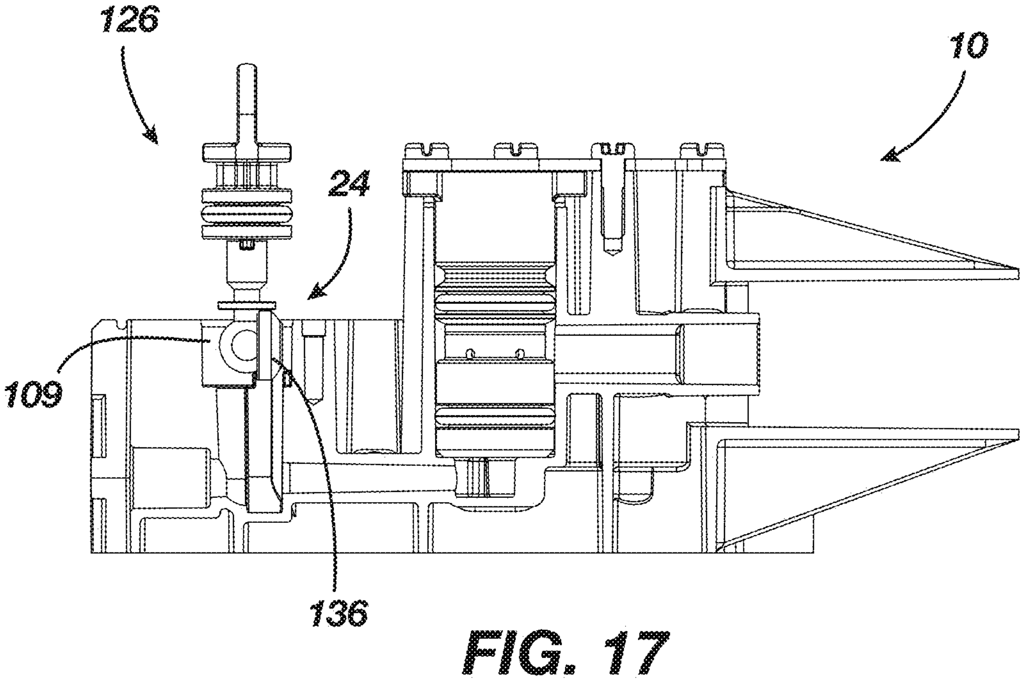
Figure 18:
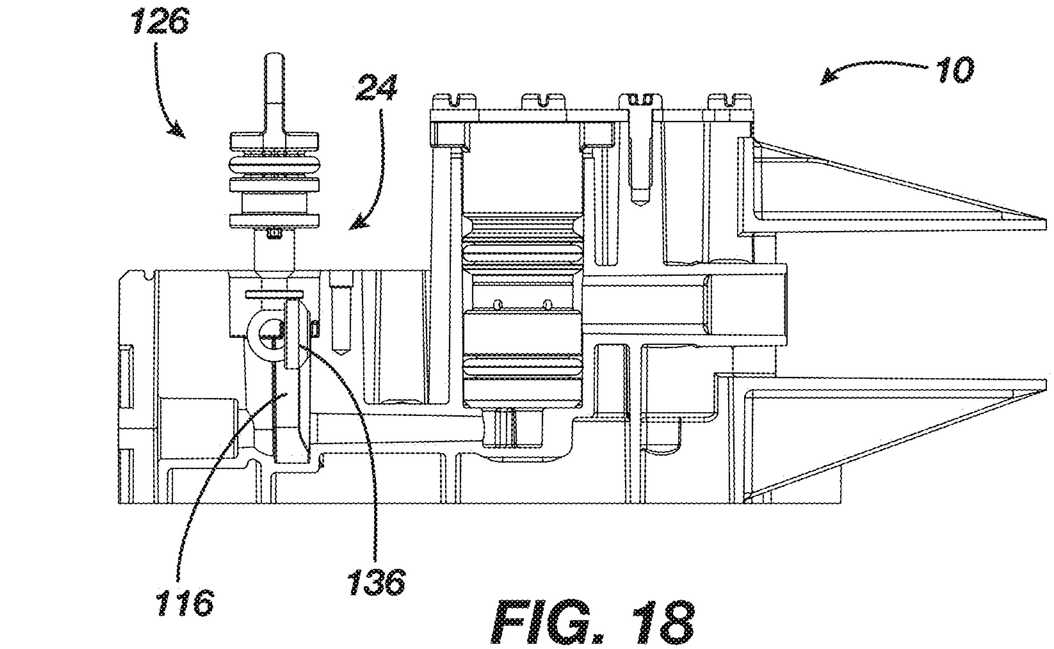
Figure 19:
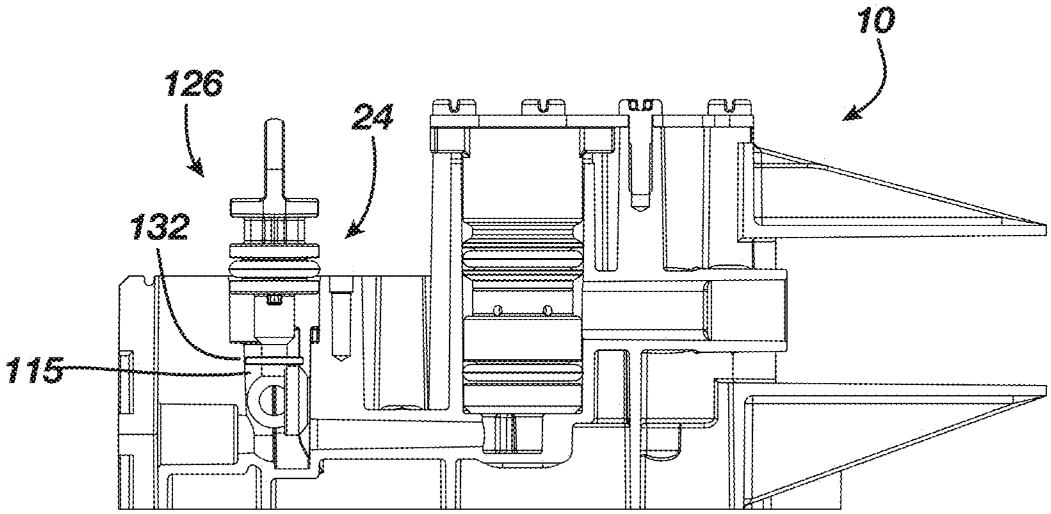
Figure 20:
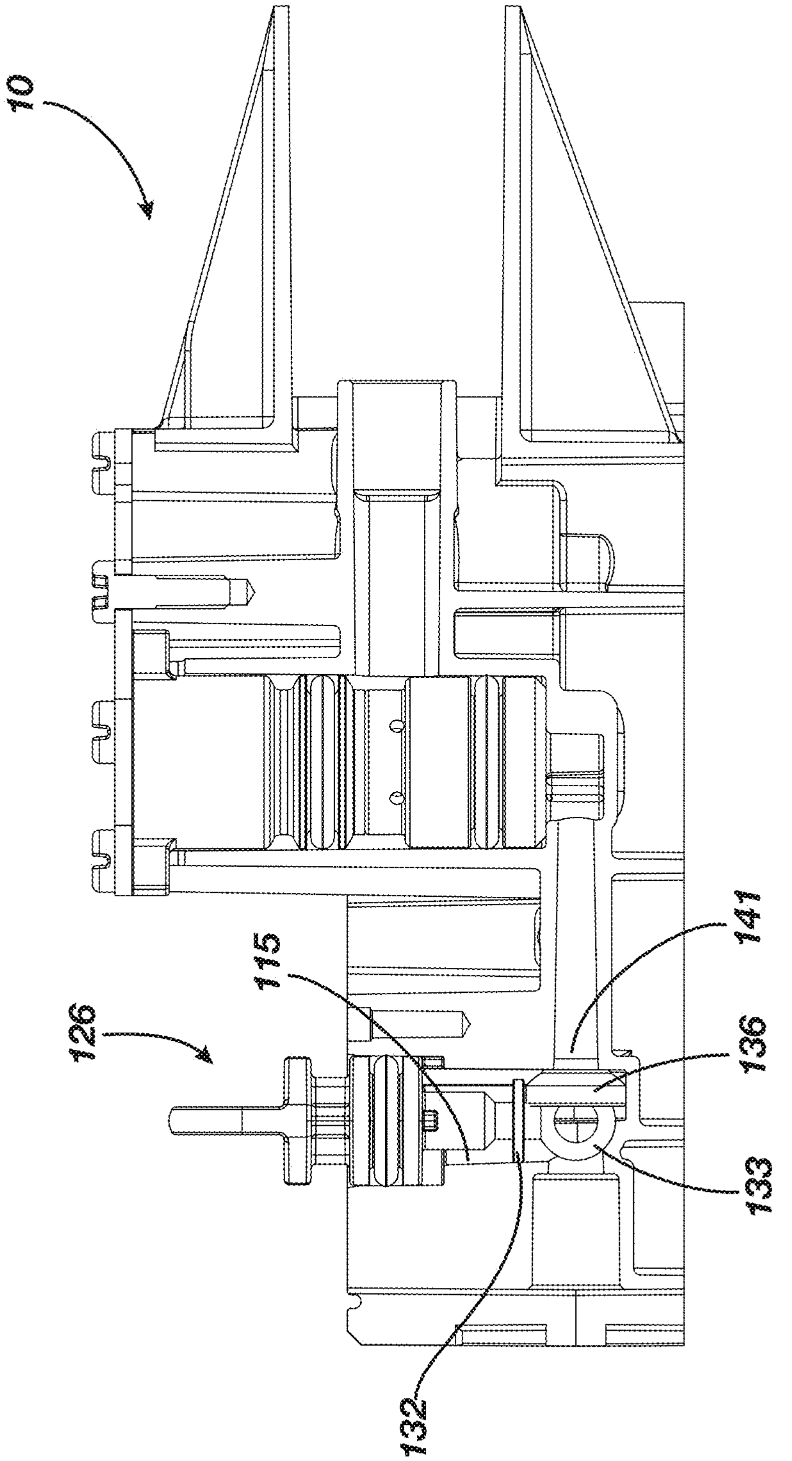
Figure 21A:
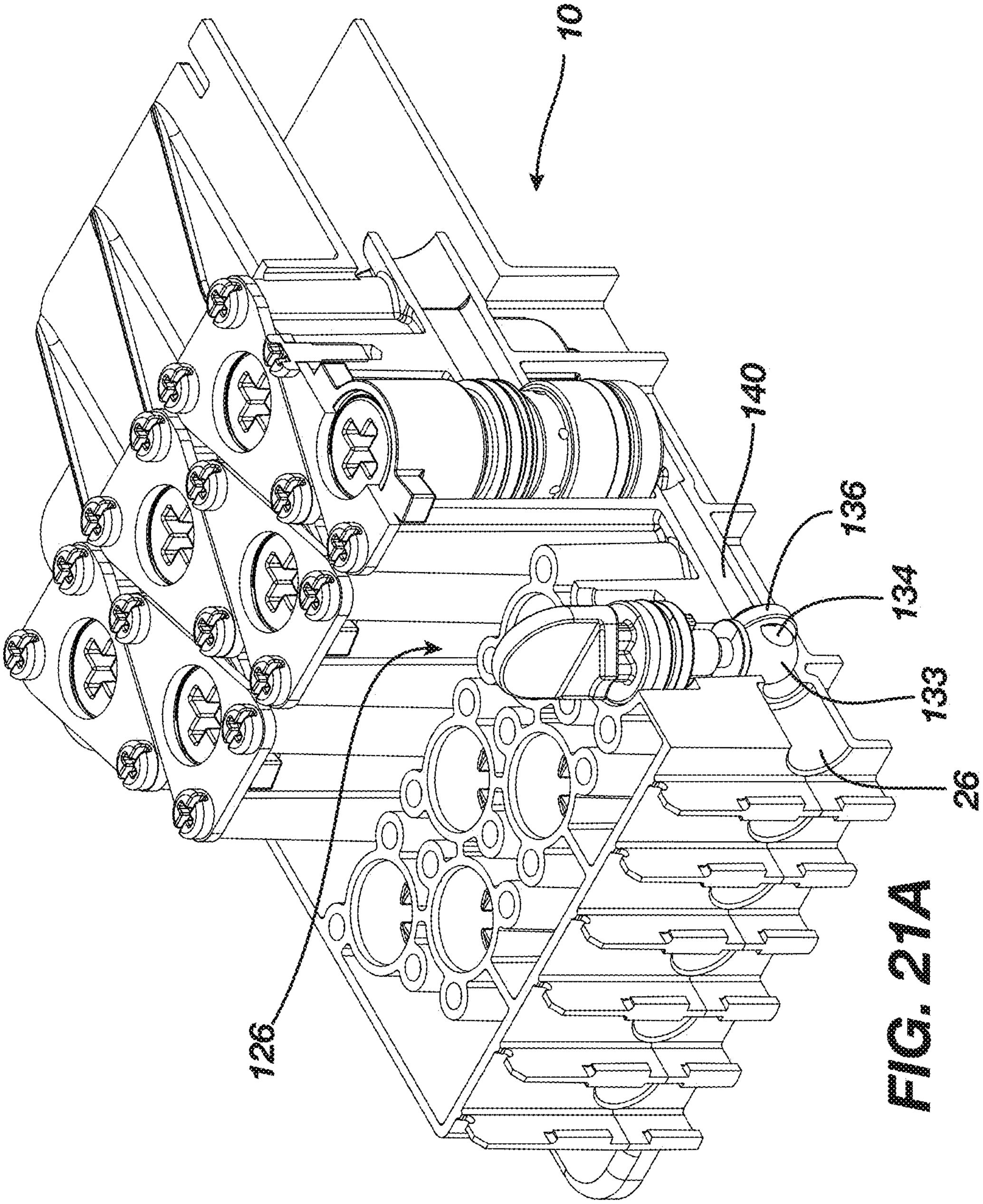
FIGS. 21A-21B illustrate various aspects of the shutoff valve trim assembly as operably positioned within the assembly body, where.
Figure 21B:
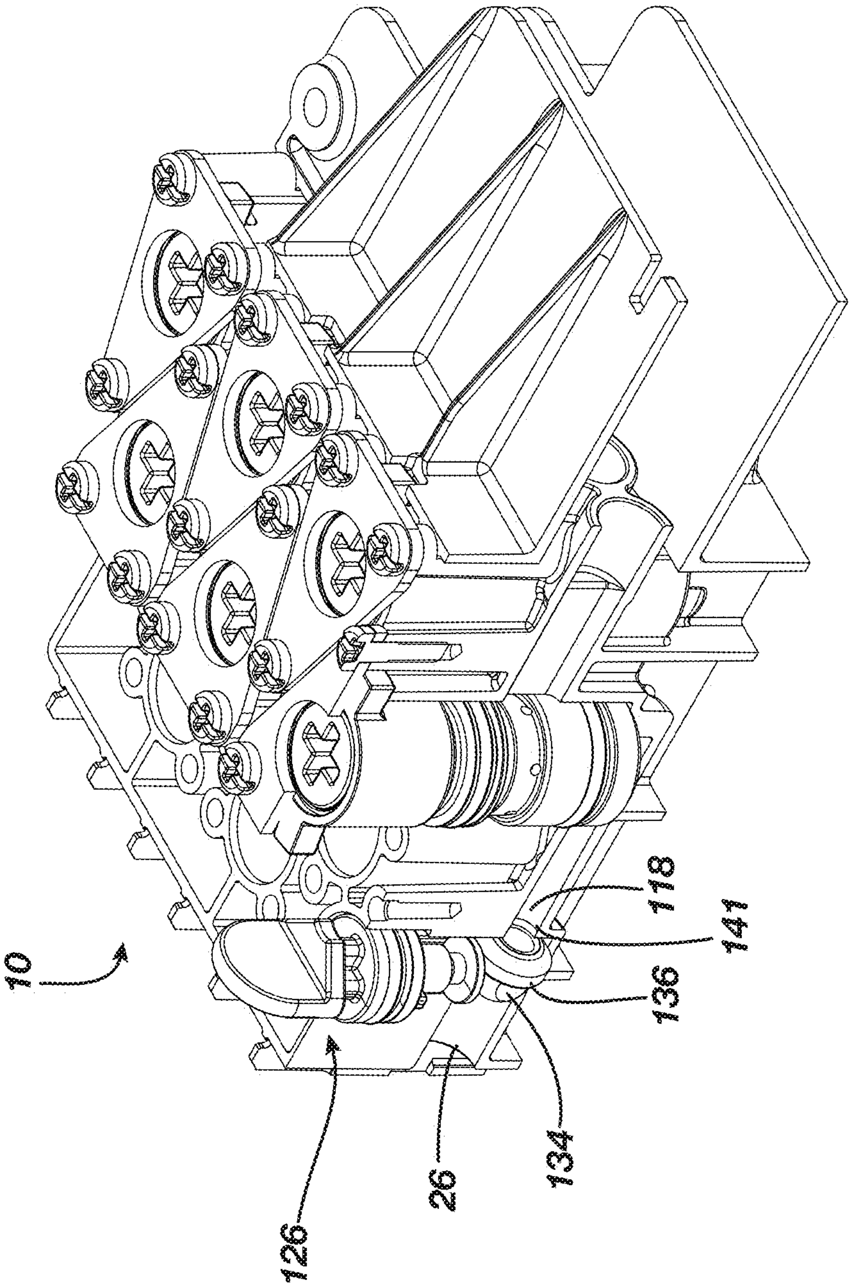
Figure 23:
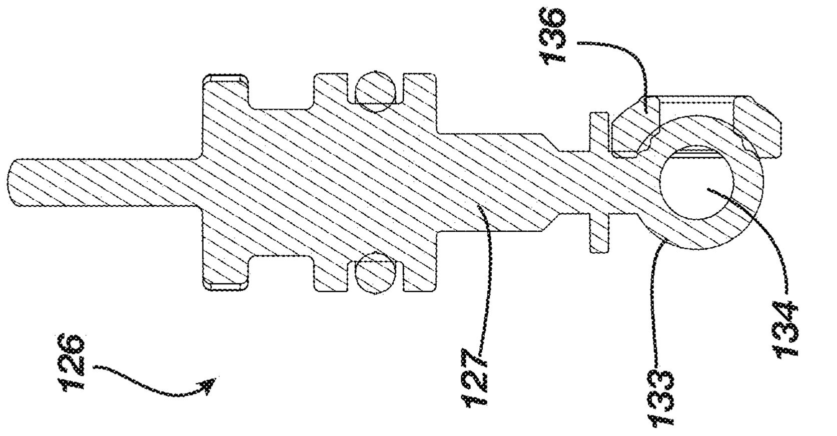
FIGS. 22A-22B and 23 illustrate various aspects of the integral valve trim member and the first seal and a second seal for the integral valve trim member, in a closed configuration also depicted in FIG. 20, and where.
Figure 22B:
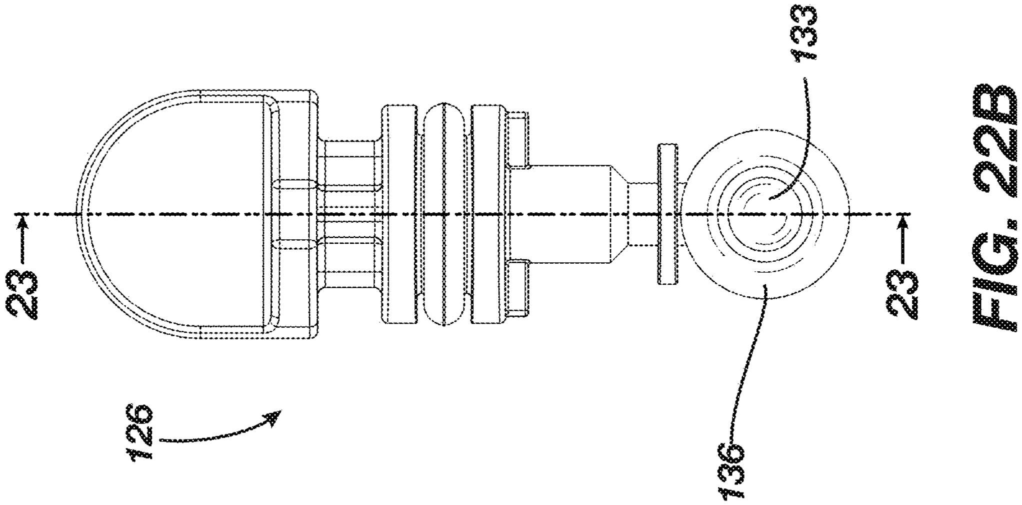
Figure 22A:
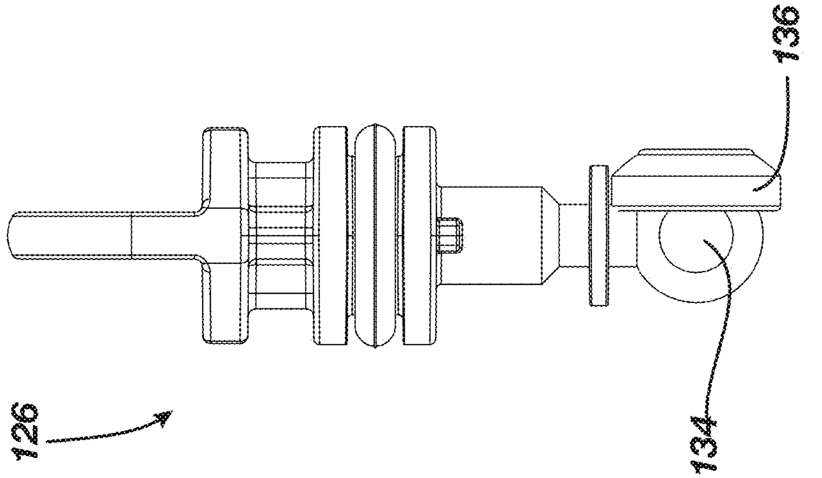
Figure 24:
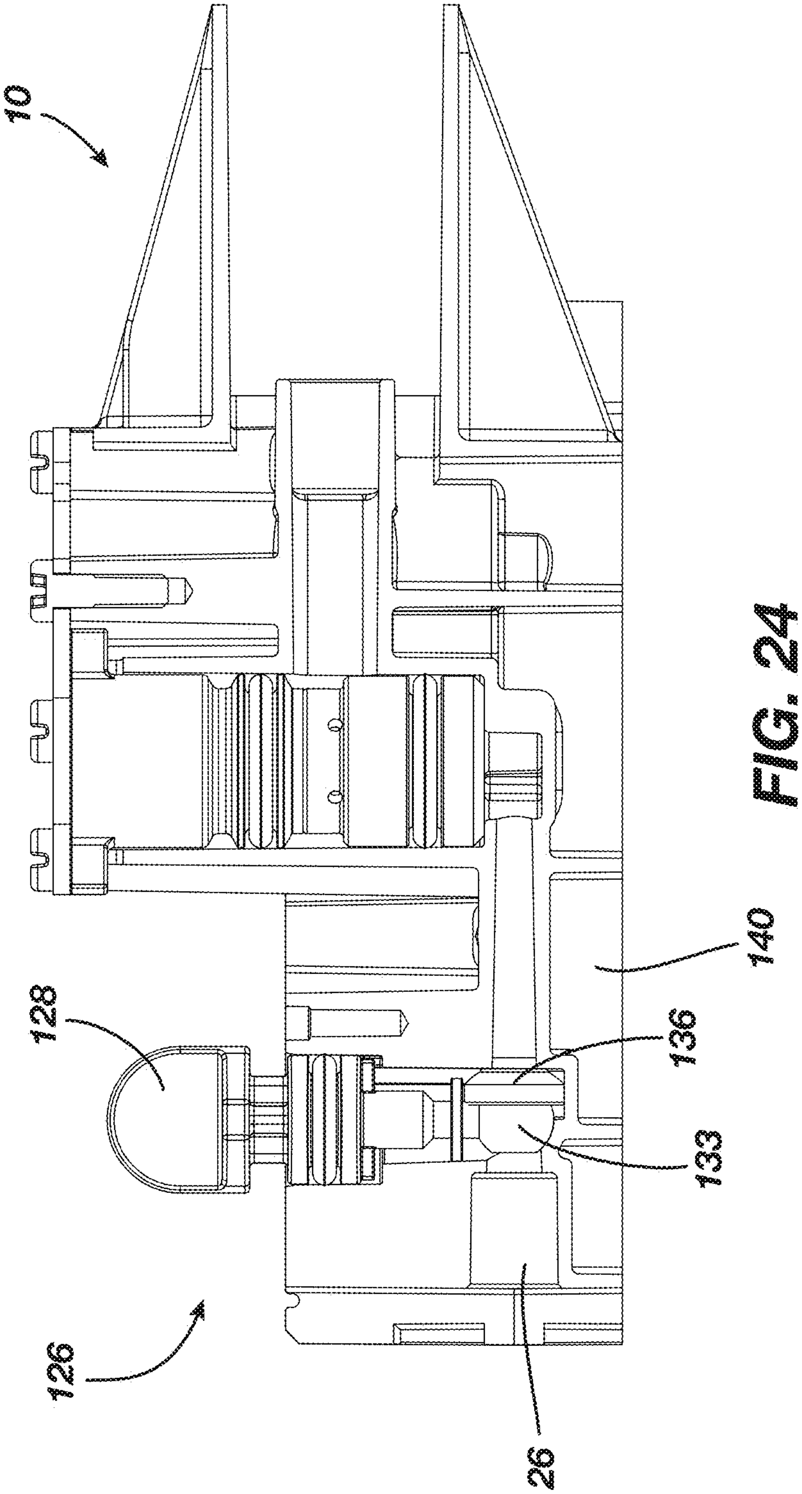
FIG. 24 is a side elevation view illustrating various aspects of the assembly body and flow rate controller, as depicted in the cross-sectional view of FIG. 10, and the shutoff valve in an open configuration.
Figure 25A:
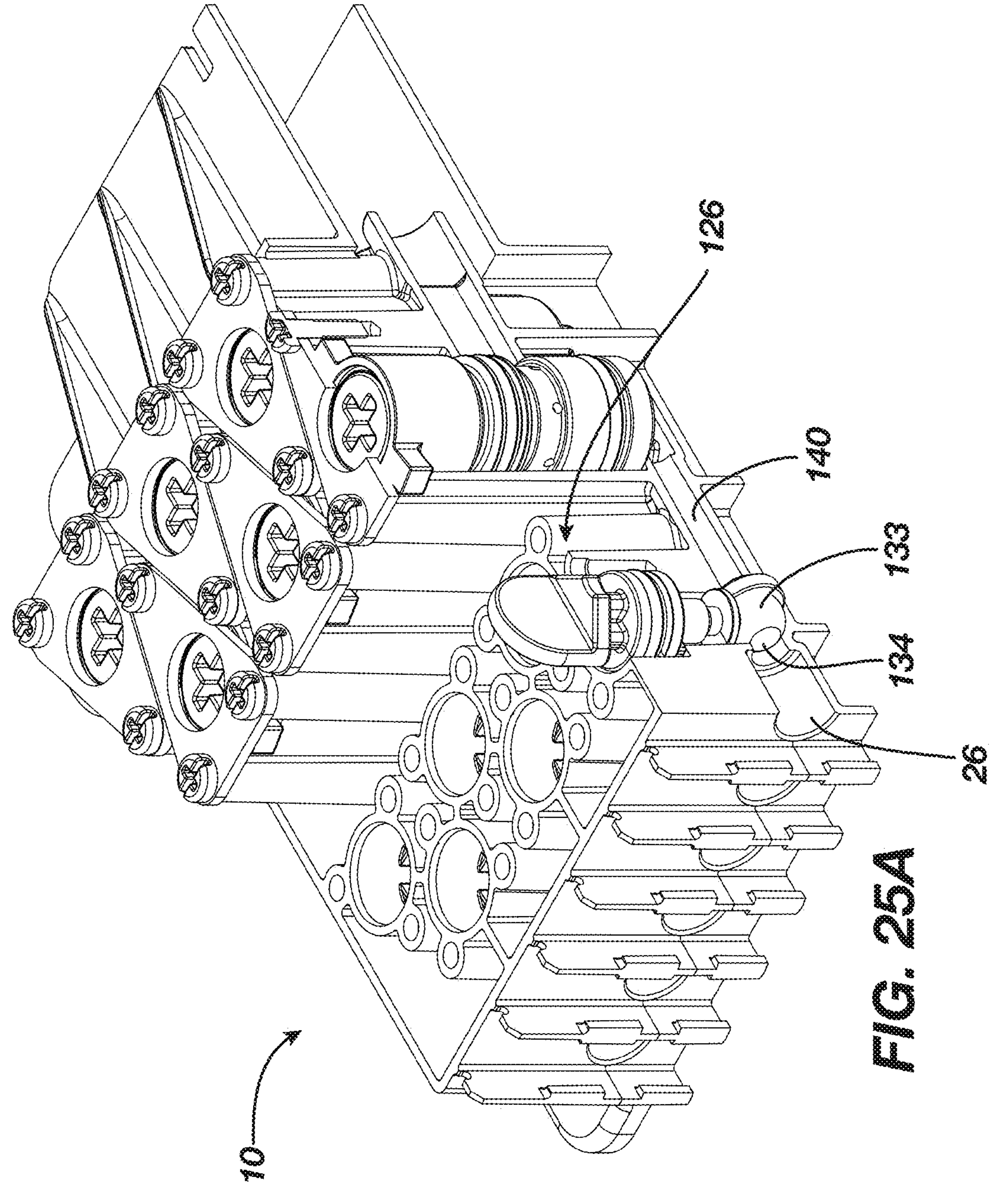
FIGS. 25A-25B illustrate various aspects of the shutoff valve in the open configuration, where.
Figure 25B:
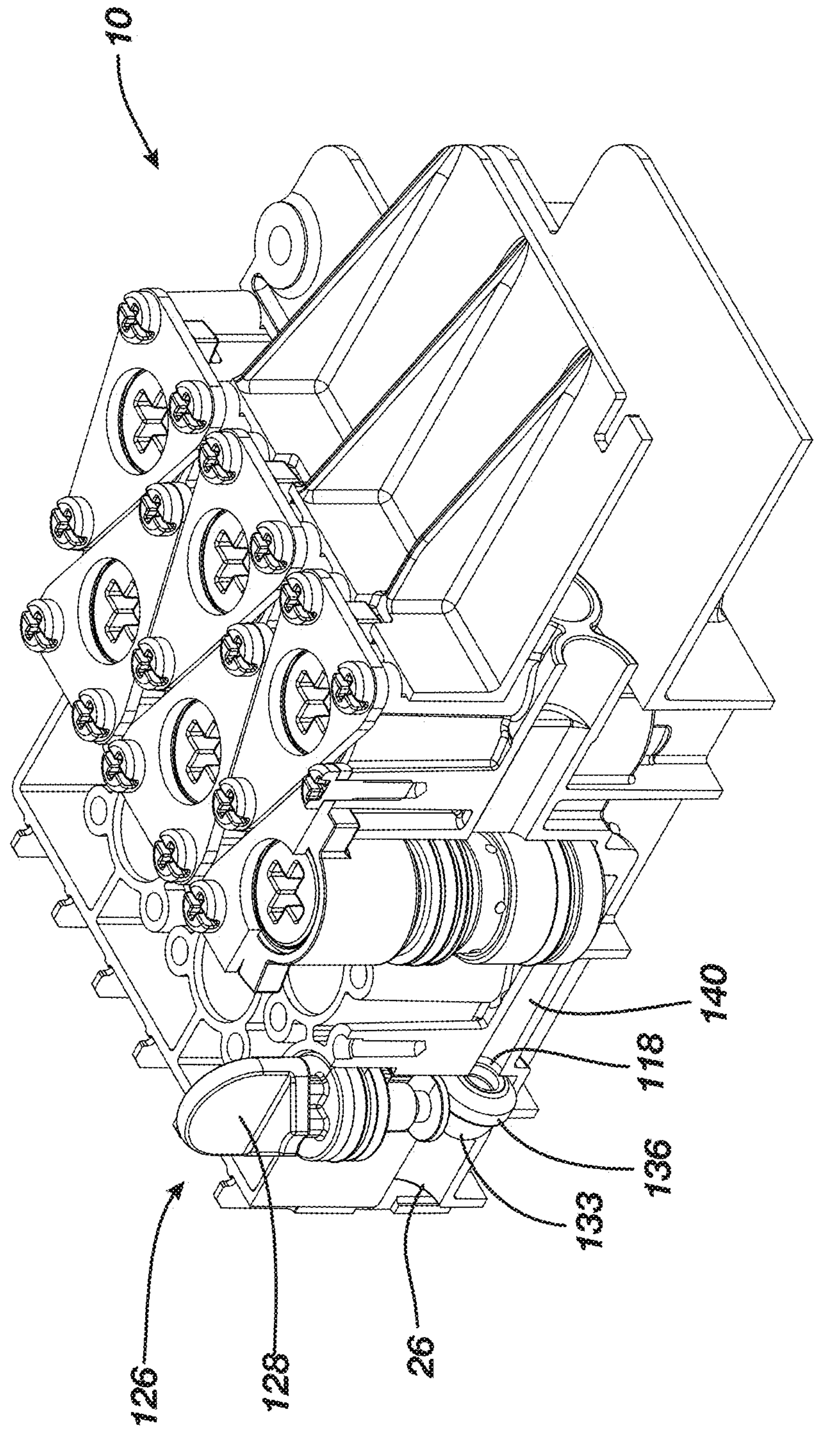
Figure 27:
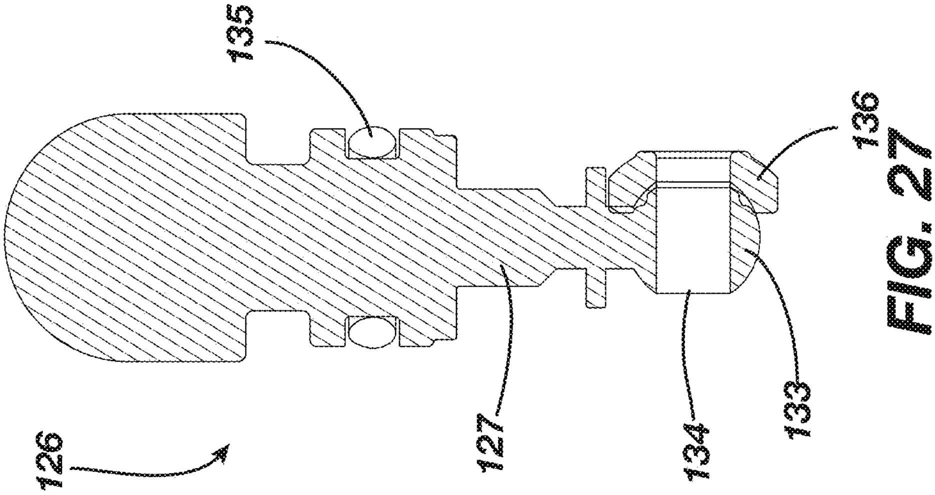
FIGS. 26A-26B and 27 illustrate various aspects of the integral valve trim member and the first seal and a second seal for the integral valve trim member, in the open configuration also depicted in FIG. 24, and where.
Figure 26B:
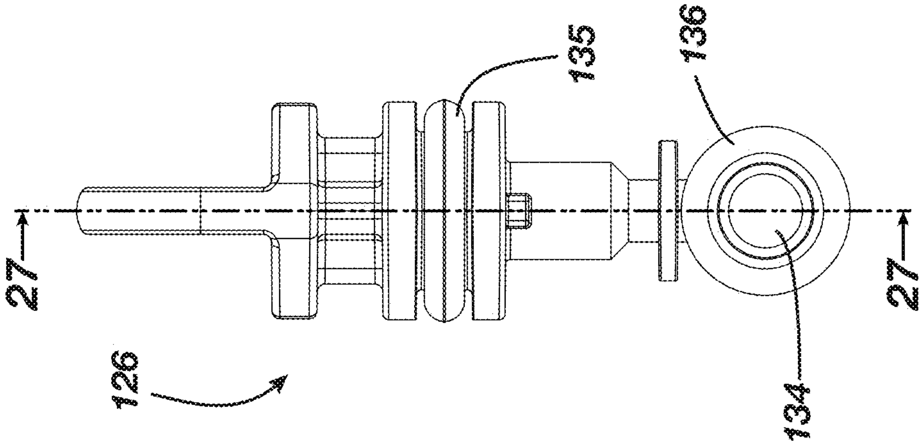
Figure 26A:
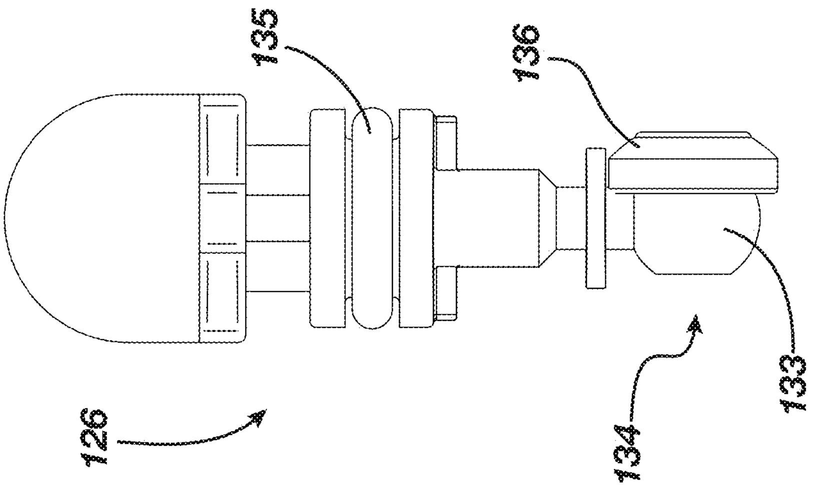

To facilitate the preferred cooperative adaptations of the diluent outlet paths and the product outlet paths, the aspects of the fluid flow path from the flow rate controller 90 to and through the outlet port 46 of each product outlet path preferably have substantially consistent fluid flow characteristics one to another. Because any fluid flow path through the assembly body 10 of the preferred implementation may implement a product outlet path, the aspects of each fluid flow path from a flow rate controller 90 to and through a respective outlet port 46 preferably have substantially consistent fluid flow characteristics one to another. Applicant has discovered that a suitable balance in the respective fluid flow capacities of the downstream set 52 of outlet fluid passages 47 and the upstream set 50 of outlet fluid passages 47 is readily implemented, within the objects of the present invention, through the exemplary implementation of the assembly body 10 of the fluid flow controller 5 as heretofore described. It is possible, however, that a particular implementation of the fluid flow controller 5 may include such structural differences in the implementations of the downstream set 52 and the upstream set 50 of outlet fluid passages 47 such that it is required, or for any reason it is otherwise desired, to provide additional balance between respective fluid flow capacities of the downstream set 52 and the upstream set 50 of outlet fluid passages 47. Therefore an alternative implementation of each outlet fluid passage 47 of the downstream set 52 additionally includes a compensatory flow constriction 53, which is sized, shaped, configured or otherwise provided to balance the fluid flow capacity of each of the downstream set 52 of outlet fluid passages 47 with the fluid flow capacity of each of the upstream set 50 of outlet fluid passages 47. Such a flow constriction 53 may be formed or otherwise provided as a curtain, as particularly illustrated in FIGS. 61-62, or as a weir, a narrowed portal or other fixed flow control, as are in light of this exemplary description within the level of ordinary skill in the relevant arts. Additionally, however, in an implementation of the fluid flow controller 5 where the downstream set 52 of outlet fluid passages 47 are of sufficient length notwithstanding a minimized form factor, each outlet fluid passage 47 of the downstream set 52 may include a specially implemented length 51 in substantially the same general form as that implemented for the upstream set 50 of outlet fluid passages 47, as illustrated in FIGS. 11A-11B absent adjacent controller bodies 22.

Various features are formed or otherwise provided at the front end 45 of the assembly body 10 of the fluid flow controller 5 to facilitate or enable receiving a fluid line attachment assembly operably in place at the front end 45 of the assembly body 10, and securing the fluid line attachment assembly thereat, as described more fully herein. In the exemplary implementation of the fluid flow controller 5, as particularly illustrated in FIGS. 3A-3F, these features include a frontally extending upper guide member 56 and a frontally extending lower guide member 64, each of which is specially formed as a unitary element of the assembly body 10, and which together cooperate with other aspects of the assembly body 10 to implement a fluid line attachment receptacle 55. The fluid line attachment receptacle 55 is cooperatively configured or otherwise adapted with a correspondingly provided fluid line attachment assembly, and attachment hardware as required, to provide a fluid line attachment arrangement for the fluid flow controller 5, as described more fully herein. A substantially planar upper engagement surface 57 is provided or otherwise formed on the upper guide member 56, and an opposing substantially planar lower engagement surface 65 is provided or otherwise formed on the upper guide member 56. The opposing upper and lower engagement surfaces 57, 65 are separated one from the other and otherwise configured or adapted to position, orient or otherwise locate the corresponding fluid line attachment assembly, as described more fully herein, as the fluid line attachment assembly engages the assembly body 10 of the fluid flow controller 5 of the present invention and is preferably affixed thereto.

In particular, the substantially planar upper engagement surface 57 is configured or otherwise adapted to frictionally but slidingly engage a corresponding first side of the fluid line attachment assembly, and the substantially planar lower engagement surface 65 is configured or otherwise adapted to concurrently frictionally but slidingly engage a corresponding second side of the fluid line attachment assembly. As described more fully herein, the upper and lower engagement surfaces 57, 65 are cooperatively adapted with the corresponding first and second sides of the fluid line attachment assembly for ensuring that the fluid line attachment assembly is correctly vertically aligned with the assembly body 10 prior to engagement or other contact with any outlet port 46 from the fluid flow controller 5 by or with any aspect of the fluid line assembly carried by the fluid line attachment assembly, or the fluid line attachment assembly itself, including any barbed quick-connect fitting or otherwise implemented fluid communicating connection hardware. Additionally, an alignment notch 67 is formed or otherwise provided at the distal end of the lower guide member 64, and is sized, shaped or otherwise cooperatively adapted with a corresponding insertion alignment tab of the fluid line attachment assembly for ensuring that the fluid line attachment assembly is both correctly oriented top-to-bottom and correctly horizontally aligned with the assembly body 10 prior to engagement or other contact with any outlet port 46 from the fluid flow controller 5 by or with any aspect of the fluid line assembly carried by the fluid line attachment assembly, or the fluid line attachment assembly itself, including any barbed quick-connect fitting or otherwise implemented connection hardware. To the extent that a corresponding insertion alignment tab or like feature may be suitably implemented as a feature of an otherwise compatible implementation of a fluid line attachment assembly, however, the alignment notch 67 or a like feature may be implemented as a feature of the upper guide member 56 or other aspect of the assembly body 10.

An upper set of stop notches 58 and a lower set of stop notches 66 are formed or otherwise provided in the upper and lower guide members 56, 64, respectively. Each of the provided stop notches 58, 66 is cooperatively sized, shaped, located or otherwise adapted with corresponding insertion stop wings of the fluid line attachment assembly to limit engagement of the fluid line attachment assembly with the fluid flow controller 5, thereby providing positive indication that the fluid line attachment assembly is fully operably engaged with the fluid flow controller 5. Threaded holes 61 are formed or otherwise provided in corresponding bosses 60 formed or otherwise provided on an exterior, top side 59 of the upper guide member 56 and clearance holes 70 are formed or otherwise provided in corresponding bosses 69 formed or otherwise provided on an exterior, bottom side 68 of the lower guide member 64. The threaded holes 61 and clearance holes 70 are pairwise axially aligned one to the other, and each pair of threaded and clearance holes 70 is sized, located or otherwise adapted to be axially aligned with a corresponding clearance hole formed or otherwise provided through the fluid line attachment assembly when the fluid line attachment assembly is operably engaged with the assembly body 10 of the fluid flow controller 5. As described more fully herein, attachment hardware, such as for example shoulder screws, pass through corresponding clearance holes 70 to engage with a corresponding threaded hole, thereby affixing a fully engaged fluid line attachment assembly operably in place with the fluid flow controller 5.

A plurality of gussets 63 are formed or otherwise provided between the exterior, top side 59 of the upper guide member 56 and an upper front wall 62 of the assembly body 10, thereby providing rigidity against flexion of the upper guide member 56. Similarly, a plurality of gussets 72 are formed or otherwise provided between the exterior, bottom side 68 of the lower guide member 64 and a lower front wall 71 of the assembly body 10, thereby providing rigidity against flexion of the lower guide member 64. Reinforcement of the upper guide member 56 and the lower guide member 64 protect the upper guide member 56 and the lower member from breaking away from the assembly body 10, especially as utilized to receive and secure a fluid line attachment assembly operably in place at the front end 45 of the assembly body 10. Reinforcement of the upper guide member 56 and the lower guide member 64 also ensures that the substantially planar upper engagement surface 57 of the upper guide member 56 and the substantially planar lower engagement surface 65 of the lower guide member 64 remain in substantially parallel planes, as illustrated for the exemplary implementation, or in any alternatively implemented relative orientation. In this manner, the upper guide member 56 and the lower guide member 64 are cooperatively adapted with the fluid line assembly to ensure that the barbed quick-connect fittings or otherwise implemented connection hardware are coaxially aligned with respective outlet ports 46 from the fluid flow controller 5 during engaged therewith, as described more fully herein. A plurality of the gussets 72 formed or otherwise provided between the exterior, bottom side 68 of the lower guide member 64 and the lower front wall 71 of the assembly body 10, however, are concurrently cooperatively configured or otherwise adapted as slot-engaging gussets with a specially formed splash cover, as described more fully herein, whereby the slot-engaging gussets form a part of a secure toolless attachment arrangement for the splash cover.

Figure 4A:
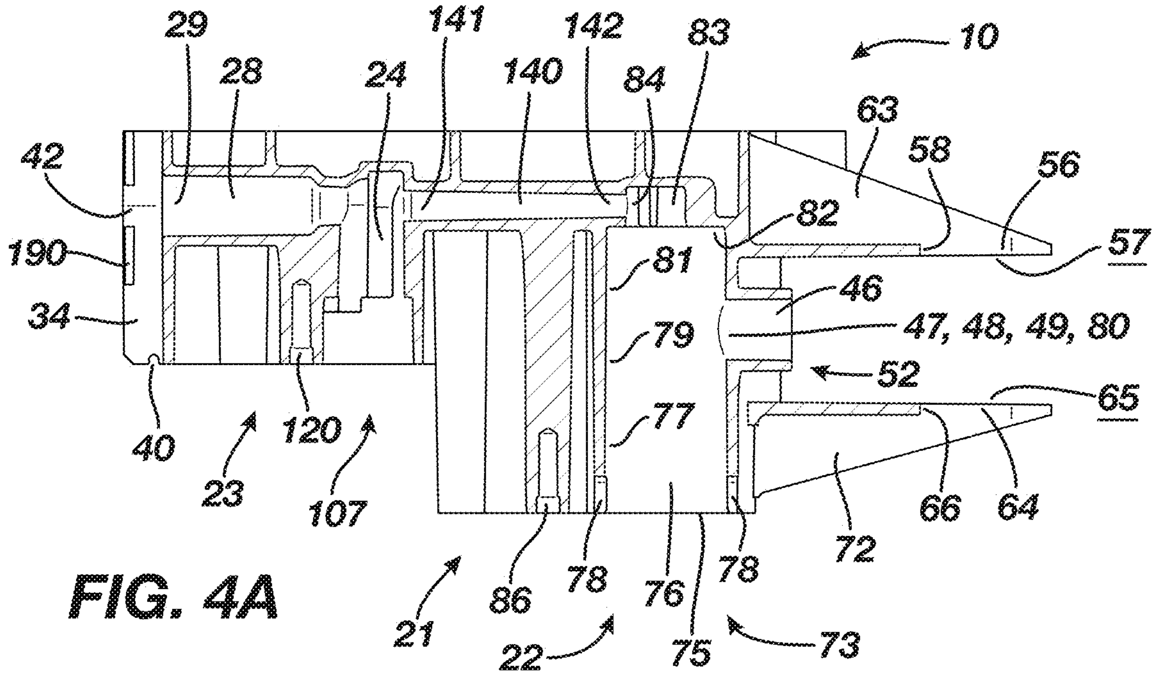
FIGS. 4A-4B are cross-sectional elevation views illustrating various internal aspects of the assembly body, where.
Figure 4B:
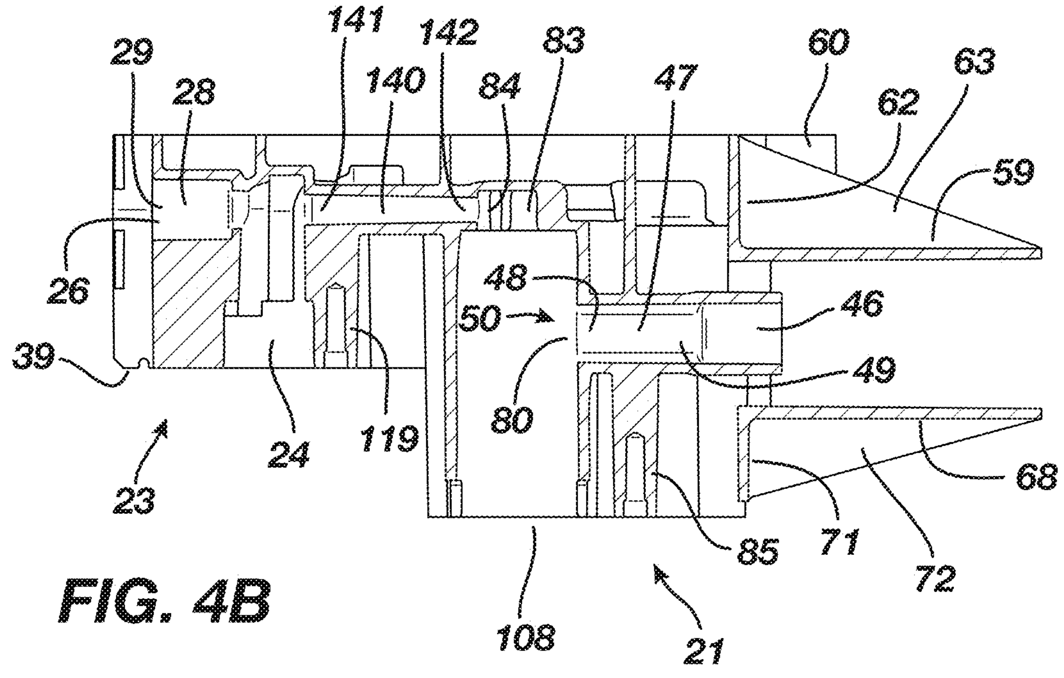

FIGS. 4A-4B illustrate a ranked arrangement of the controller bodies 22—and thus the flow rate controllers 90—implemented in the first tier 21 of the bottom side 20 of the assembly body 10, wherein the controller bodies 22 are divided into a downstream rank 73, shown in FIG. 4A, and an upstream rank 74, shown in FIG. 4B. The downstream and upstream ranks 73, 74 are substantially identically formed or otherwise provided, but are laterally offset one to the other by a distance one half that of the controller body-to-controller body distribution, as particularly illustrated in FIG. 3D. As described more fully herein, the ranked arrangement of the controller 22 bodies in particular enables minimization of the width side-to-side of the assembly body 10.

Each controller body 22 includes an open orifice 75 into a generally cylindrical chamber 76, which includes a proximal cylindrical sidewall 77, an intermediate cylindrical sidewall 79, and a distal cylindrical sidewall 81. The proximal cylindrical sidewall 77 is generally defined by and between the open orifice 75 of the controller body 22 and the intermediate cylindrical sidewall 79, which is defined by the extents of a fluid outlet 80 for the flow rate controller 90 that is formed or otherwise provided through the generally cylindrical chamber 76 of the controller body 22. The distal cylindrical sidewall 81 is generally defined by and between the intermediate cylindrical sidewall 79 and a substantially planar annular shoulder 82 at the distal end of the generally cylindrical chamber 76. The annular shoulder 82 bounds a passage between a fluid flow coupling dome 83 and the generally cylindrical chamber 76.

As described more fully herein, the fluid flow coupling dome 83 provides operably unobstructed fluid flow through a fluid inlet 84 in open fluid communication with an inter-body fluid conduit, which provides fluid communication between a corresponding shutoff valve body 24 and the generally cylindrical chamber 76 of the controller body 22. The provided fluid outlet 80, on the other hand, provides unobstructed fluid flow from the generally cylindrical chamber 76 of the controller body 22 to a corresponding outlet port 46 from the assembly body 10. In particular, the outlet port 46 is sized, shaped or otherwise adapted for passage of a fluid to and through the corresponding outlet port 46 at the rate established by the flow rate controller 90.

Pairwise formed or otherwise provided notches 78 breach the proximal sidewall through the open orifice 75 of each controller body 22 and are sized, shaped or otherwise configured to conformingly capture a corresponding pair of radially projecting ears 95 formed or otherwise provided about the proximal end of a bonnet 94 implemented as a component of the controller trim 91 of the flow rate controllers 90, and to thereby arrest rotation of the bonnet 94 as described more fully herein. In accordance with and in furtherance of the desired optimizations of the assembly body 10 in general, a multiplicity of fastener holes 86 is formed or otherwise provided in upwardly oriented bosses 85, which are formed or otherwise provided through the first tier 21 in a preferably uniform arrangement about each of the controller bodies 22. In the exemplary implementation of the fluid flow controller 5, each fastener hole 86 is formed or otherwise provided as one of a set of three fastener holes 86 disposed in a uniform arrangement about the respective open orifice 75 of the controller body 22.

Figure 5:
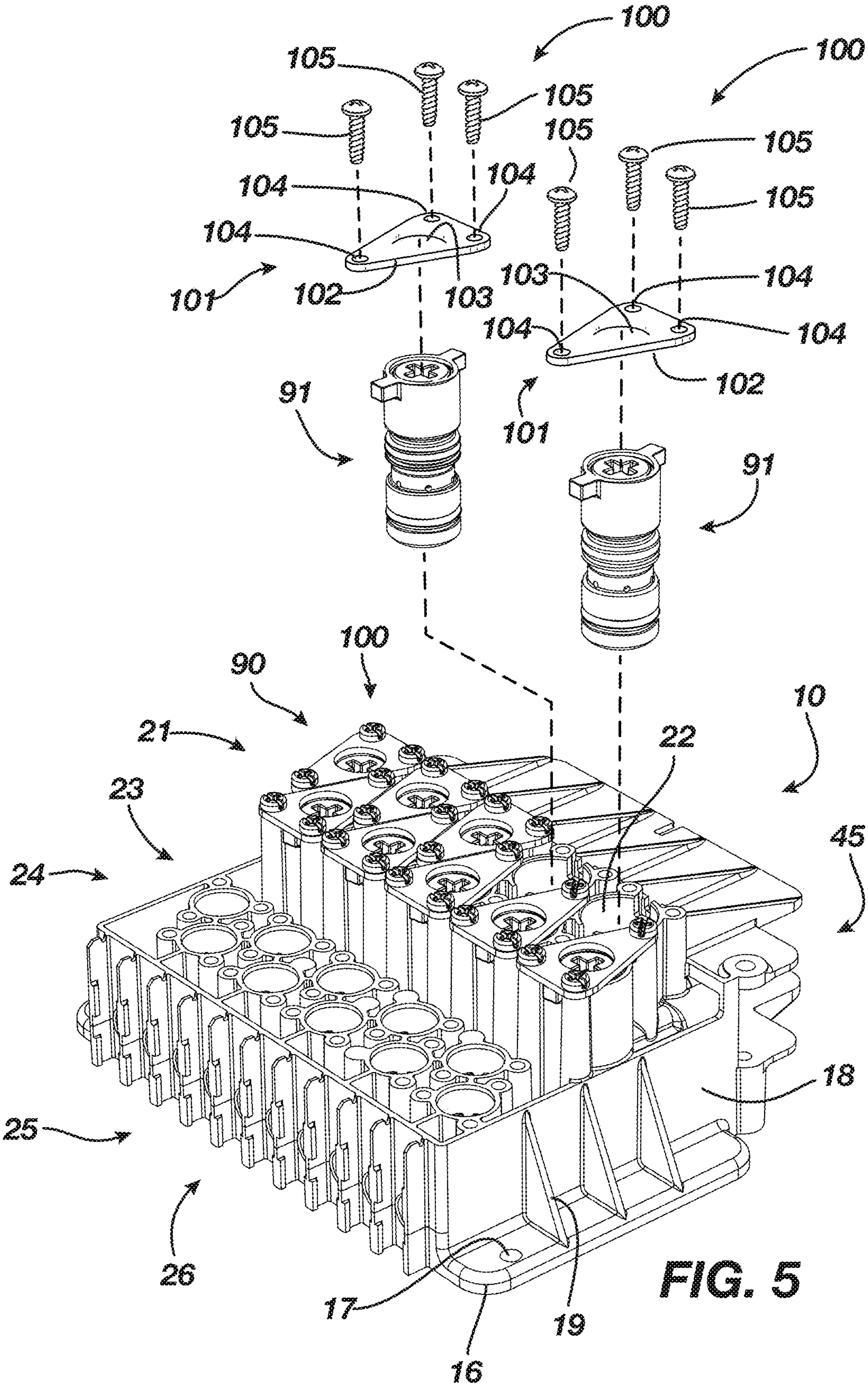
FIG. 5 is a partially exploded bottom rear isometric view illustrating various aspects of the securement within the assembly body of flow rate controllers.

As particularly illustrated in FIG. 5, the controller bodies 22 are readily accessible for removal and replacement or rebuilding or other maintenance or configuration change of a flow rate controller 90, without need to interrupt service beyond the particular controller of interest. As described more fully herein, the process is as simple as shutting off fluid flow through the affected flow rate controller 90, removing a set of fasteners and the corresponding controller trim retainer arrangement, and then removing the controller trim 91 of interest.

Figure 6A:
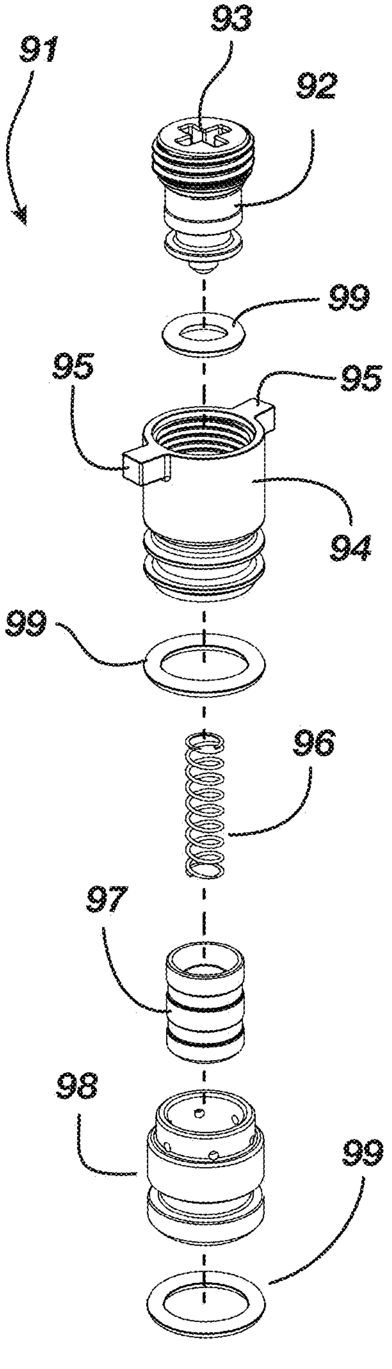
FIGS. 6A-6B are exploded isometric views illustrating various aspects of the flow rate controllers, where.
Figure 6B:
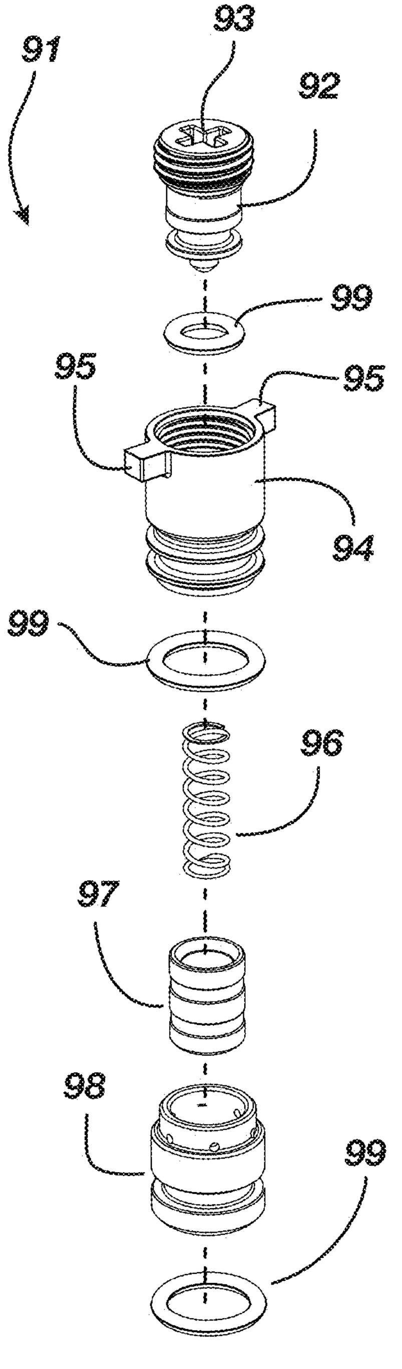

Each flow rate controller 90 for the exemplary fluid flow controller is implemented using a typical arrangement of flow rate controller 90 trim, which is well known to those of ordinary skill in the relevant arts. As illustrated in FIGS. 6A-6B, the flow rate controller 90 trim for each flow rate controller 90 generally includes a flow rate adjustment 92, a bonnet 94, a compression type piston spring 96, a typically ceramic piston 97, a piston sleeve 98, and various seals 99.

In the exemplary implementation, a Phillips head socket 93 is provided for the flow rate adjustment 92, whereby the spring compression may be adjusted to increase or decrease the fluid flow rate through the flow rate controller 90. To this end, the bonnet 94 includes a pair of ears 95 configured or otherwise adapted for use with the previously described pairwise provided notches 78 through the proximal sidewall of a corresponding controller body 22 to arrest rotation of the bonnet 94 during adjustment of the flow rate.

FIGS. 6A-6B also illustrate the ability to adapt any one of the flow rate controllers 90 for use with either a beverage product or a diluent, the latter of which is generally dispensed at a rate on the order of five times that at which a beverage product is dispensed. In particular, flow rate controller trim 91 in FIG. 6B depicts a piston spring 96 and accommodating ceramic piston 97 for use with a diluent, wherefore the piston spring 96 of FIG. 6B depicts a piston spring 96 with a much greater spring rate than that of FIG. 6A, which is configured for use with a beverage product as opposed to a diluent.

Figure 7A:
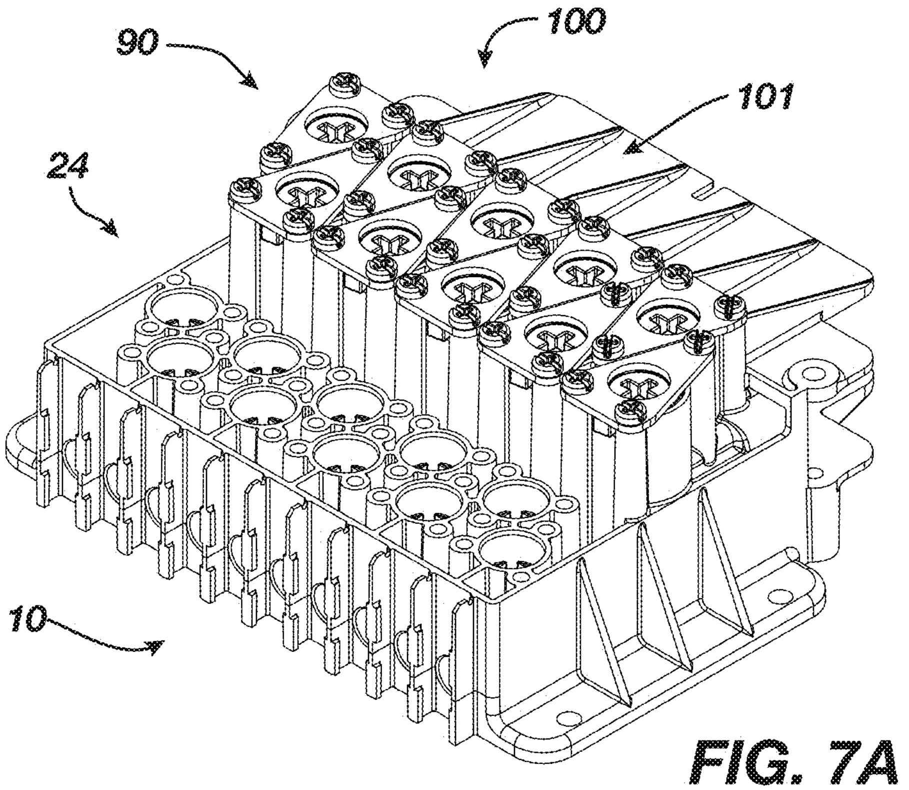
FIGS. 7A-7B illustrate various external aspects of fully implemented flow rate controllers as operably configured for use, where.
Figure 8A:
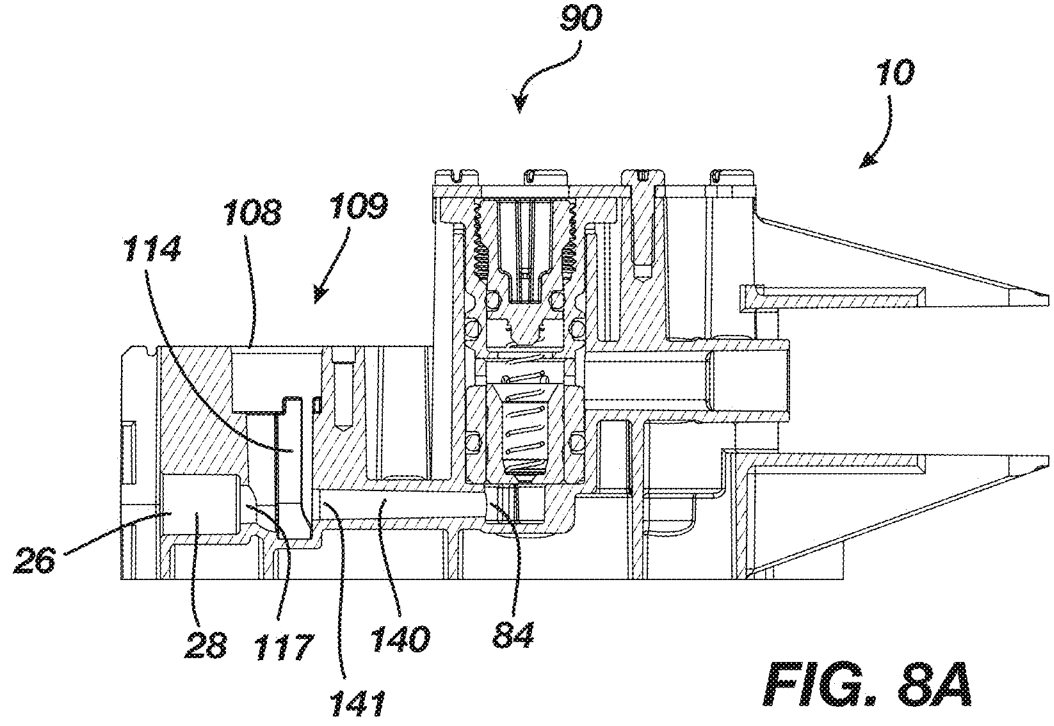
FIGS. 8A-8B are cross-sectional elevation views illustrating various internal aspects of the fully implemented flow rate controllers as operably configured for use, where.
Figure 7B:
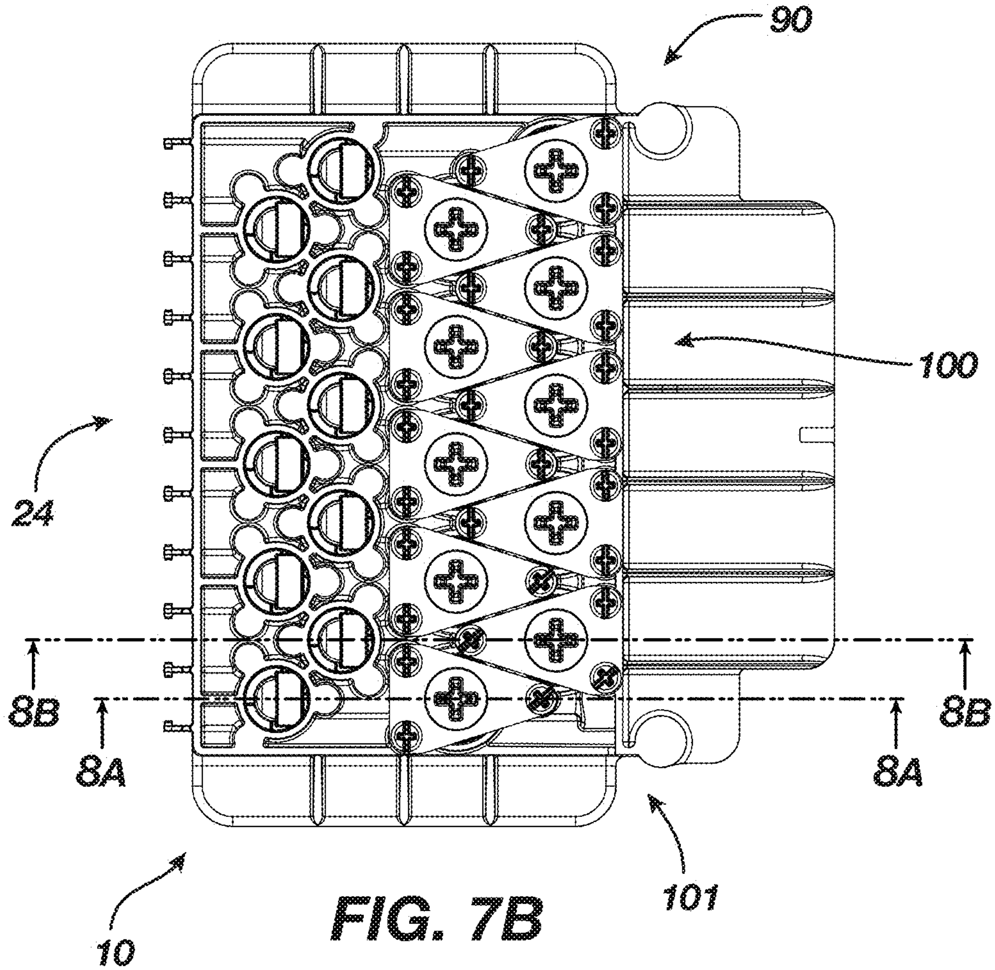
Figure 8B:
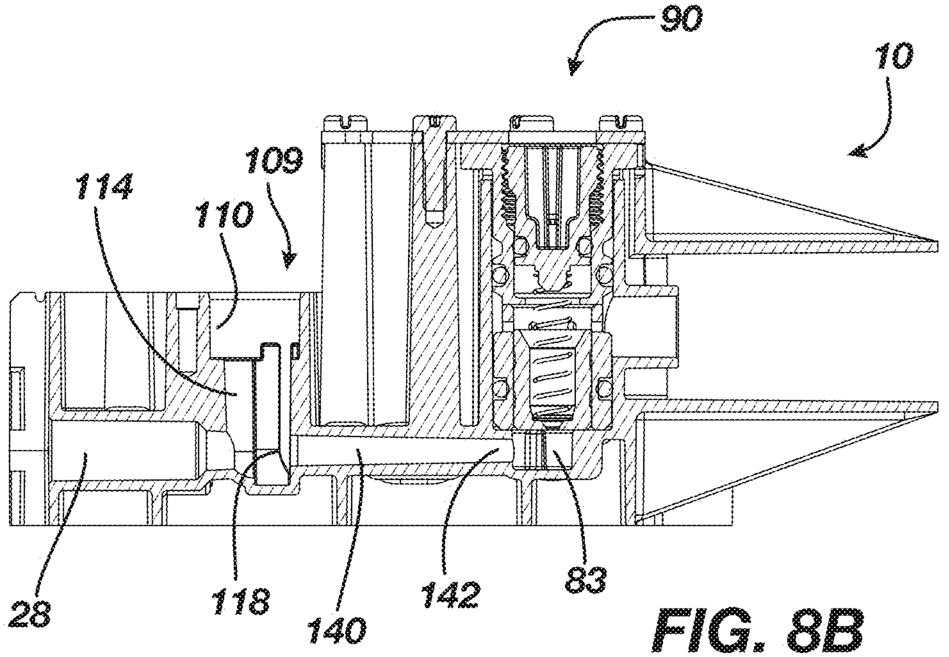
Figure 9:
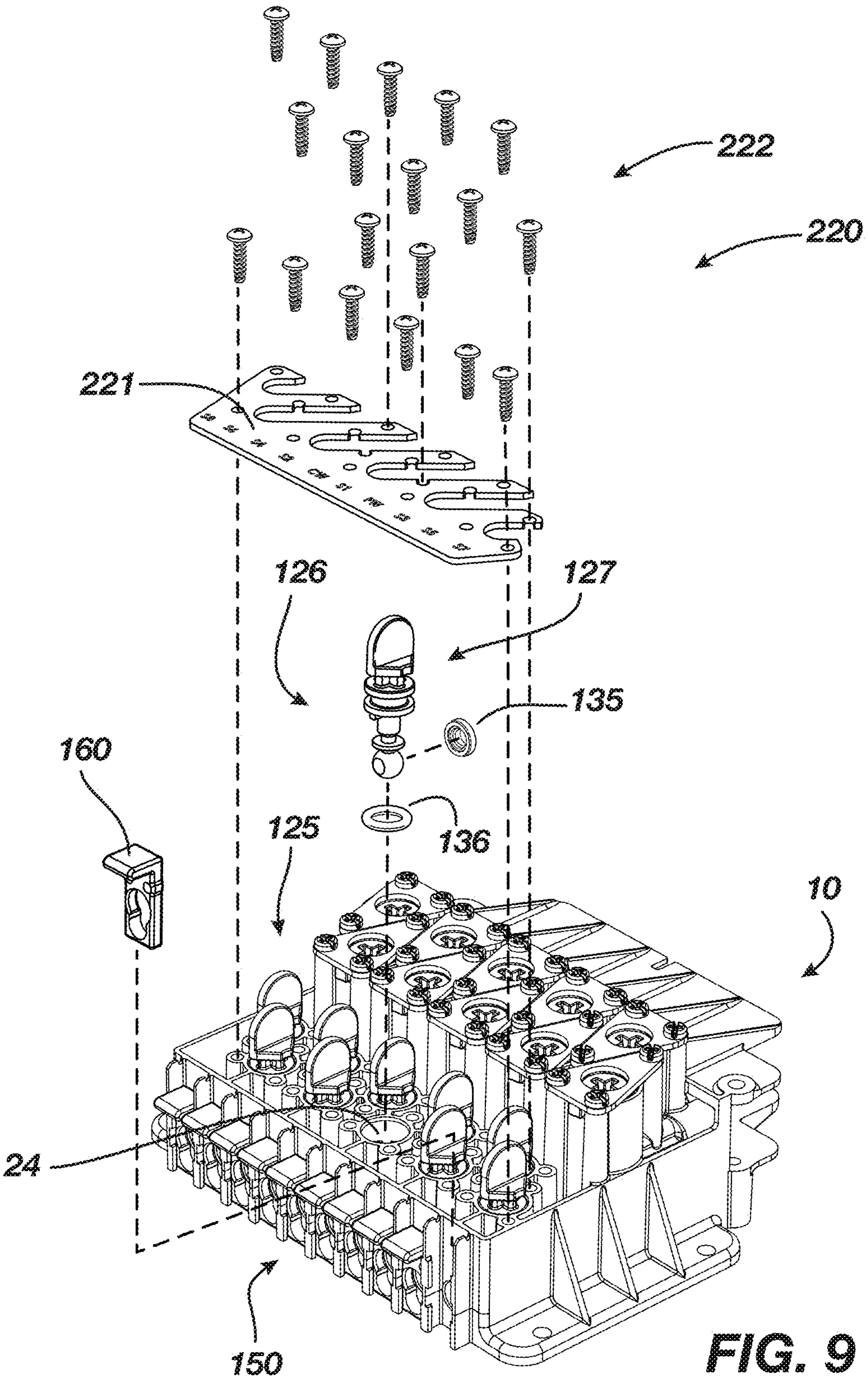
FIG. 9 is a partially exploded bottom rear end isometric view illustrating various aspects of the securement within the assembly body of shutoff valves.
Figure 10:
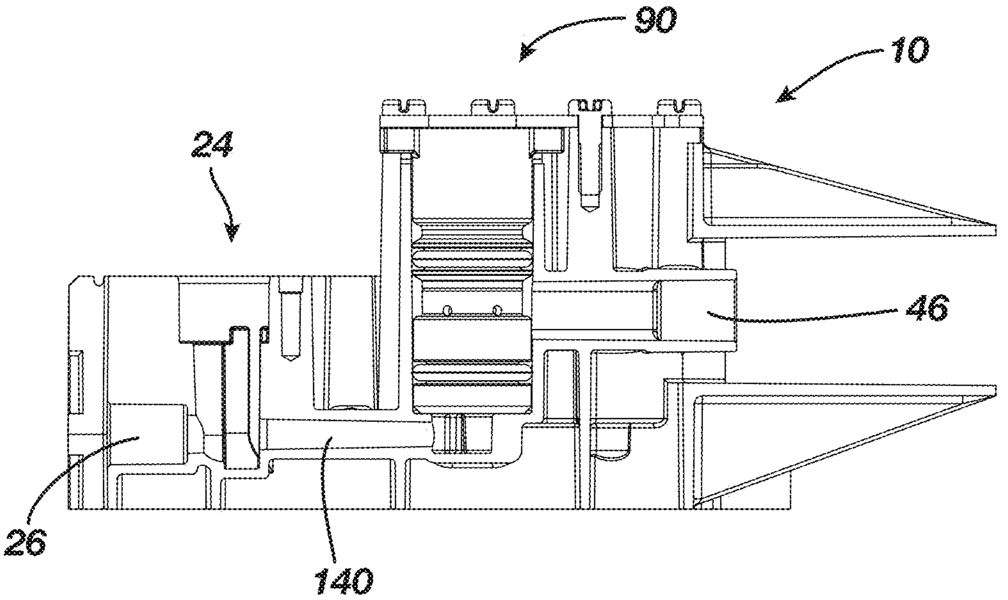
FIG. 10 is a cross-sectional elevation view of the assembly body taken along line 10-10 of FIG. 3D, and a flow rate controller trim as operably placed, illustrating various aspects of a shutoff valve body and the flow rate controller.
Figure 12A:
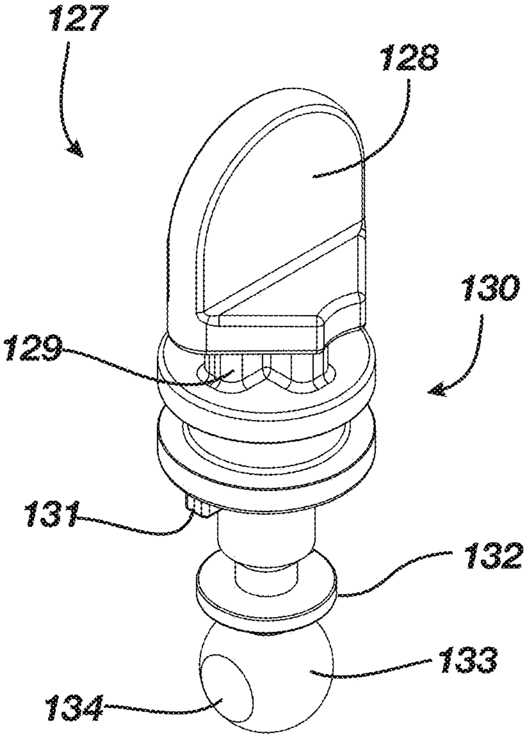
FIGS. 12A-12D and 13A-13B illustrate various aspects of an integral valve trim member of the fluid flow controller, where
Figure 12B:
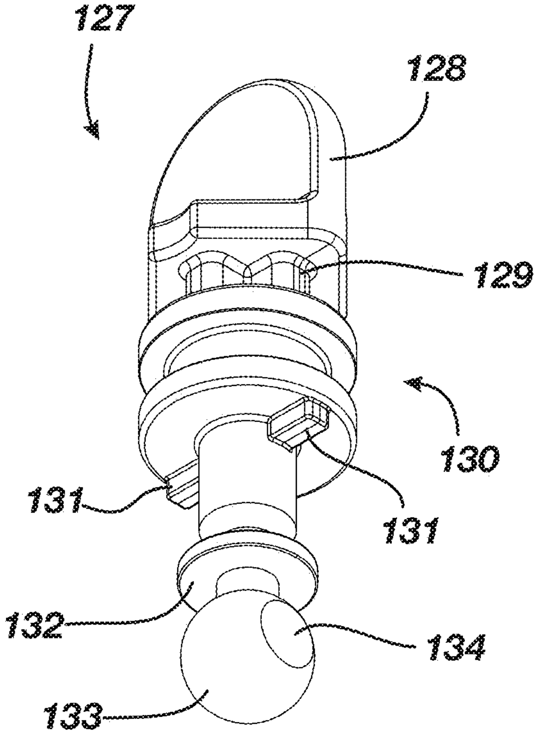

A controller trim retainer arrangement 100 includes controller trim retainers 101 implemented in the form of substantially planar individual retaining plates 102, as particularly illustrated in FIGS. 5 and 7A-7B. A central orifice 103 through each individual retaining plate 102 provides access during use to the Phillips socket 93 of the flow rate adjustment 92. Clearance holes 104 are formed or otherwise provided through each retaining plate 102 for receiving controller trim retaining plate fasteners 105. The clearance holes 104 are provided in a pattern corresponding to the uniform arrangement about the bottom side 20 of the assembly body 10 of the fastener holes 86 for the controller trim retainers 101.

FIGS. 4A-4B also illustrate a ranked arrangement of the valve bodies 24—and thus the shutoff valves-implemented in the second tier 23 of the bottom side 20 of the assembly body 10, wherein the valve bodies 24 are divided into a downstream rank 106, shown in FIG. 4A, and an upstream rank 107, shown in FIG. 4B. The downstream and upstream ranks 106, 107 are substantially identically formed or otherwise provided, but are laterally offset one to the other by a distance one half that of the valve body-to-valve body distribution, as particularly illustrated in FIG. 3D. As described more fully herein, the ranked arrangement of the valve bodies 24 facilitates minimization of the width side-to-side of the assembly body 10 by aligning each individual valve body 24 with a corresponding optimally arranged controller body 22.

Each valve body 24 includes an open orifice 108 into a generally cylindrical socket 109, which has a substantially cylindrical sidewall 110 and opens through a substantially planar annular shoulder 111 into an adjacently formed or otherwise provided generally longitudinally oriented chamber 113. Quarter-turn valve stops 112 are arranged one to another atop the substantially planar annular shoulder 111 and about the cylindrical sidewall 110, and are sized, shaped or otherwise cooperatively adapted with rotation limit arms 131 of the valve trim 126 of the shutoff valve 125 to limit the shutoff valve 125 to quarter-turn operation, while also providing positive indication of the shutoff valve 125 being in either an open state or a closed state.

The adjacent generally longitudinally oriented chamber 113 is sized, shaped or otherwise adapted to be generally increasingly conforming about the valve trim 126 of a respective shutoff valve 125 as various elements of the valve trim 126 pass through the cylindrical socket 109 and into operable placement within the longitudinally oriented chamber 113. The sidewalls 114 of the generally longitudinally oriented chamber 113 include an upstream tapered cylindrical segment 115 and a downstream slotted segment 116. The tapered cylindrical segment 115 interacts with a cooperatively adapted biasing disk 132 of the shutoff valve trim 126 for receiving and guiding a valve ball 133 of the valve trim 126 into operable position between a fluid inlet 117 and an outlet port 118 within the valve body 24, while the slotted segment 116 accommodates insertion of a washer 136 of the shutoff valve trim 126, whereby the washer 136 is operably located in position about the outlet port 118 from the valve body 24.

In accordance with and in furtherance of the desired optimizations of the assembly body 10 in general, a multiplicity of fastener holes 120 is formed or otherwise provided in upwardly oriented bosses 119, which are formed or otherwise provided through the second tier 23 in a preferably uniform arrangement about each of the valve bodies 24. In the exemplary implementation of the fluid flow controller 5, each fastener hole 120 is formed or otherwise provided as one of a set of three fastener holes 120 disposed in a uniform arrangement about the respective open orifice 108 of the valve body 24.

The valve trim 126 for each shutoff valve 125 as implemented in the exemplary fluid flow controller 5 includes a unitary valve stem 127 with only a seal 135 and seat washer 136 added integrally, thereby minimizing components for implementation of the fluid flow controller 5. The seal 135 and seat washer 136 conventionally prevent unintended passage of fluids through the shutoff valve 125 or to without an intended fluid flow path therethrough. The upper portion of the unitary valve stem 127 of the exemplary implementation includes a pointer type selector knob 128 providing an intuitive indication of valve state, positioned atop a retention neck 129 of the unitary valve stem 127 between the selector knob 128 and a sealing arrangement 130, and the sealing arrangement 130, which is sized, shaped or otherwise configured to substantially conformingly engage the generally cylindrical socket 109 of a valve body 24 and thereby facilitate fluid tight engagement of the carried seal 135 with the substantially cylindrical sidewall 110 of the generally cylindrical socket 109. The retention neck 129 is sized, shaped or otherwise configured for capture by a valve trim retainer arrangement, as described more fully herein.

The lower portion of the unitary valve stem 127 of the exemplary implementation includes rotation limit arms 131, which cooperate with the quarter-turn valve stops 112 implemented in the valve body 24 to limit rotation of the unitary valve stem 127, as previously described, and thus constrain the operation of the shutoff valve 125 to that which is deemed to be optimal. A biasing disk 132, which is formed or otherwise provided on and about the unitary valve stem 127, follows the tapered cylindrical segment 115 of the sidewalls 114 of the longitudinally oriented chamber 113 of the valve body 24, as the valve trim 126 is admitted to a valve body 24, and thereby guides and maintains the valve ball 133 operably in place. A preferably full port valve ball 133 is also included, and operates conventionally to enable or disable fluid flows through the preferably full port 134 of the valve ball 133.

Each discrete fluid flow path between a fluid inlet port 26 into the assembly body 10 and the corresponding outlet port 46 from the assembly body 10 traverses an interbody fluid conduit 140 configured or otherwise adapted within the assembly body 10 to convey fluid flows between the respective shutoff valve body 24 and the respective flow rate controller body 22 of the fluid flow path. As particularly shown in FIGS. 4A-4B, the interbody fluid conduits 140 are arranged or otherwise configured within the assembly body 10 to convey the fluid flow from an upstream end 141 to a downstream end 142. More particularly, the interbody fluid conduits 140 are arranged or otherwise configured within the assembly body 10 to convey the fluid flow from each valve body 24 of the upstream rank to a corresponding controller body 22 of the upstream rank, and to convey the fluid flow from each valve body 24 of the downstream rank to a corresponding controller body 22 of the downstream rank.

Figure 28A:
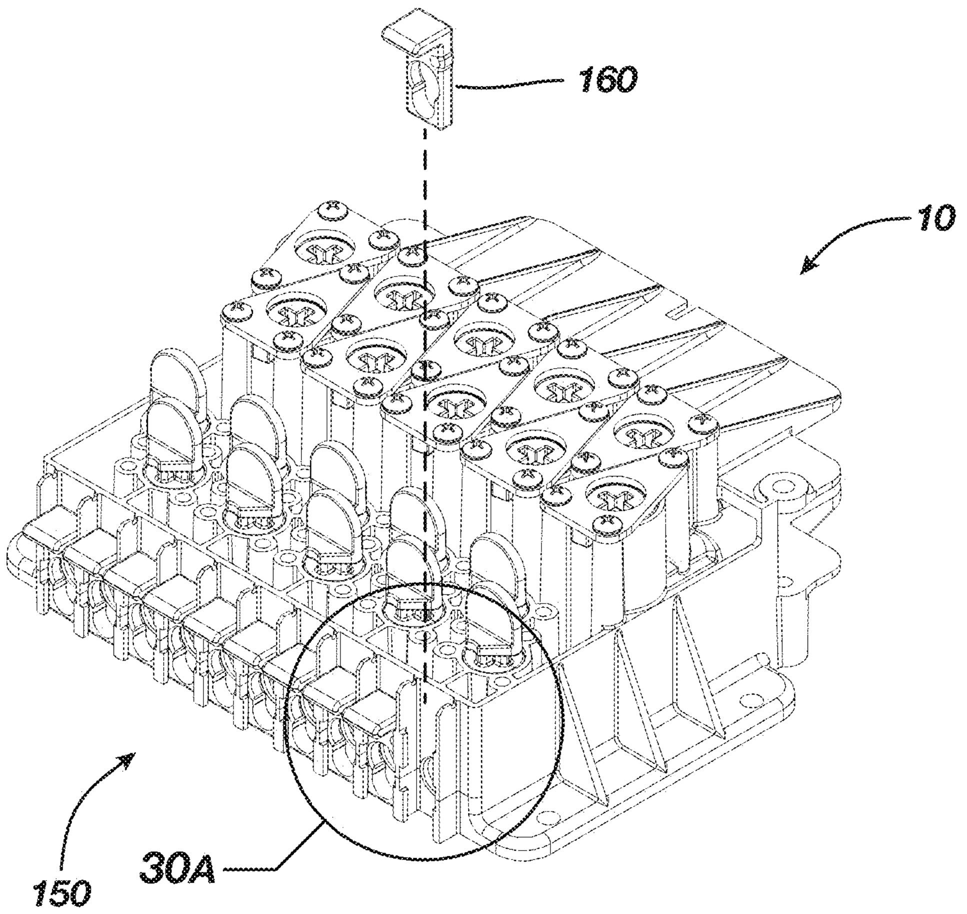
FIGS. 28A-28B illustrate a first stage of insertion of an L-shaped clip of a slide lock into a linear guide of the slide lock, as implements an inlet connector retaining mechanism for the fluid flow controller, and where.
Figure 28B:
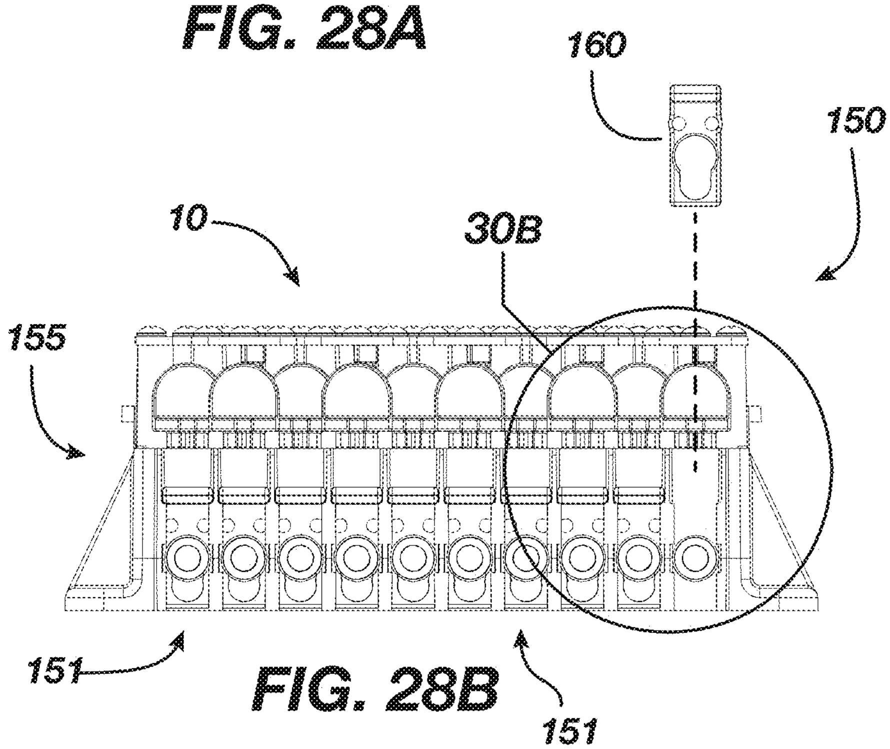
Figure 29A:
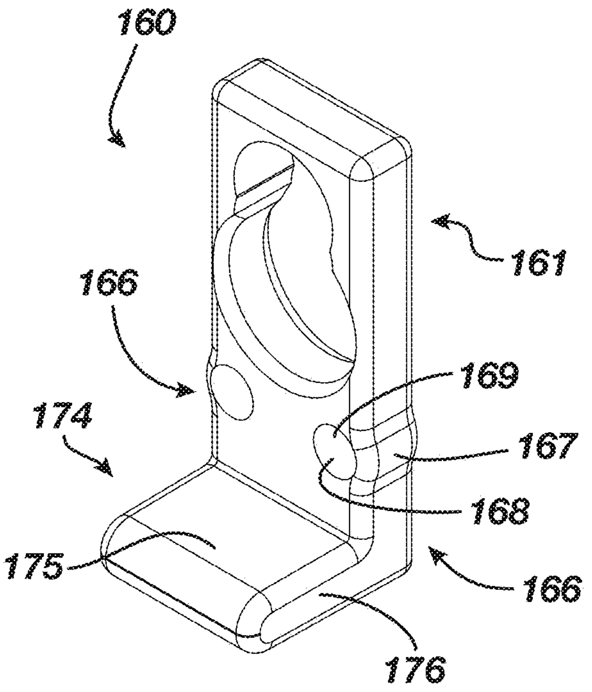
FIGS. 29A-29D illustrate various aspects of the L-shaped clip of the slide lock, where.
Figure 29C:
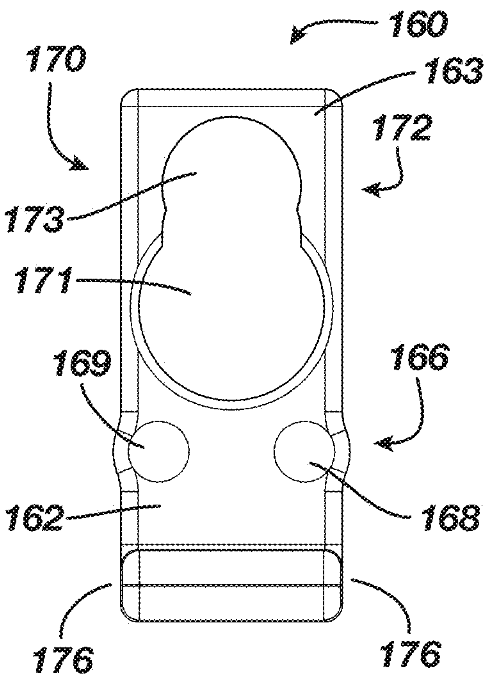
Figure 29B:
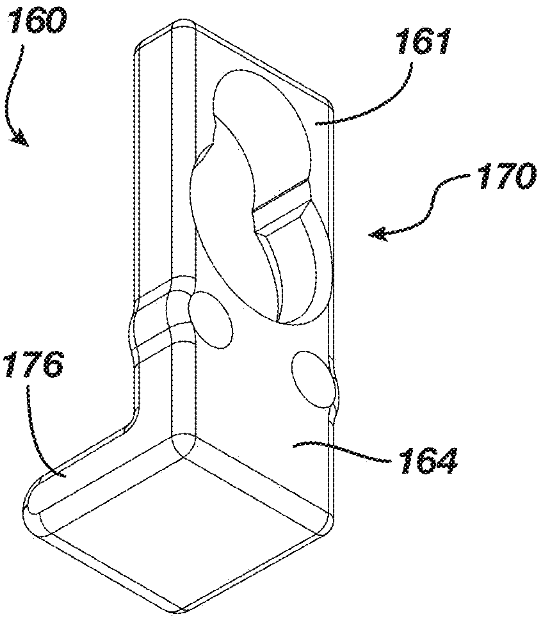
Figure 29D:
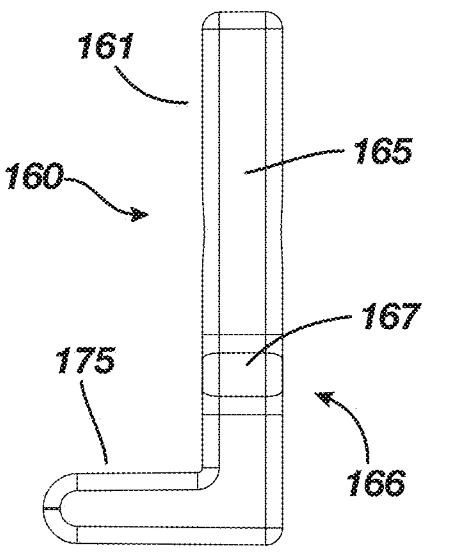
Figure 30B:
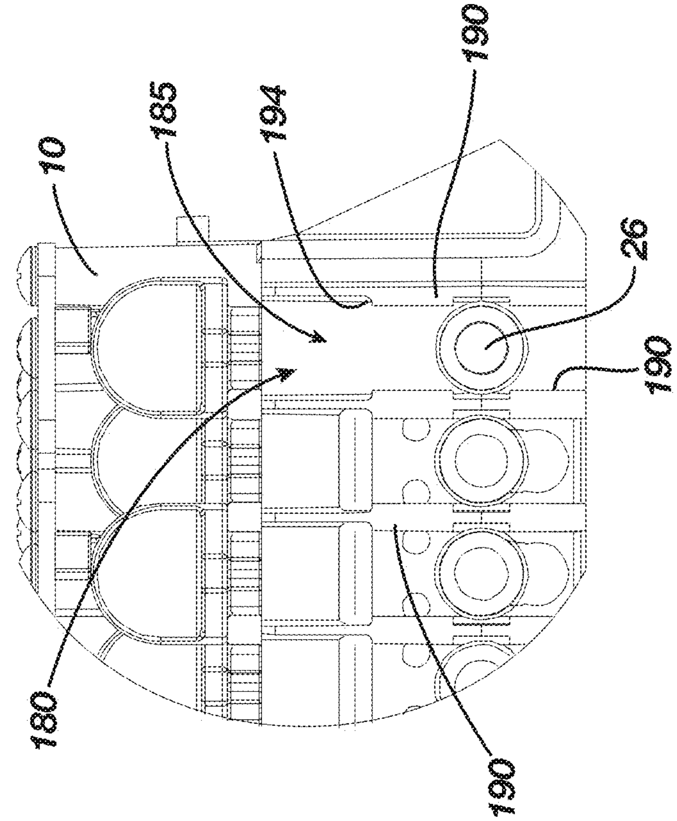
FIGS. 30A-30B illustrate various aspects of the linear guide of the slide lock, where.
Figure 30A:
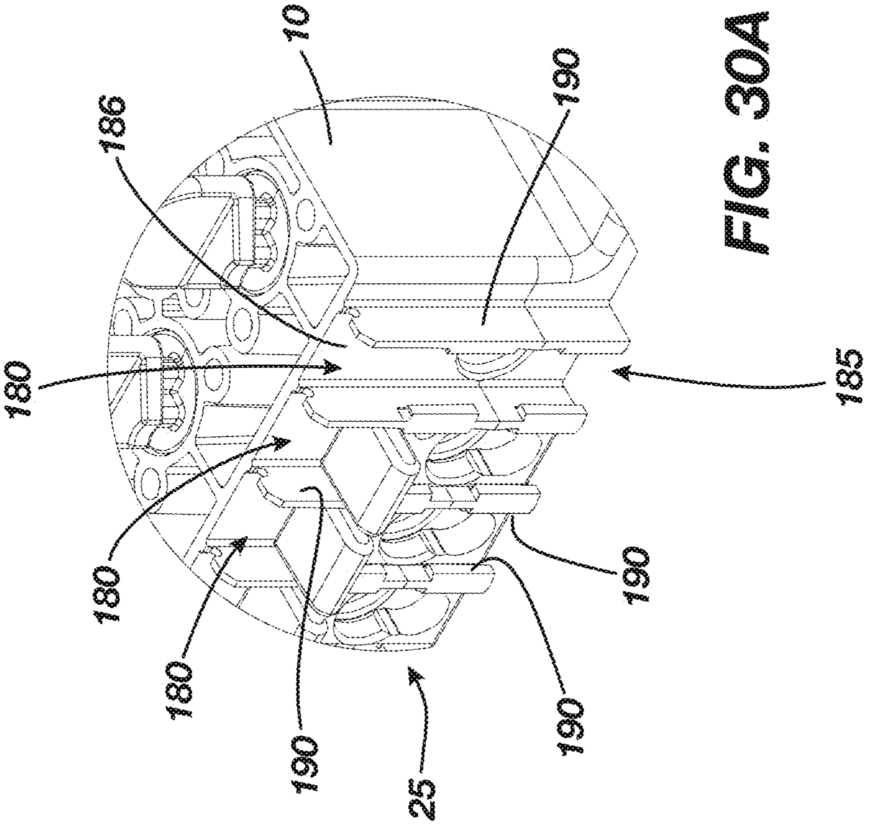
Figure 31C:
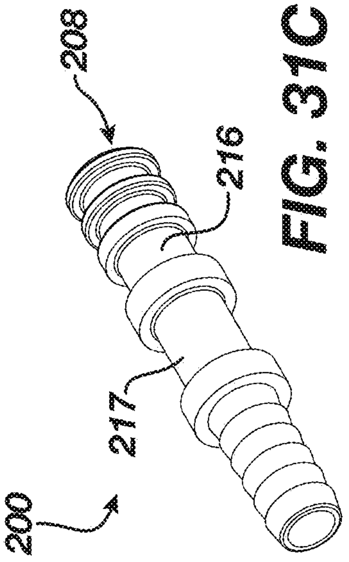
FIGS. 31A-31C illustrate various aspects of an exemplary barbed quick connect fitting, as may be retained by the inlet connector retaining mechanism of the fluid flow controller, and where.
Figure 31B:
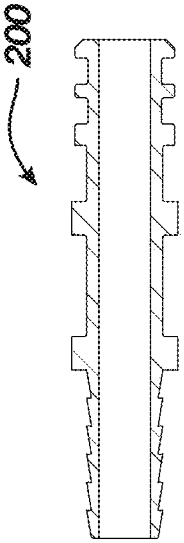
Figure 32B:
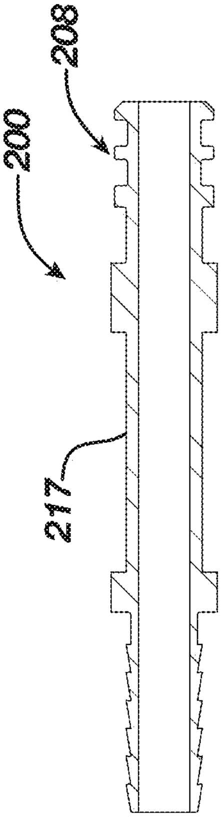
FIGS. 32A-32B illustrate various aspects of an exemplary alternatively sized barbed quick connect fitting, as may be retained by the inlet connector retaining mechanism of the fluid flow controller, and where.
Figure 31A:
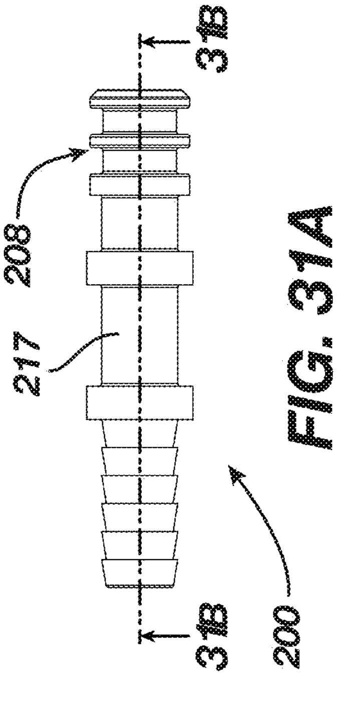
Figure 32A:
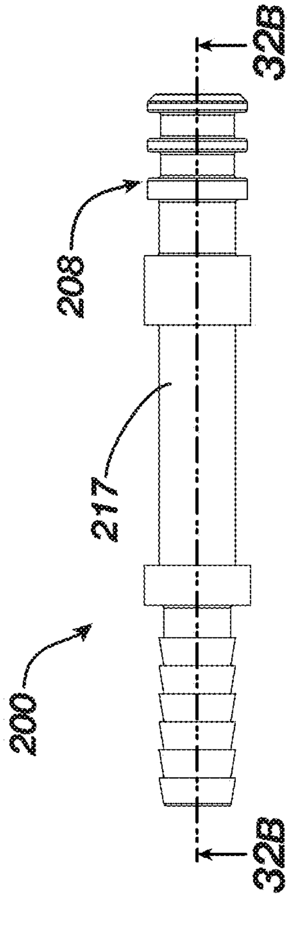
Figure 33A:
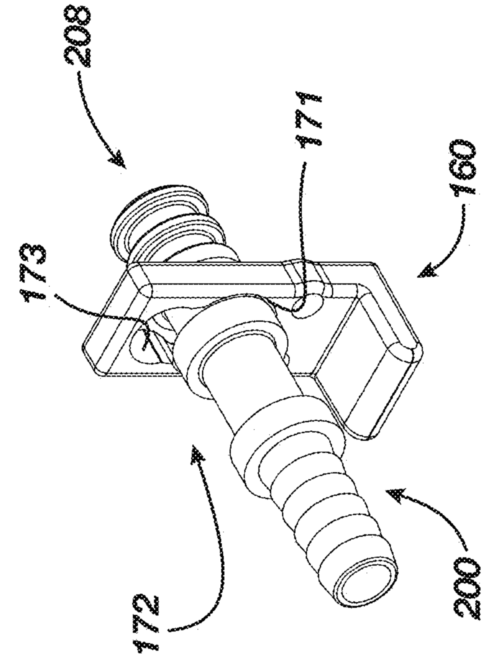
FIGS. 33A-33F illustrate various aspects of the exemplary barbed quick connect fitting and the L-shaped clip of the slide lock, as the exemplary barbed quick connect fitting is captured by the L-shaped clip, and where.
Figure 33B:
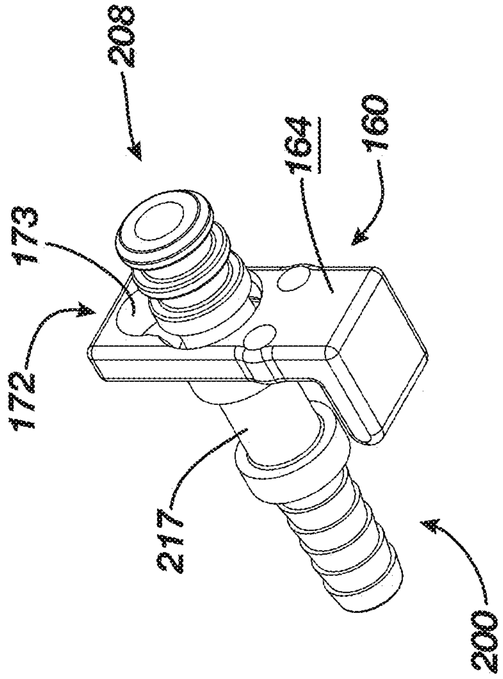
Figure 34A:
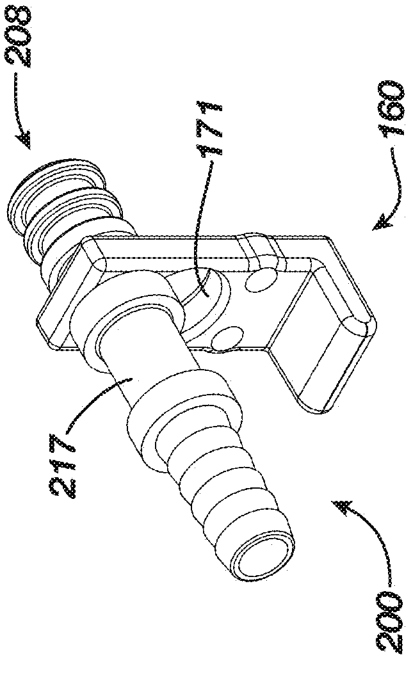
FIGS. 34A-34F, the views of which generally correspond in order to the views of FIGS. 33A-33F, illustrate various aspects of the exemplary barbed quick connect fitting and the L-shaped clip of the slide lock, as the exemplary barbed quick connect fitting is clutched by the L-shaped clip, and where.
Figure 34B:
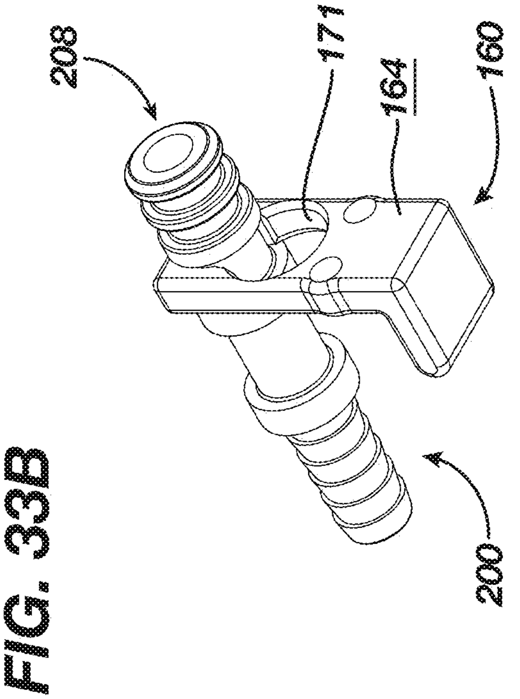
Figure 33C:
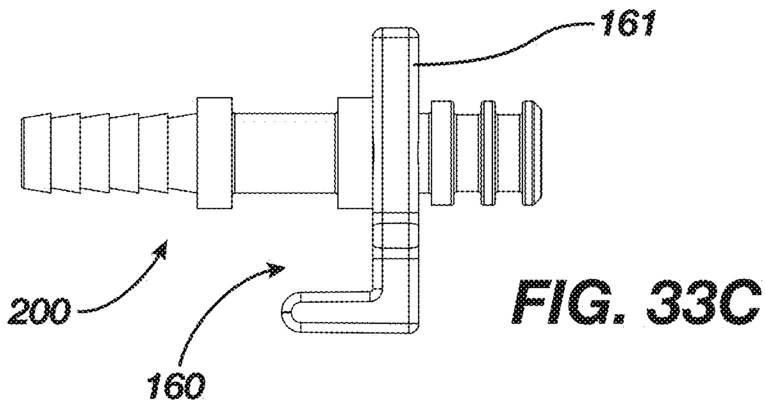
Figure 33D:
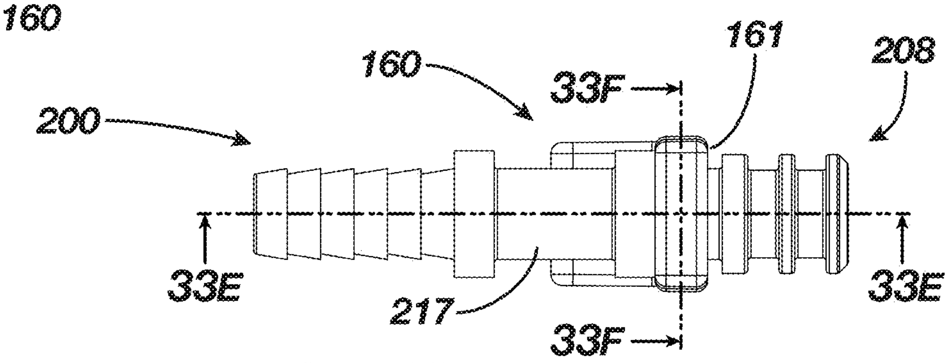
Figure 34C:
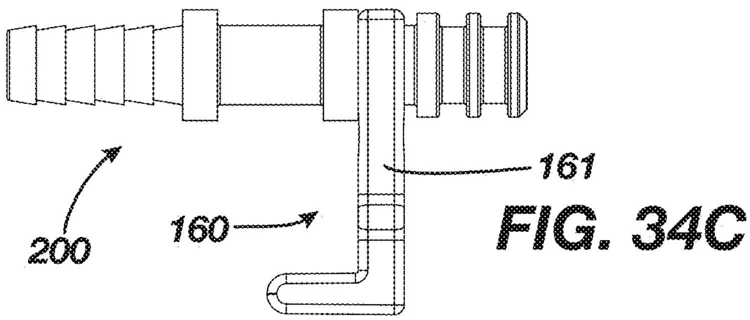
Figure 34D:
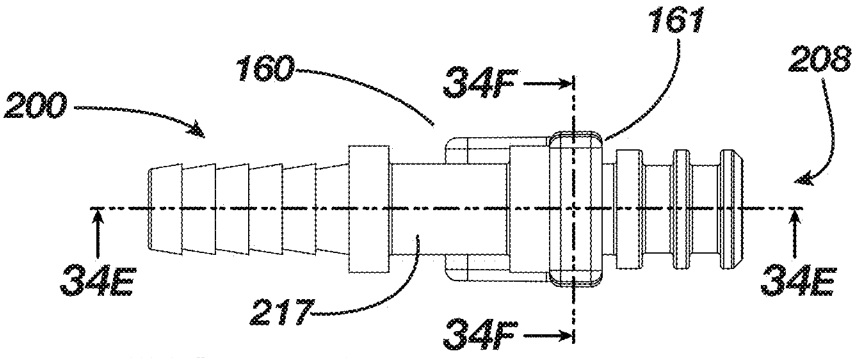
Figure 33E:
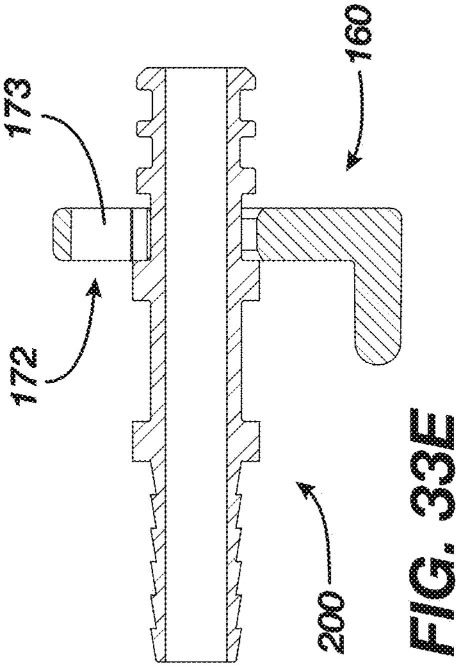
Figure 33F:
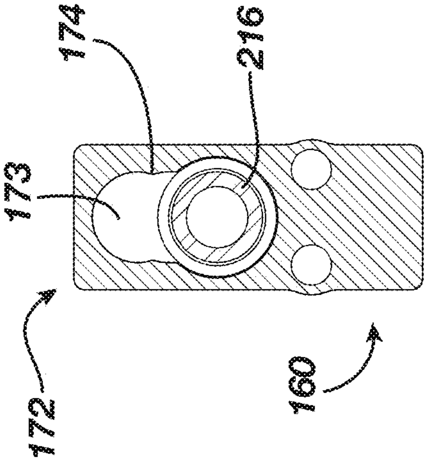
Figure 34E:
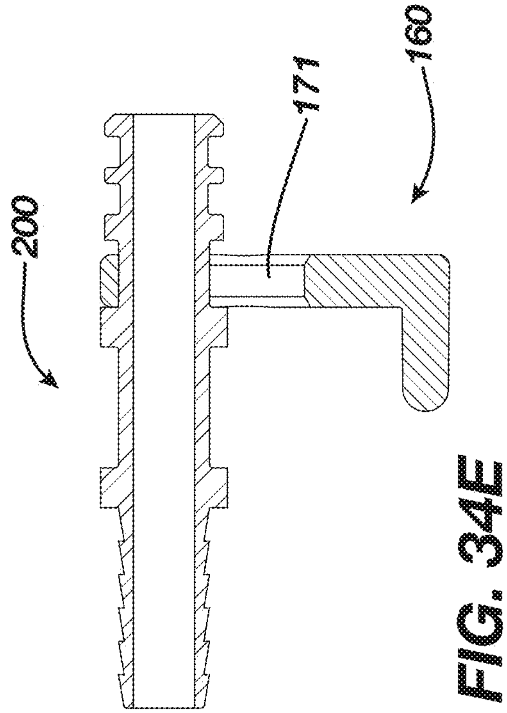
Figure 34F:
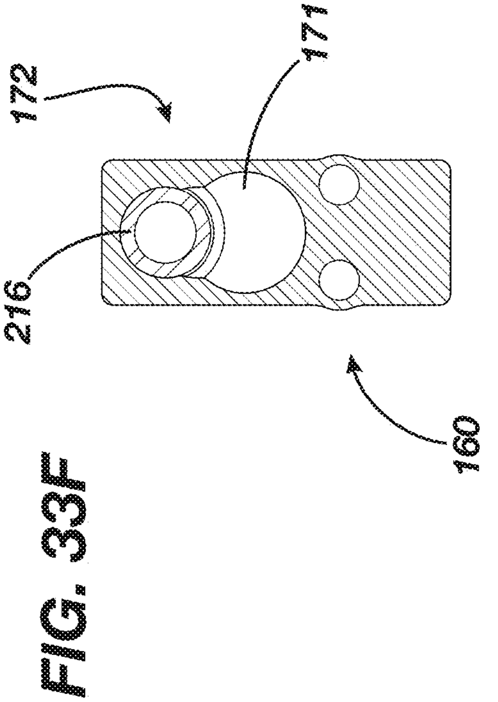
Figure 35:
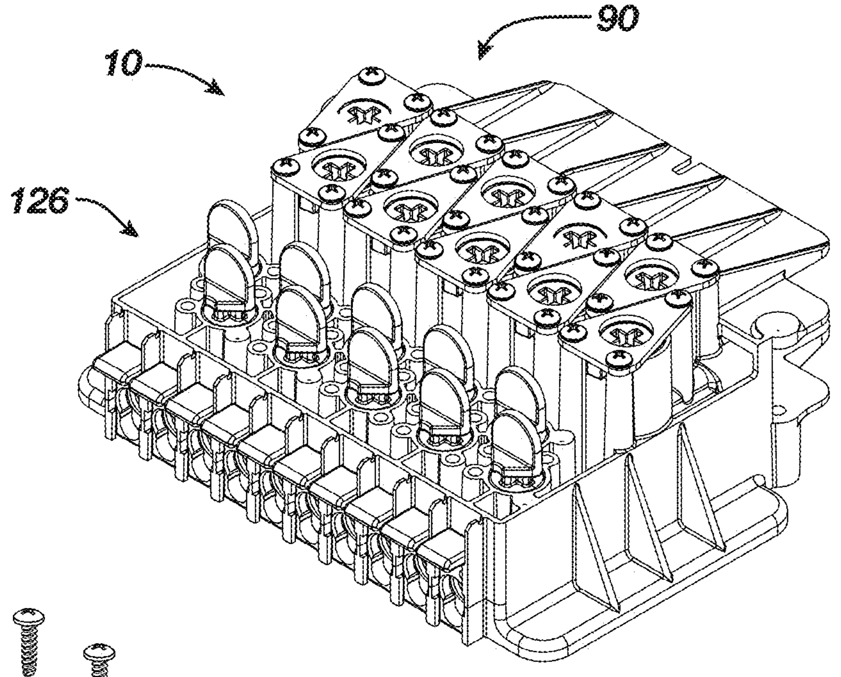
FIG. 35 is a bottom rear end isometric view illustrating the assembly body as configured with an L-shaped clip received within each linear guide at the rear end of the assembly body.
Figure 38:
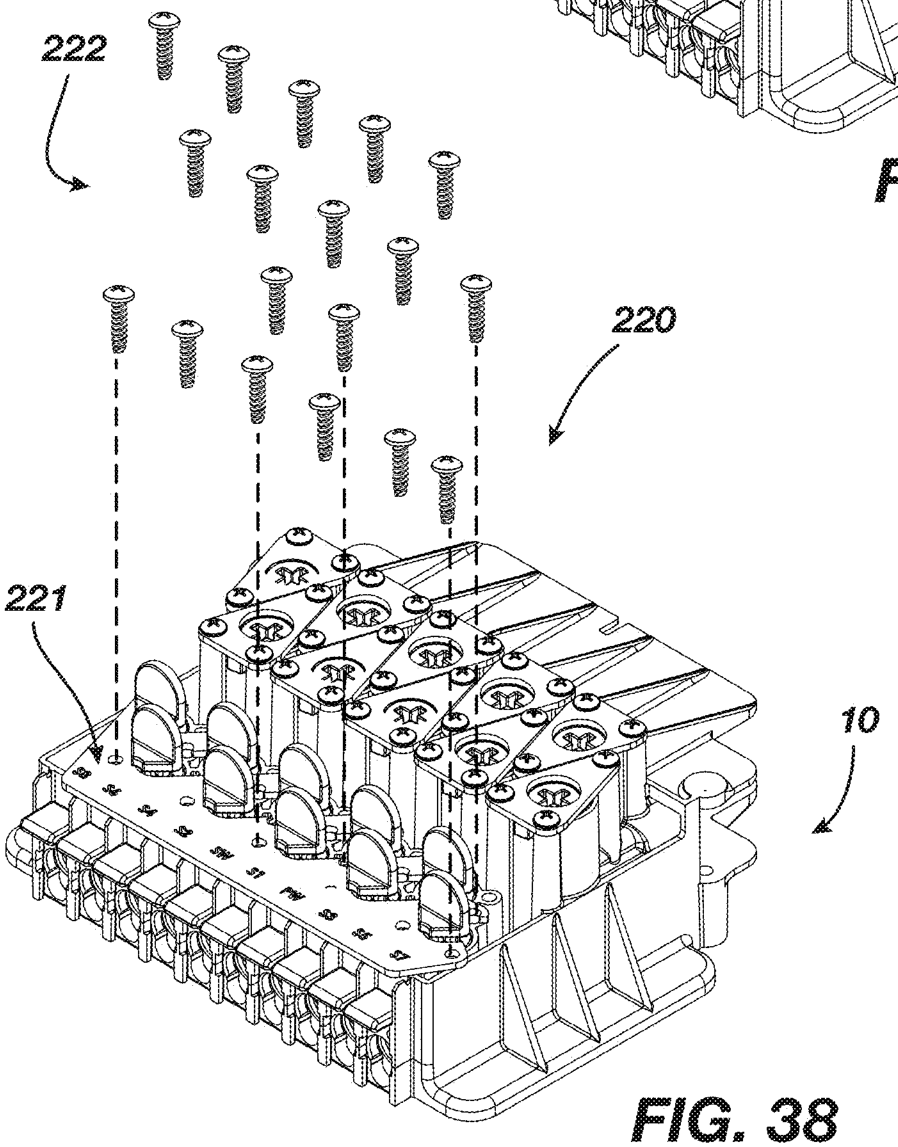
FIG. 38 is a partially exploded bottom rear end isometric view illustrating various aspects of the operable securement of the shutoff valve trim retaining plate to the assembly body.
Figure 36C:
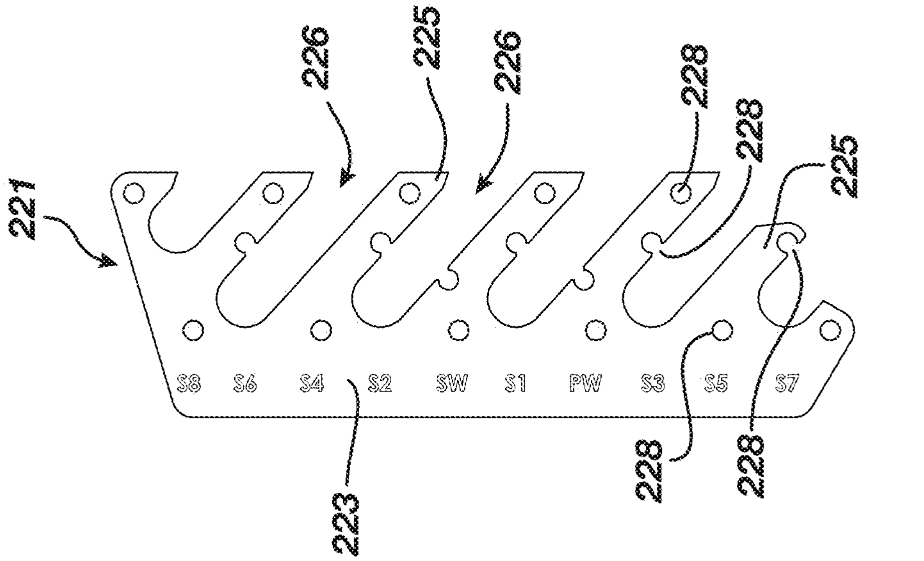
FIGS. 36A-36C illustrate various aspects of a retaining plate as preferably implements a shutoff valve trim retainer, where.
Figure 36A:
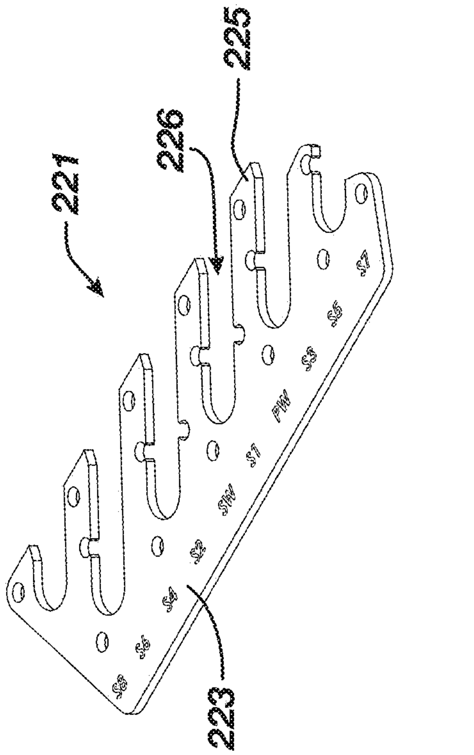
Figure 36B:
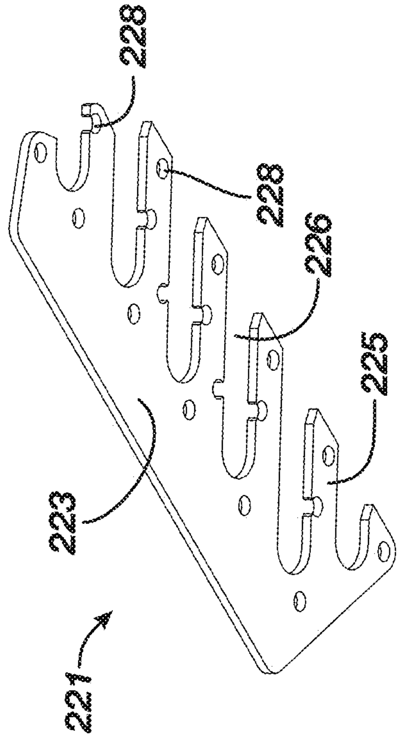
Figure 37:
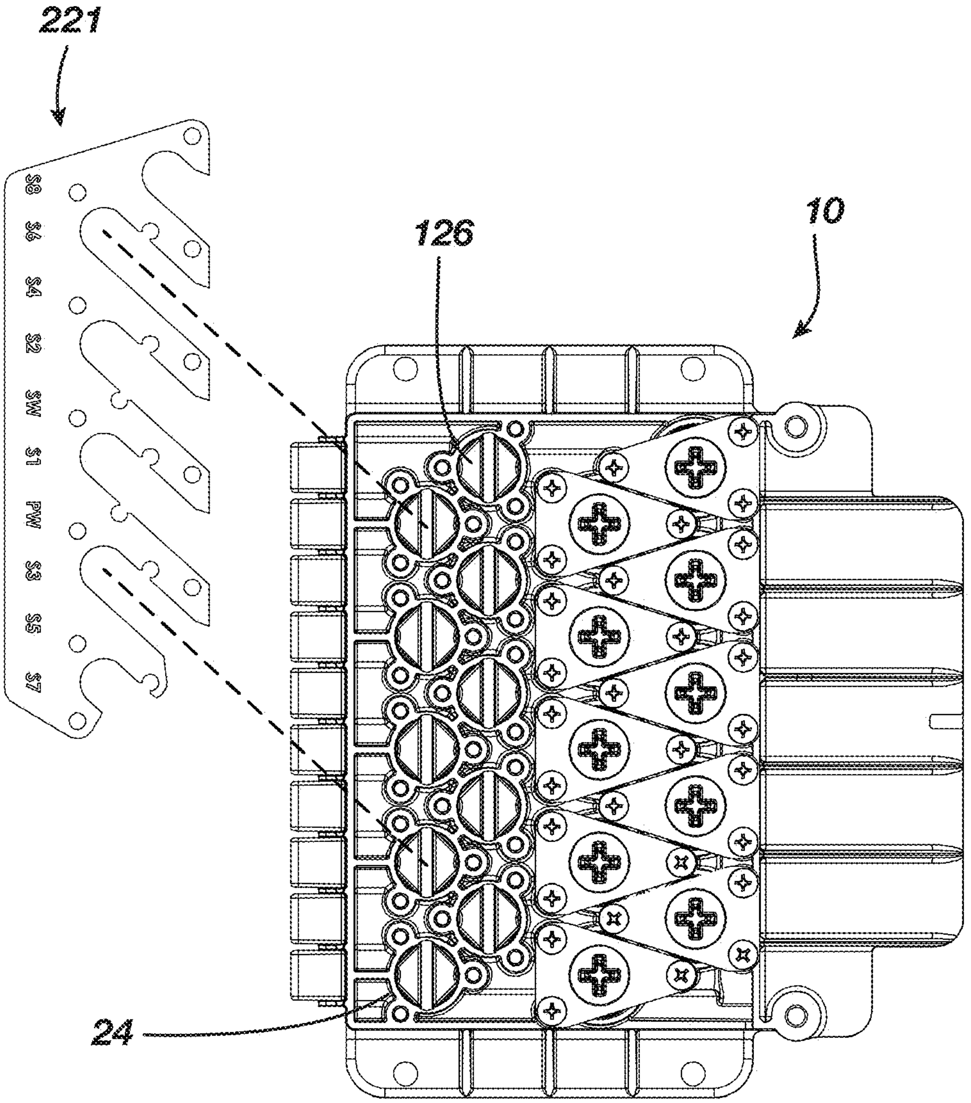
FIG. 37 is a bottom plan view illustrating various aspects of the attachment of the shutoff valve trim retaining plate to the assembly body.
Figure 39B:
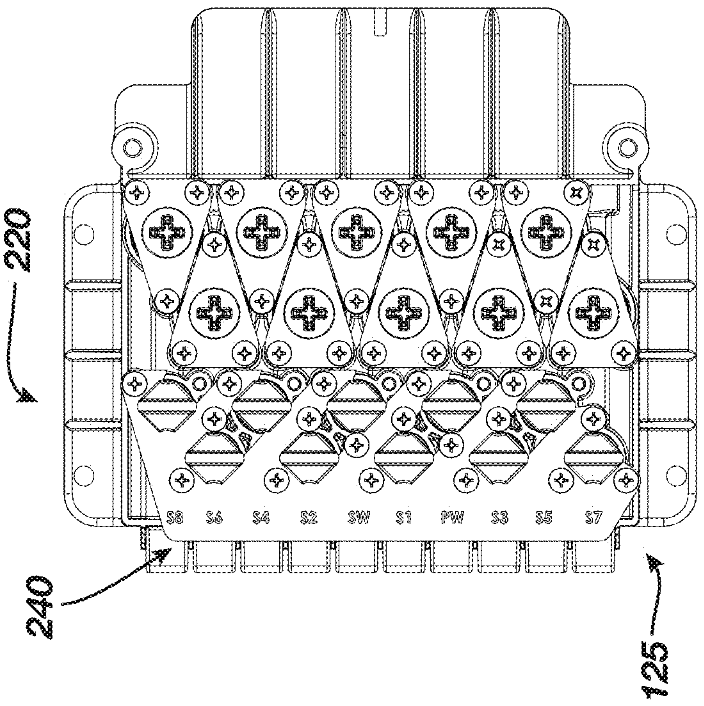
FIGS. 39A-39B illustrate the operably assembled fluid flow controller, where.
Figure 39A:
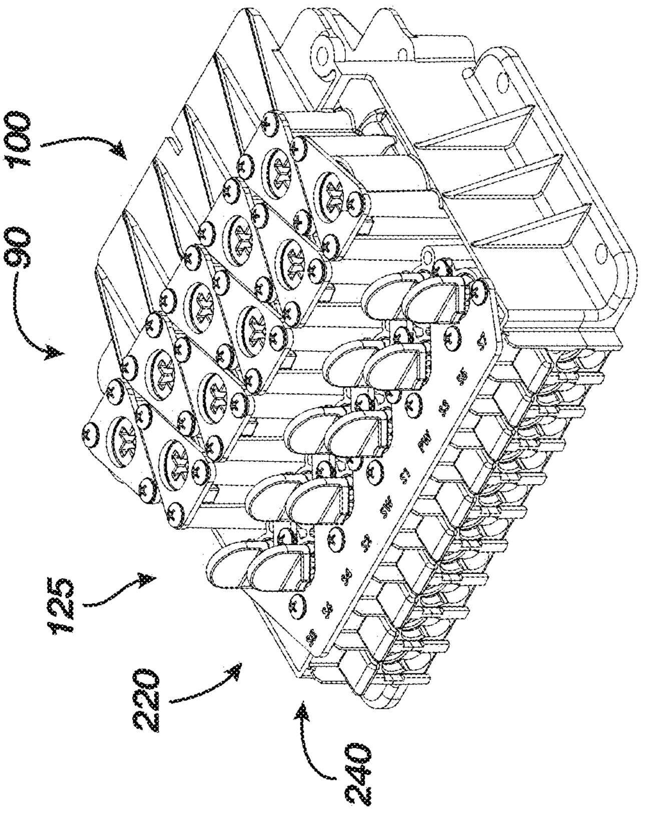

Referring to FIGS. 28A-28B, an inlet connector retaining mechanism 150 is implemented at the rear end 25 of the assembly body 10, adjacent the inlet ports 26, for securing the quick-connector 208 of each fluid fitting 200 terminating a utilized fluid line of the associated source of pressurized fluid. In the exemplary preferred embodiment, the inlet connector retaining mechanism 150 includes an independently operable individual connector retainer 151 for each of the multiplicity of inlet ports 26, and at least some aspects of the inlet connector retaining mechanism 150 are formed or otherwise provided as unitary elements of the assembly body 10, thereby facilitating the provision of a fluid flow controller 5 having a minimal footprint in furtherance of Applicant's object to provide increased functionality within a highly compact form factor. Other aspects of the inlet connector retaining mechanism 150, however, require some freedom of movement in operation of the inlet connector retaining mechanism 150, and thus are not amenable to formation or other provision as unitary elements of the assembly body 10. In consequence, the exemplary preferred embodiment of the inlet connector retaining mechanism 150 also includes a preferably selectively employed common restriction 220 configured or otherwise adapted to collectively constrain the free movement of such aspects of the inlet connector retaining mechanism 150, thereby efficiently and effectively preventing unintentional displacement of otherwise separable unfixed aspects of the inlet connector retaining mechanism 150.

In the exemplary preferred embodiment as shown and described, each of the independently operated multiplicity of individual connector retainers 151 is implemented as a purpose built slide lock 155. The common restriction 220 is preferably selectively employed to enable replacement of an otherwise separable feature as may be required or otherwise desired, and generally comprises a cooperative arrangement configured or otherwise adapted to operate collectively in connection with each corresponding individual separable feature to concurrently prevent displacement of any one or more of the otherwise separable features. In the exemplary preferred embodiment as shown and described, the common restriction 220 is implemented as a common clip stop 240. A purpose built slide lock 155 that is readily accessible, simple to use, and reliably functional includes a preferably L-shaped clip 160, as described more fully herein, configured or otherwise adapted to translate within the constraints of a corresponding linear guide 180.

As illustrated in FIGS. 29A-29D, a preferably L-shaped clip 160 configured or otherwise adapted to translate vertically within a corresponding linear guide 180, as constrained thereby, includes a sliding panel 161 and a tab 174, which preferably projects orthogonally from the proximal end 162 of the sliding panel 161. The tab 174 has an interior face 175, and edges 176 generally coextensive with the edges 165 of the sliding panel 161.

In use as a component of a deployed exemplary fluid flow controller 5, the proximal end 162 of the sliding panel 161 of the L-shaped clip 160 is oriented toward bottom side 20 of the assembly body 10, and the distal end 163 of the sliding panel 161 is oriented toward the top side 15 of the assembly body 10. The sliding panel 161 includes a substantially planar exterior face 164, for slidingly engaging the sidewalls 190 of the vertical channel 185 of the linear guide 180, and edges 165 configured or otherwise adapted for capture by and translation within a respective one of the opposing shallow tracks bounding the vertical channel 185 of the linear guide 180. Each edge preferably includes a frictional retainer 166, which facilitate one-handed insertion or extraction of a barbed quick-connect fitting 200. The frictional retainer 166 may be implemented as a protuberance 167 configured or otherwise adapted to provide substantially continuous frictional engagement with the sidewall 190 of the adjacent track of the linear guide 180. A relief 168, however, formed or otherwise provided as a through hole 169 through the sliding panel 161, provides a spring characteristic to the adjacent protuberance 167, thereby facilitating maintenance of shape, and effectiveness in use, of the protuberance 167.

The sliding panel 161 includes a slotted aperture 170, which is configured to capture and selectively clutch the barrel 216 of a barbed quick-connect fitting 200. As particularly illustrated in FIGS. 29A-29C, the slotted aperture 170 includes a through hole 171, which is sized, shaped or otherwise adapted to enable clear passage therethrough of the barrel 216, O-rings or like seals, and other features of the barbed quick-connect fitting 200, and an annular snap fit type socket 172. In the exemplary implementation, the annular snap fit type socket 172 comprises an intersecting through hole 173 sized, shaped or otherwise adapted to conform about the barrel 216 of the barbed quick-connect fitting 200.

As shown in FIGS. 28A-39B and 47-54B, the linear guide 180 is formed about each provided inlet port 26 to the assembly body 10 for capturing and guiding one of the L-shaped clips 160. The L-shaped clips 160 is first inserted into the vertical channel 185 of the linear guide 180 through an open end 186, as provided for each linear guide 180. Tab stops 194 prevent passage of the tab 174 of an inserted L-shaped clips 160, thereby preventing the L-shaped clips 160 from sliding through the linear guide 180. As particularly shown in FIGS. 64-65, the slots 40 are formed in the edges about the open ends 186 of the linear guide 180. Once all the linear guides 180 are populated with one of the L-shaped clips 160, the interference-fit or snap-fit wire rod 241 is press fit or similarly secured within the provided slots 40. The operably affixed wire rod 241 prevents the operably placed L-shaped clips 160 from falling back through the otherwise open ends 186 of the linear guides 180.

Upon population of the linear guides 180 with one of the L-shaped clips 160 and the affixation of the wire rod 241 within the provided slots 40, a retaining plate 221 as particularly shown in FIGS. 36A-36C and 37-39B secures with the second tier 23 of the assembly body 10 to maintain each shutoff valve 125 within each valve body 24 and the wire rod 241 within the slots 40. The retaining plate 221 includes fingers 225 defining slots 226 configured to allow the retaining plate 221 to bypass the shutoff valves 125 during seating of the retaining plate 221 atop the second tier 23 while the fingers 225 engage the shutoff valves 125 at the retention necks 129 thereof whereby the retaining plate 221 secures the shutoff valves 125 within a respective valve body 24. The retaining plate 221 includes openings 228 located about the retaining plate 221 such that, when the retaining plate 221 sits atop the second tier 23, the openings align with the fastener holes 120 provided in the upwardly oriented bosses 119. In accordance therewith, screws 222 pass through the openings 228 and engage the fastener holes 120 in order to affix the retaining plate 221 atop the second tier 23 about the shutoff valves 125. The retaining plate 221 includes an extension 223 that projects the retaining plate 221 from the second tier 23 such that the retaining plate 221 extends over the wire rod 241 thereby retaining the wire rod 241 within the slots 40.

After installation of the retaining plate 221 thereby securing a shutoff valve 125 within each valve body 24 and one of the L-shaped clips 160 within each of the linear guides 180, a barbed quick connect fitting 200 connects to each of the inlet ports 26 at the rear end 25 of the assembly body 10 for providing pressurized fluids, such as a pressurized beverage product or diluent, to the fluid flow controller 5 of the present invention. To this end, a barbed quick connect fitting 200 is quickly but reliably affixed within an inlet port 26 to the assembly body 10 by manually operating the L-shaped clip 160 about the inlet port 26 by manipulating the tab 174 of the L-shaped clip 160 to allow passage of the male quick-connector 208 of the barbed quick connect fitting 200 through the through hole 171 of the slotted aperture 170, and then again manually operating the L-shaped clip 160 by manipulating the tab 174 to cause the intersecting through hole 173 of the annular snap fit type socket 172 to firmly engage about the barrel 216 of the barbed quick connect fitting 200 now properly inserted within the inlet port 26. Upon installation of a barbed quick connect fitting 200 within each of the inlet ports 26, pressurized beverage products or diluents may be provided to the fluid flow controller 5.

Figure 40:
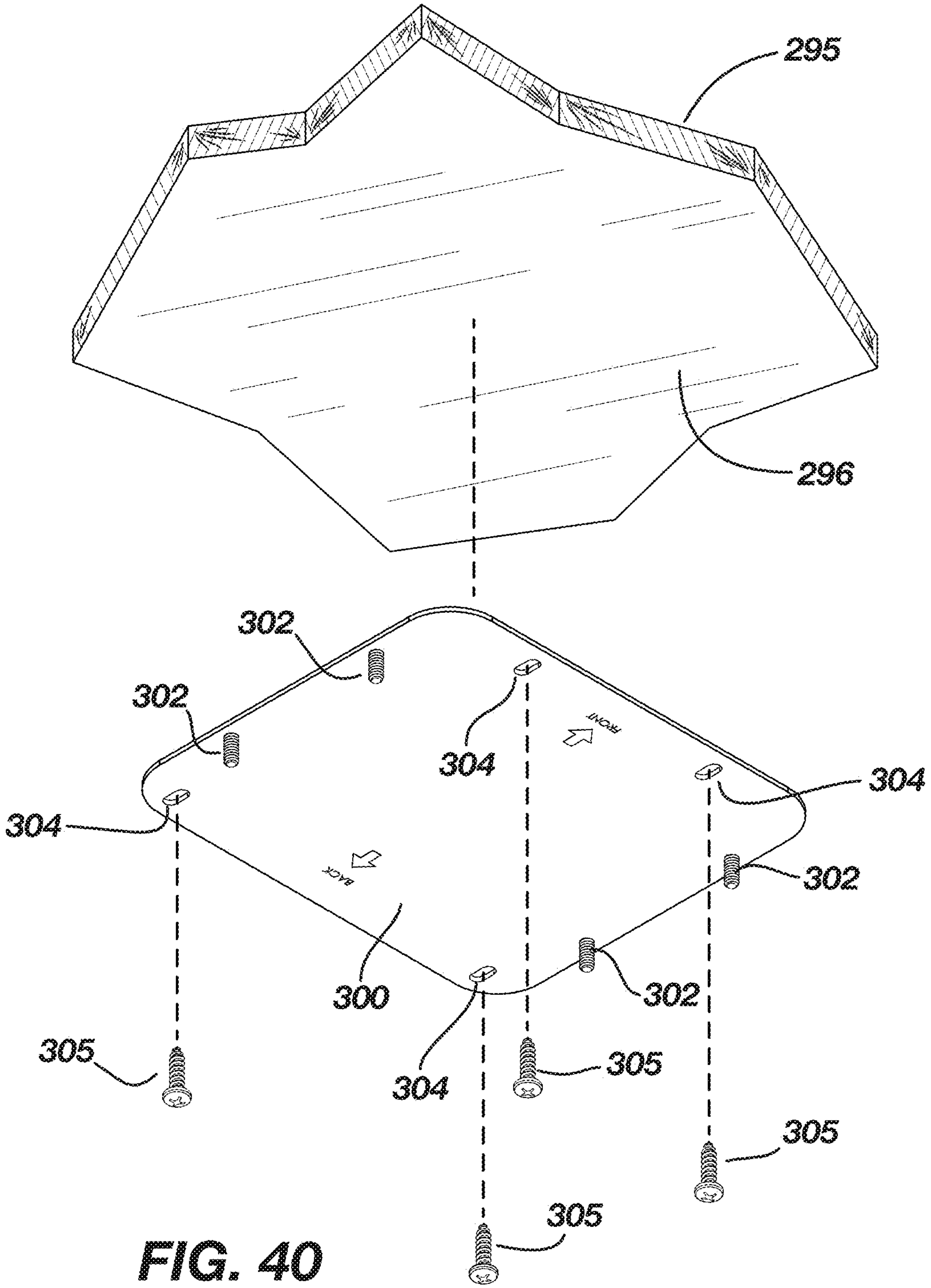
FIG. 40 is a bottom isometric view illustrating various aspects of the securement of an exemplary mounting plate to a location for use of the flow rate controller, such as the undersurface of a beverage service counter.
Figure 41:
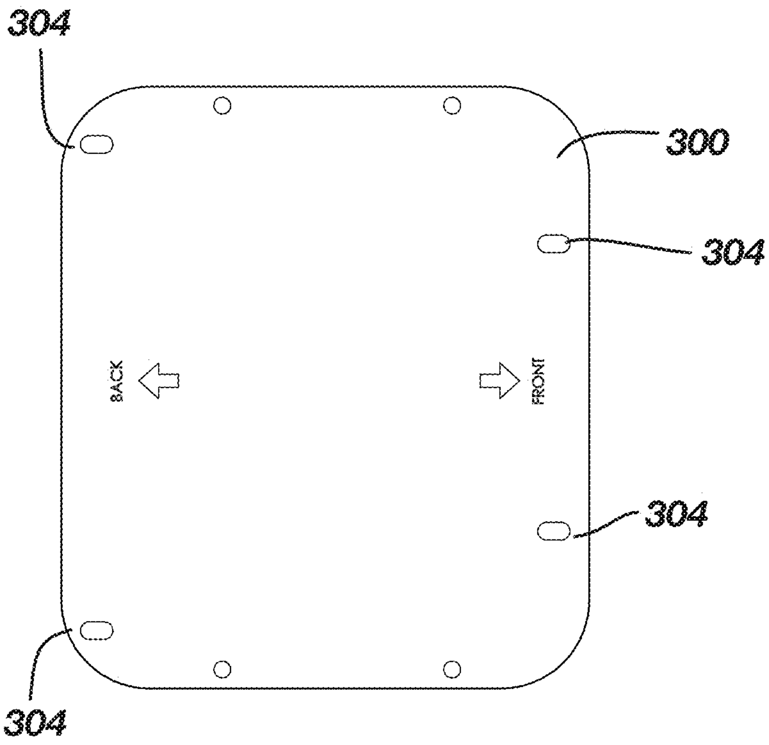
FIG. 41 is a bottom plan view illustrating various aspects of the mounting plate.
Figure 42:
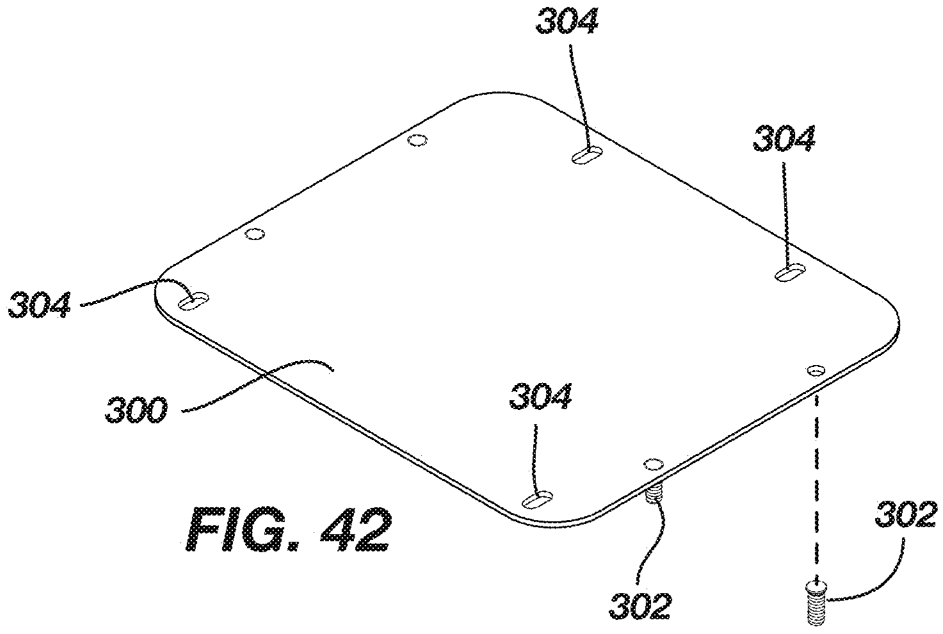
FIG. 42 is a partially exploded top isometric view illustrating various aspects of the construction of the mounting plate.
Figure 43:
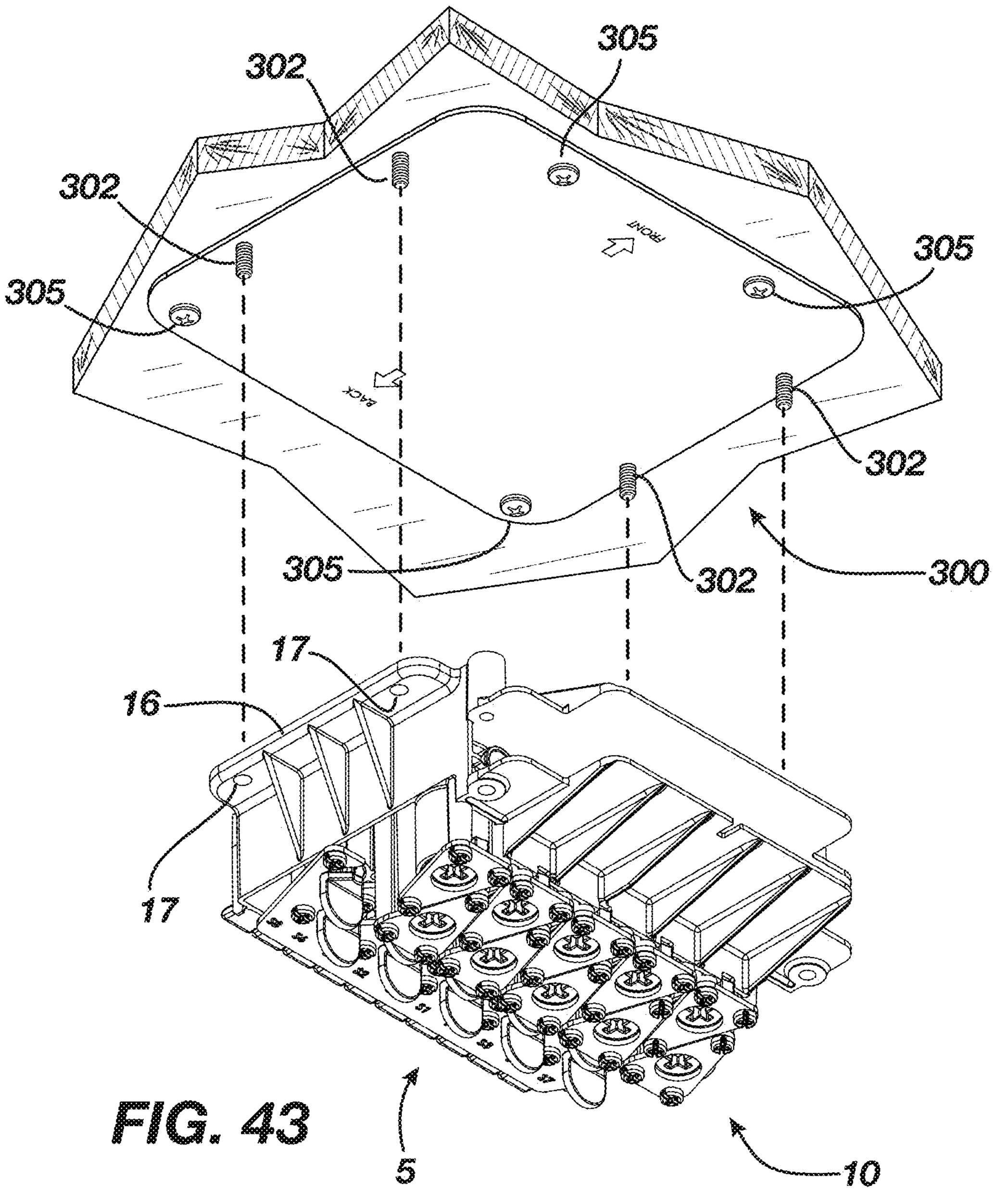
FIG. 43 is a partially exploded bottom isometric view illustrating various aspects of the attachment of the fluid flow controller to the mounting plate.
Figure 44:
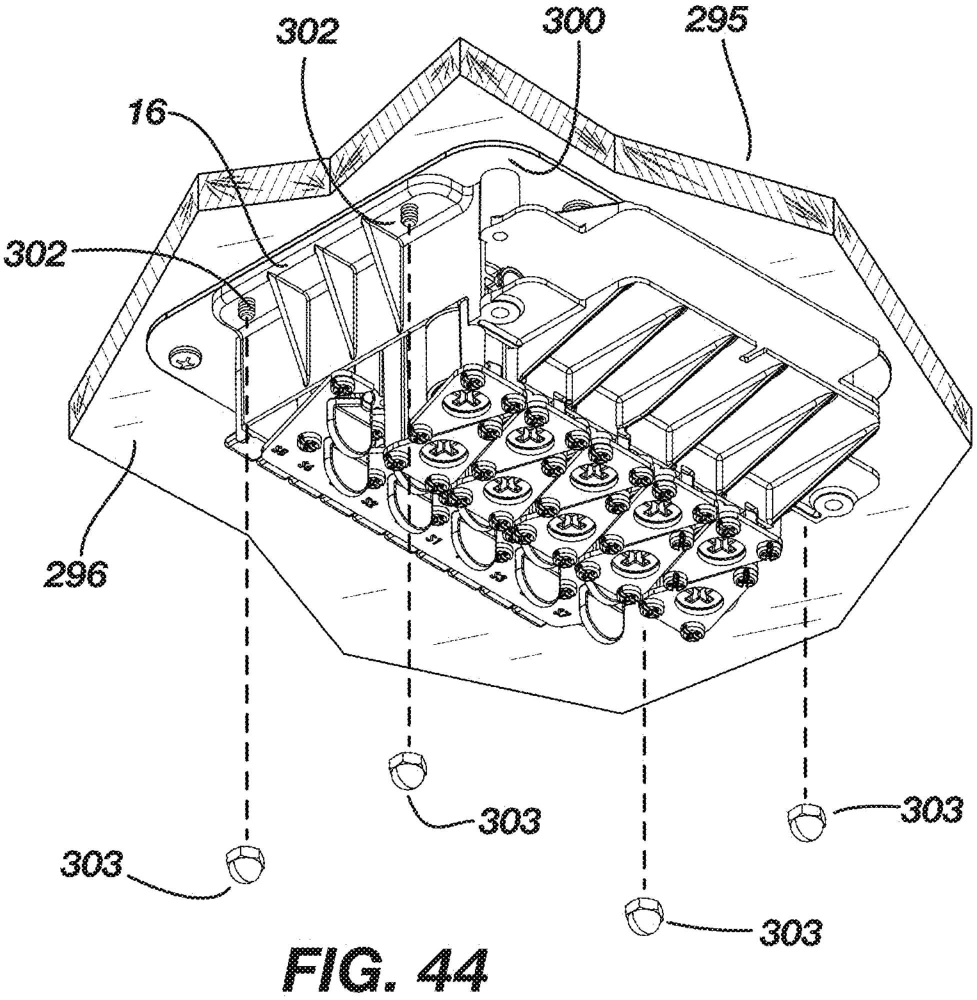
FIG. 44 is a partially exploded bottom isometric view illustrating various aspects of the securement of the fluid flow controller to the mounting plate.
Figure 45:
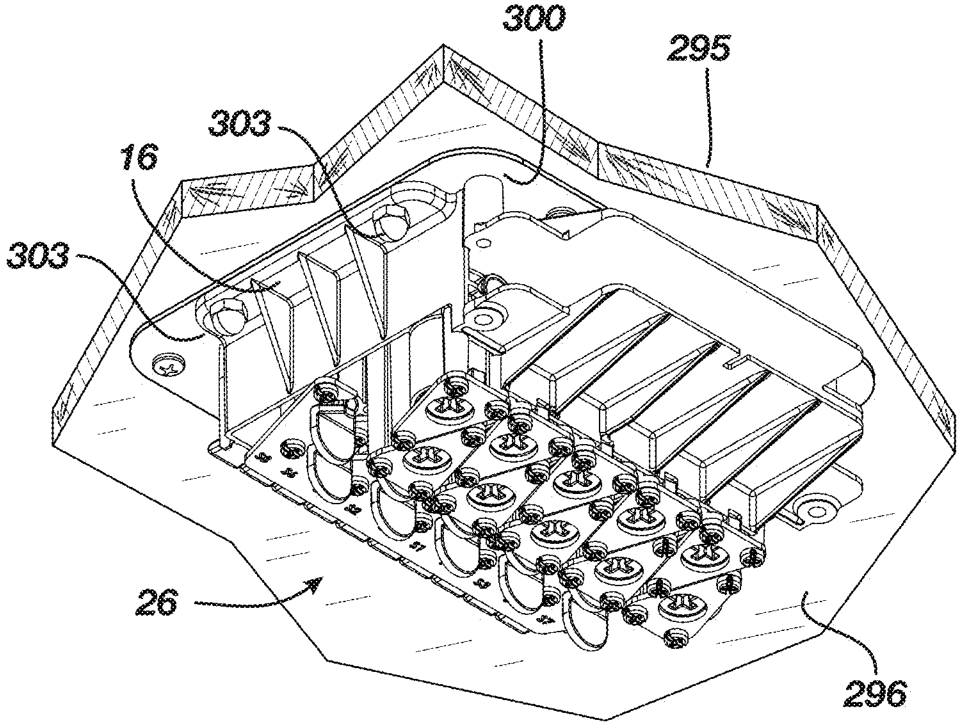
FIG. 45 is a bottom isometric view illustrating various aspects of the fluid flow controller as secured through the mounting plate to a location for use of the flow rate controller, such as the undersurface of a beverage service counter.
Figure 46:
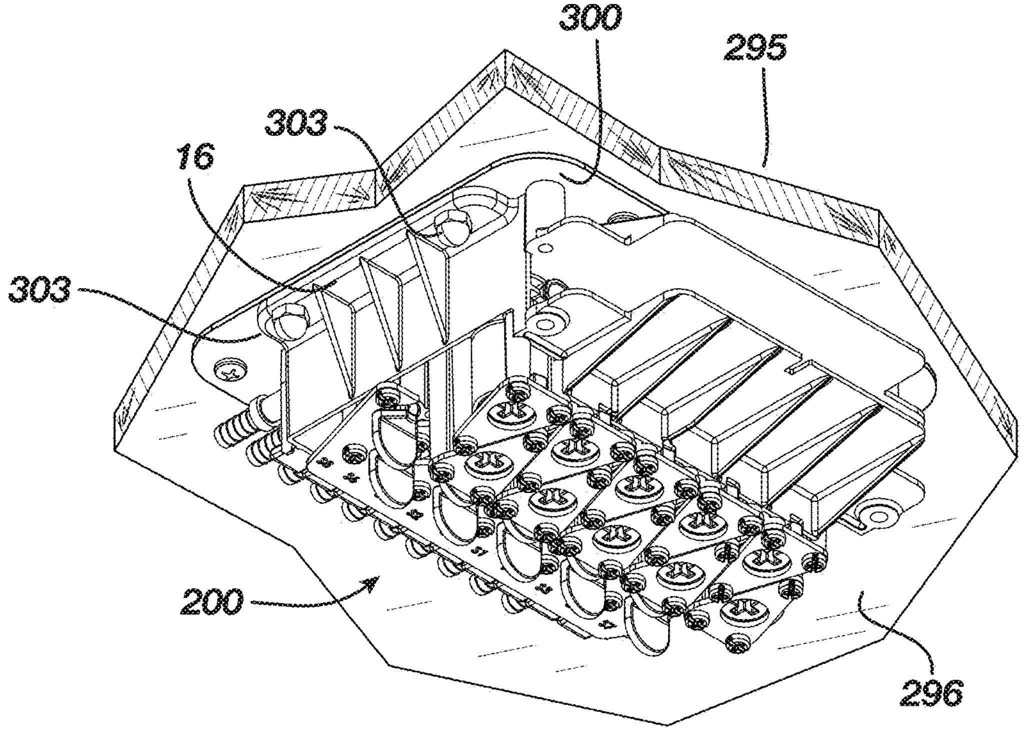
FIG. 46 is a bottom isometric view illustrating various aspects of the fluid flow controller as deployed with a barbed quick connect fitting received within each inlet port of the fluid flow controller.
Figure 47A:
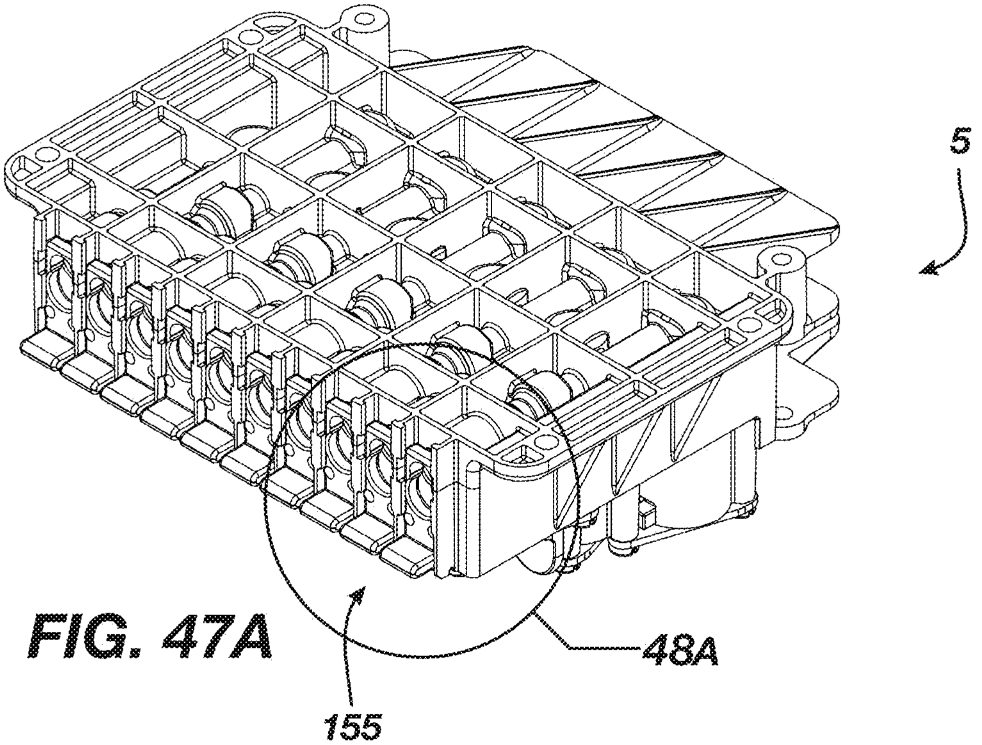
FIGS. 47A-47B and 48A-48B illustrate aspects of the fluid flow controller as configured to operably receive a barbed quick connect fitting in fluid communication with each of the inlet ports of the fluid flow controller, where.
Figure 47B:
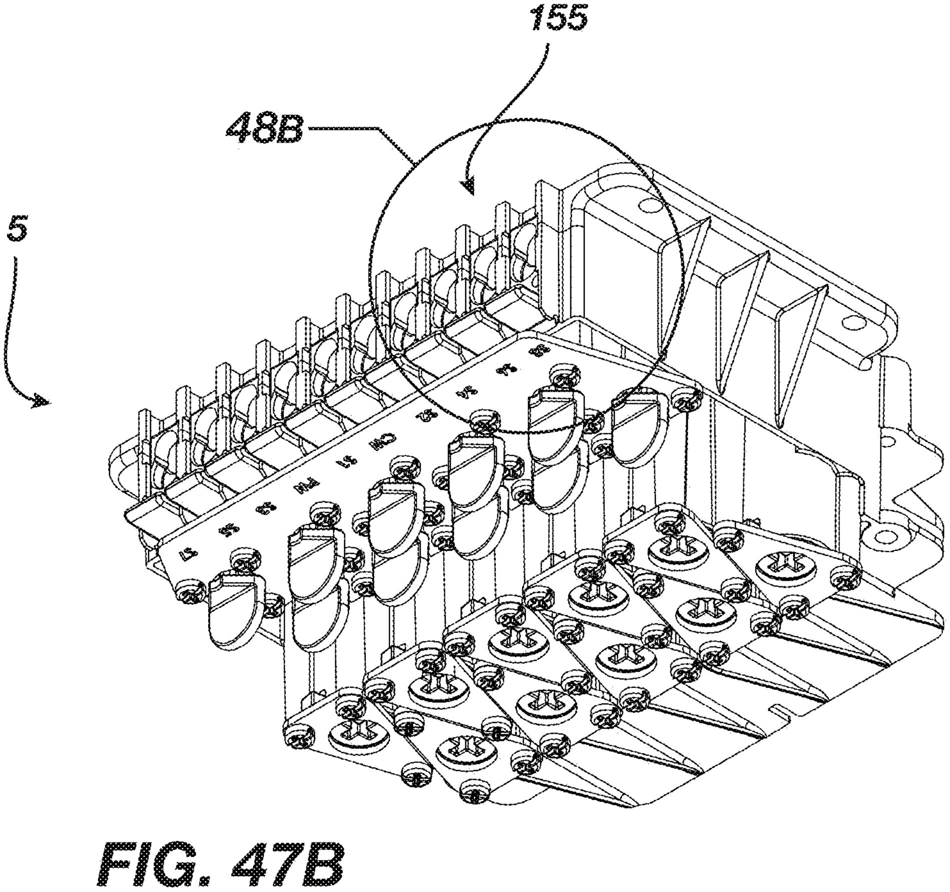
Figure 48A:
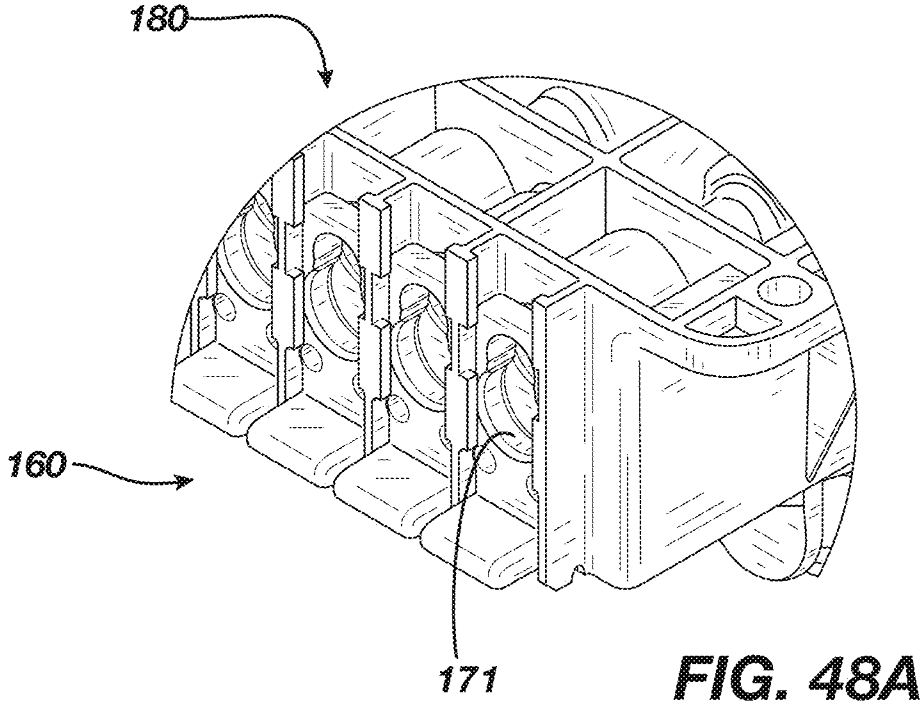
Figure 48B:
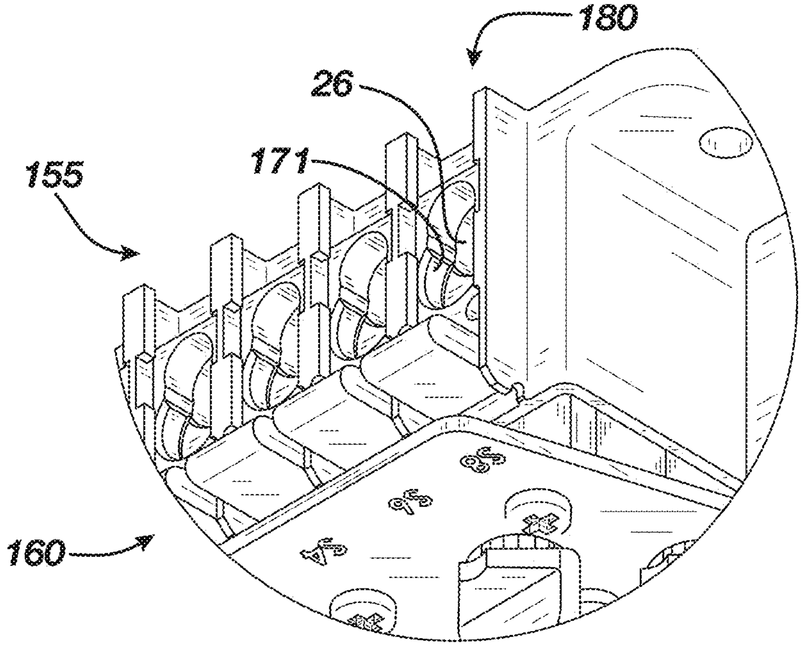
Figure 49A:
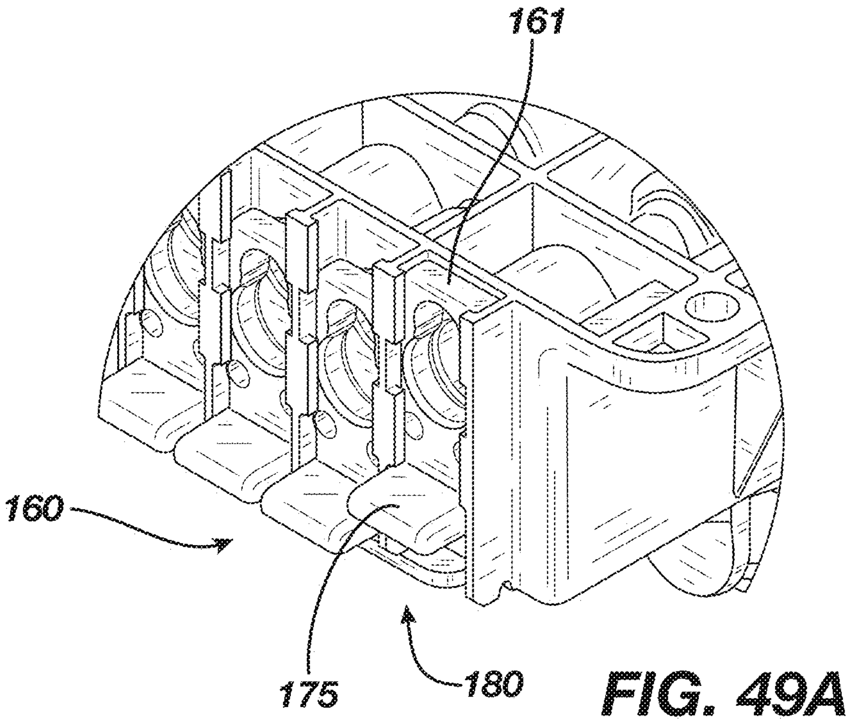
FIGS. 49A-49B illustrate a first step for insertion and securement of a male quick connector of the barbed quick connect fitting operably in place within an exemplary one of the inlet ports, where.
Figure 49B:
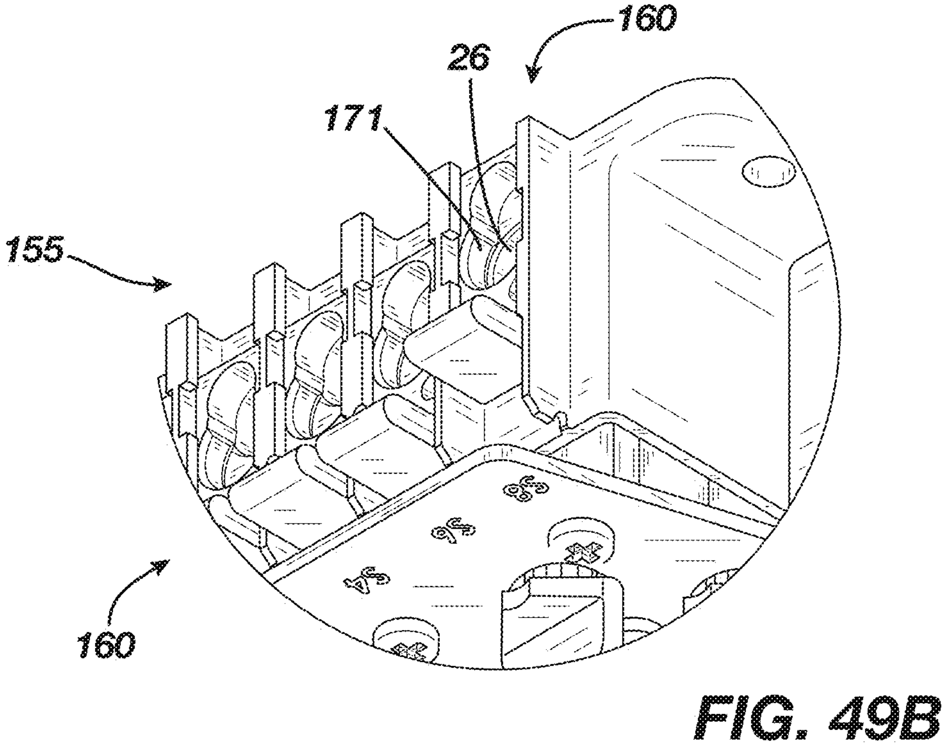
Figure 50A:
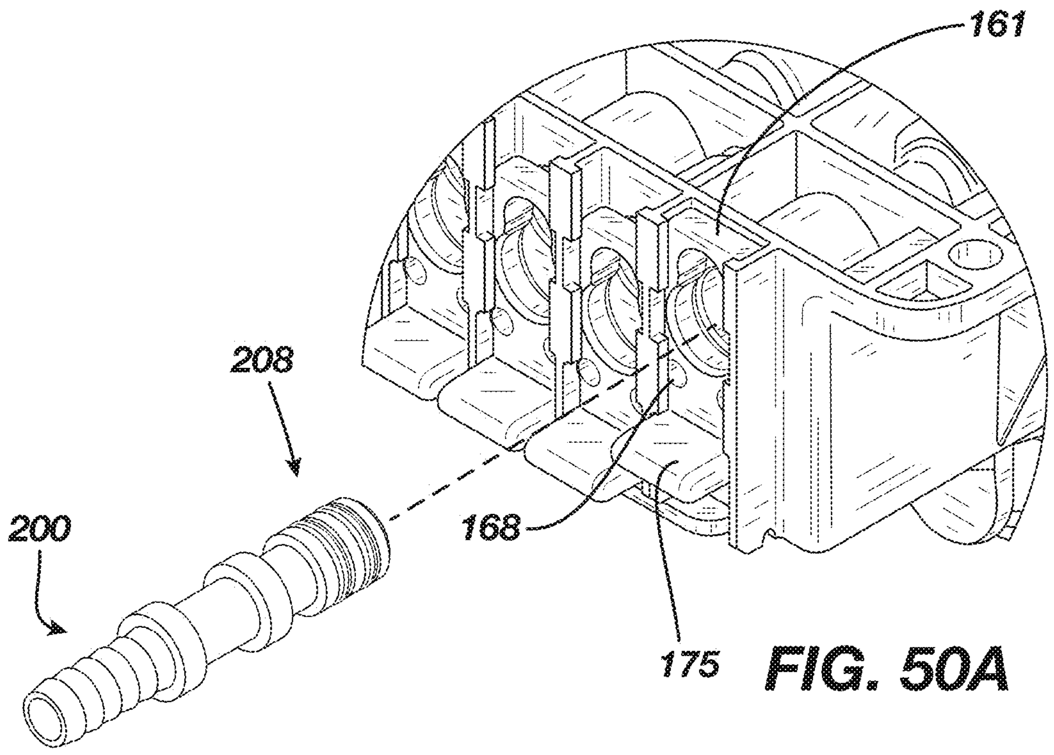
FIGS. 50A-50B illustrate a second step for insertion and securement of a male quick connector of the barbed quick connect fitting operably in place within an exemplary one of the inlet ports, where.
Figure 50B:
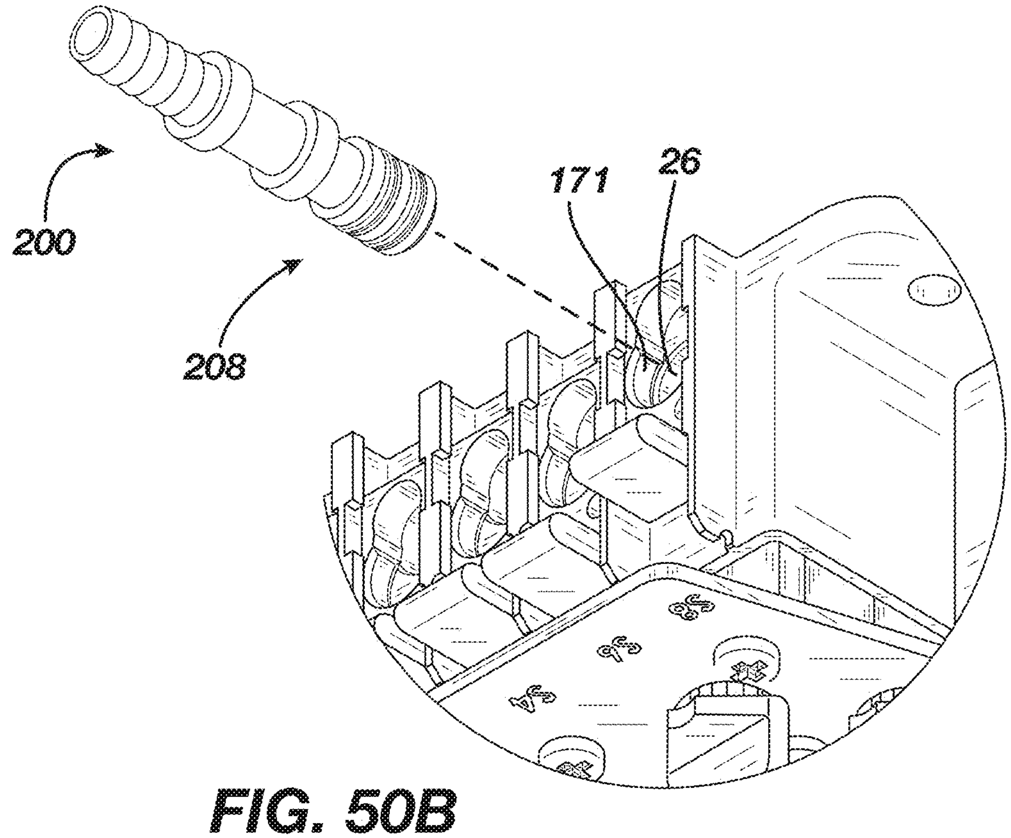
Figure 51A:
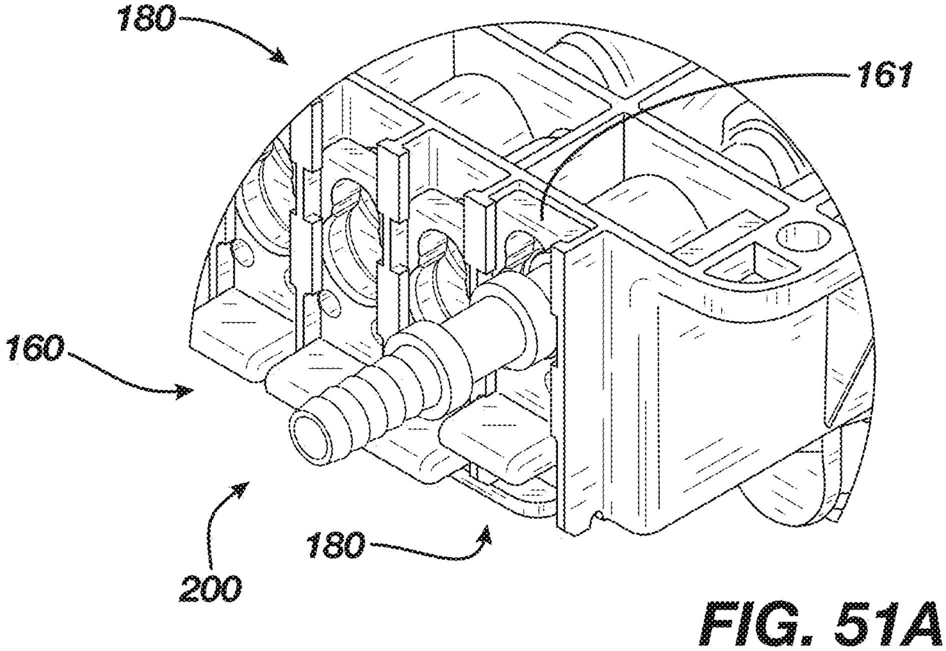
FIGS. 51A-51B illustrate a third step for insertion and securement of a male quick connector of the barbed quick connect fitting operably in place within an exemplary one of the inlet ports, where.
Figure 51B:
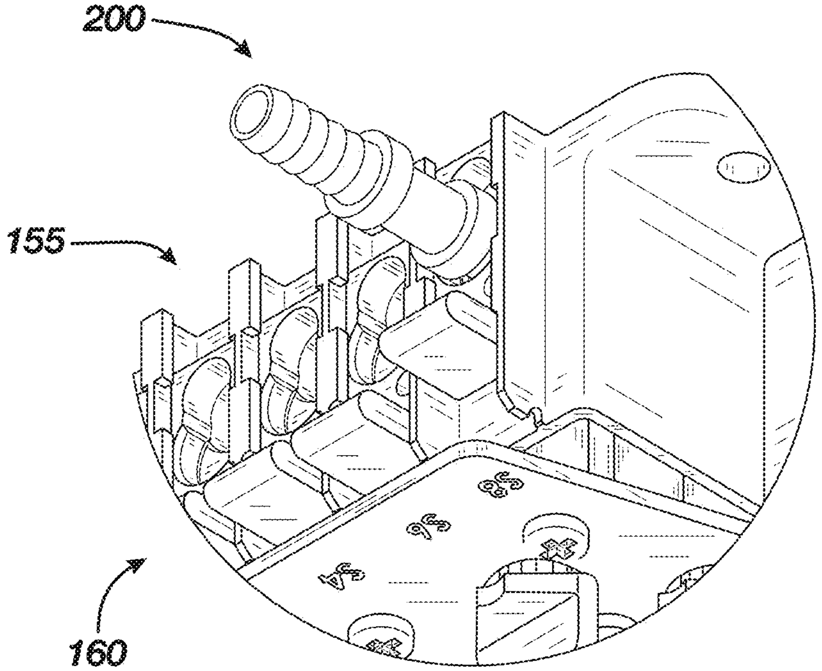
Figure 52A:
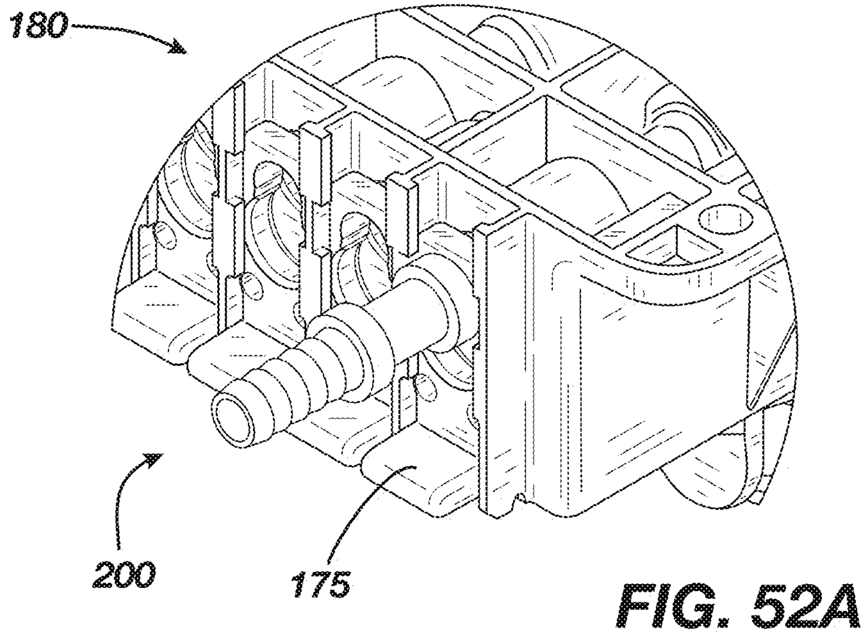
FIGS. 52A-52B illustrate a fourth step for insertion and securement of a male quick connector of the barbed quick connect fitting operably in place within an exemplary one of the inlet ports, where.
Figure 52B:
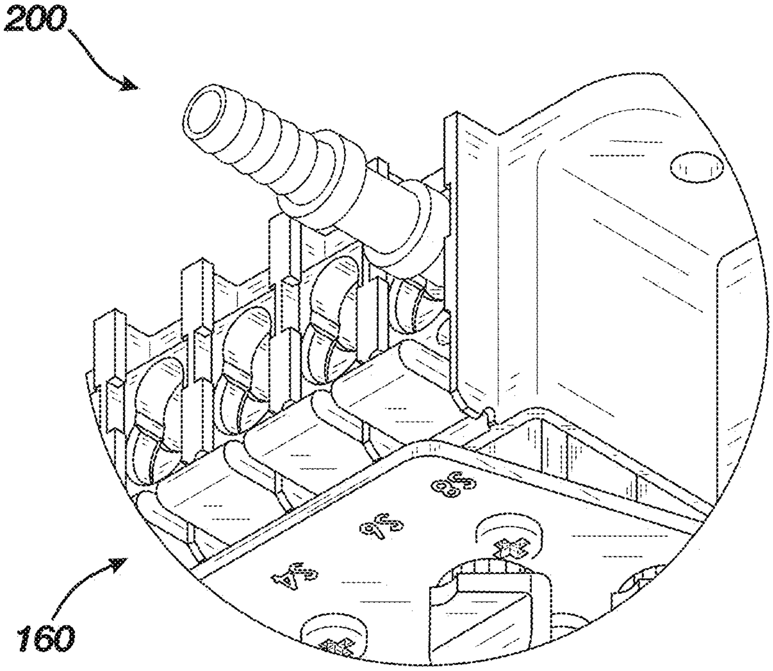
Figure 53A:
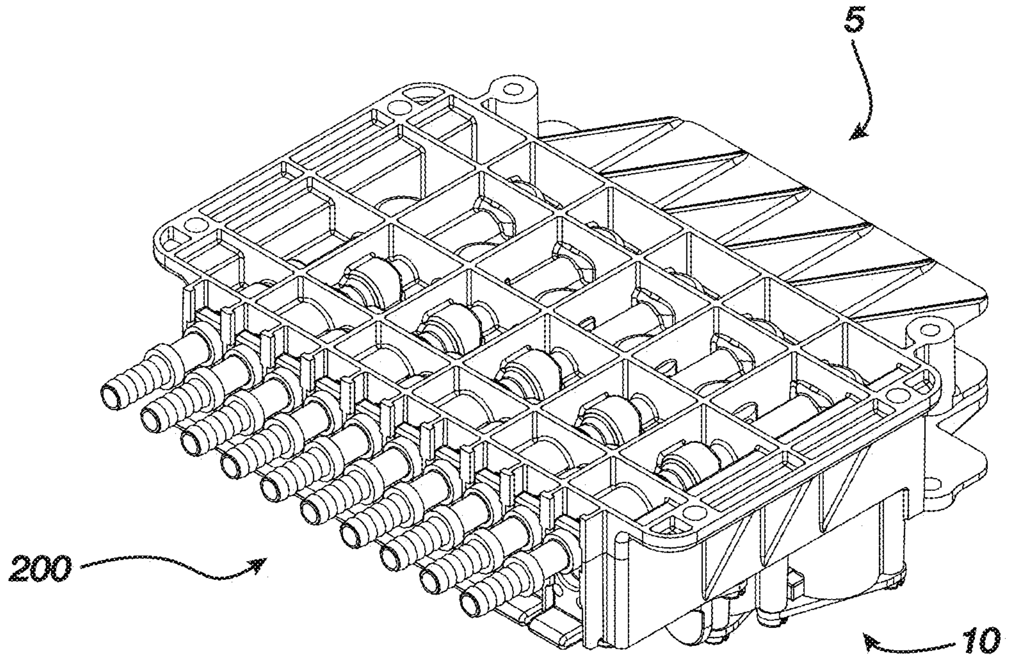
FIGS. 53A-53C illustrate aspects of the fluid flow controller as operably configured with a barbed quick connect fitting in fluid communication with each of the inlet ports of the fluid flow controller, where.
Figure 53B:
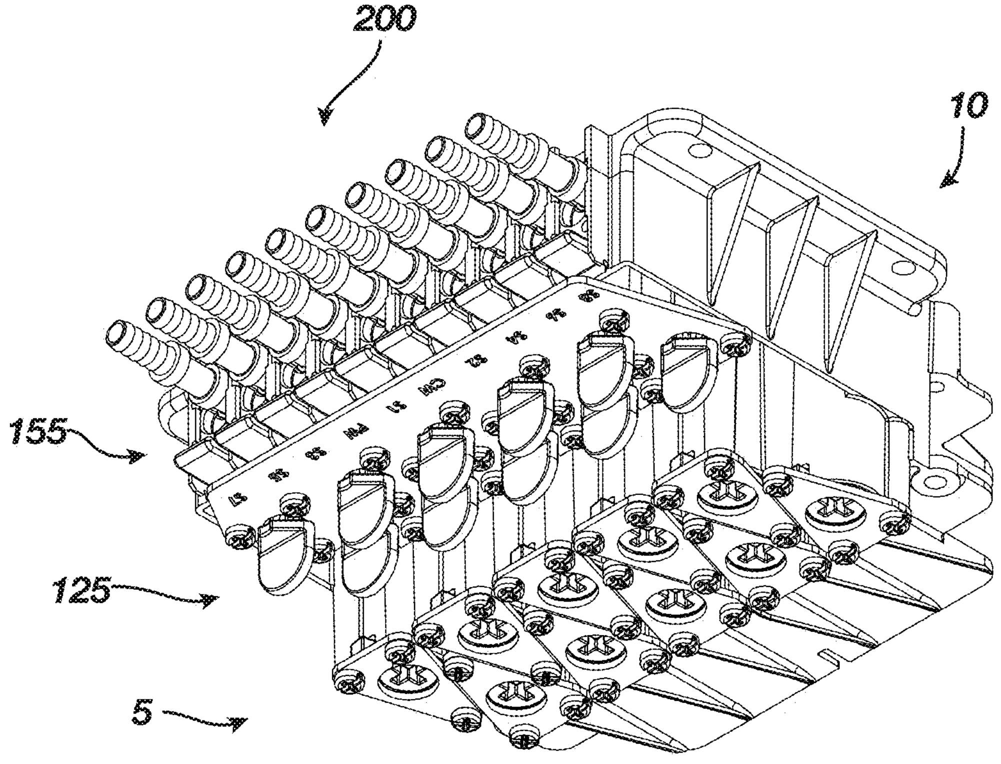
Figure 53C:
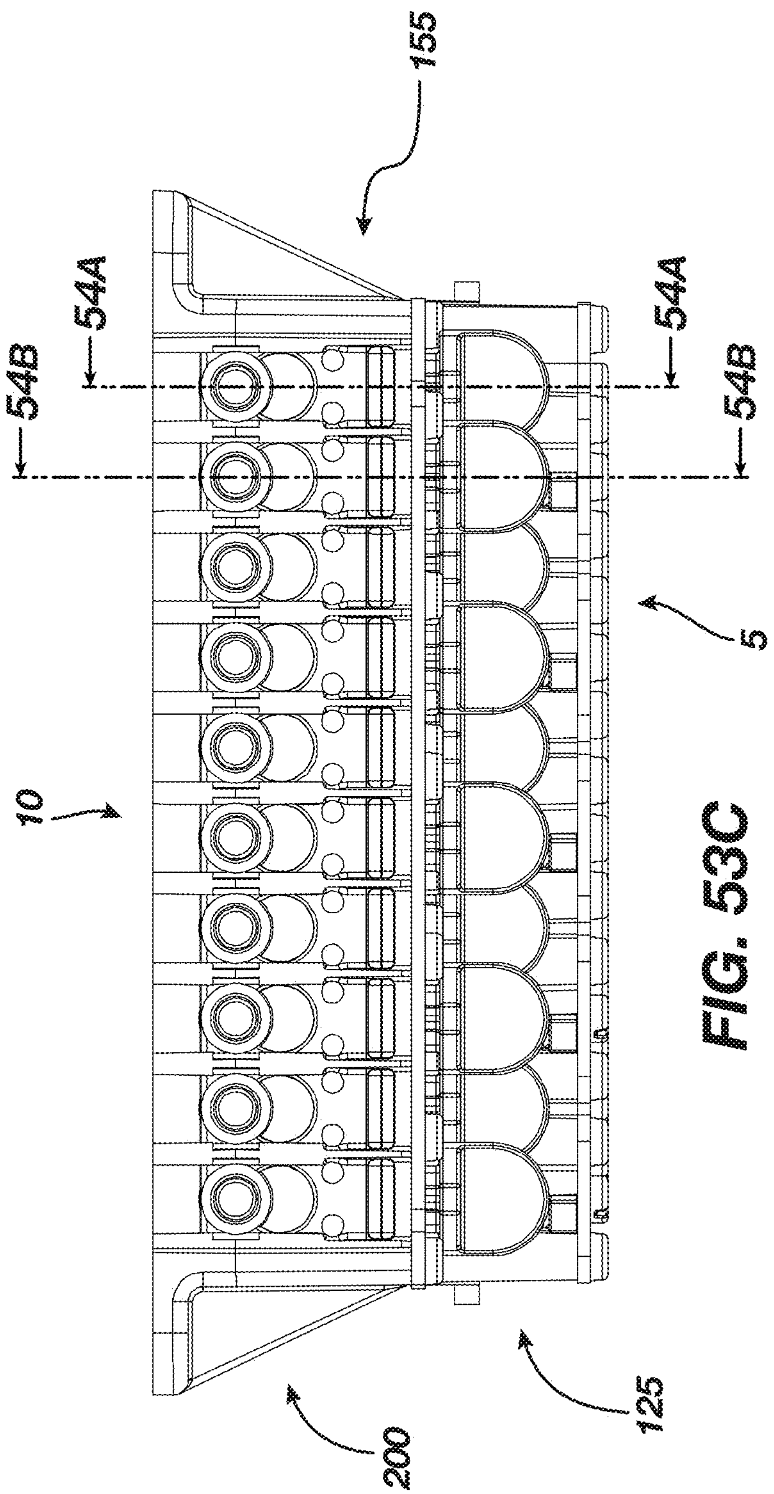
Figure 54A:
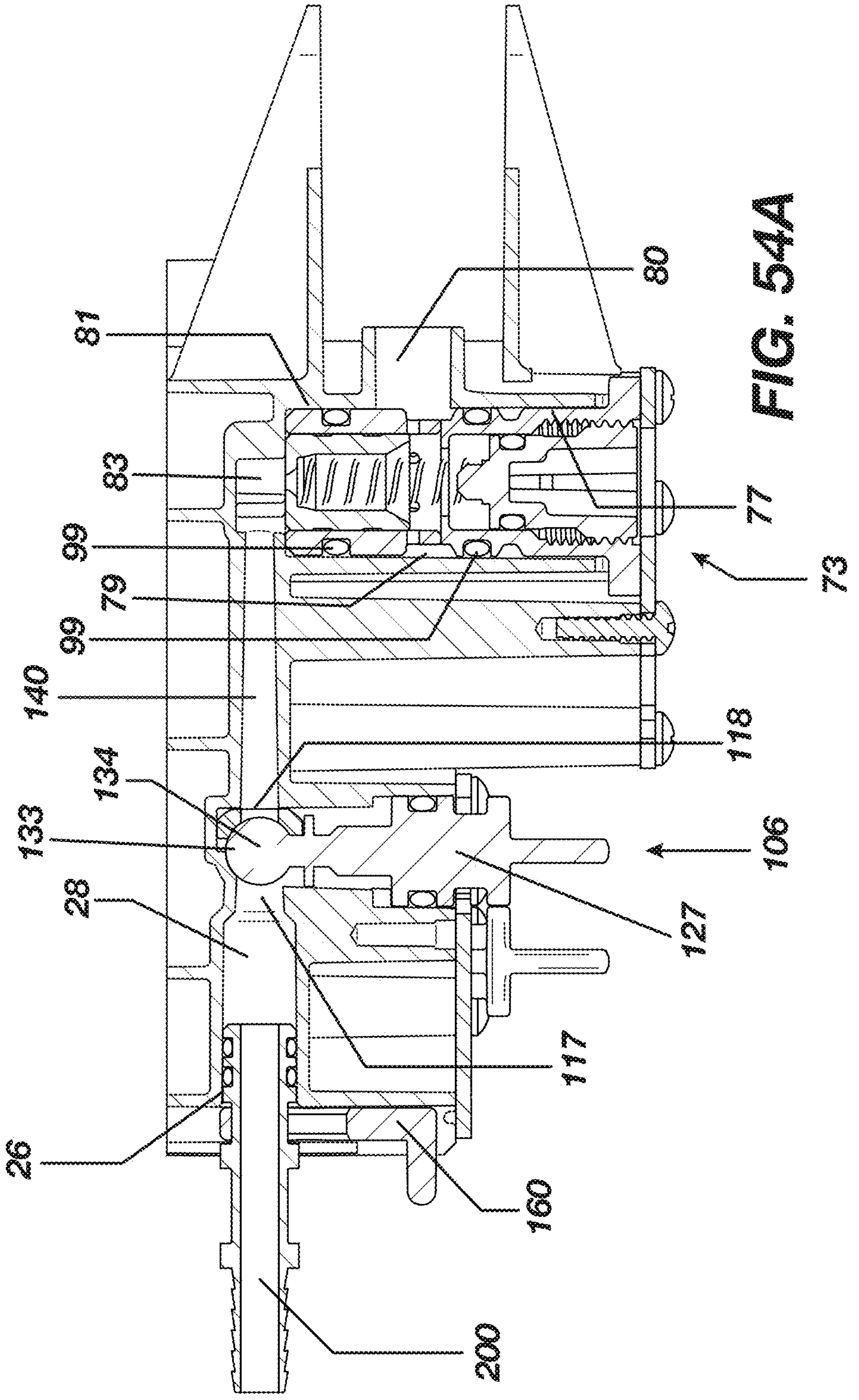
Figure 54B:
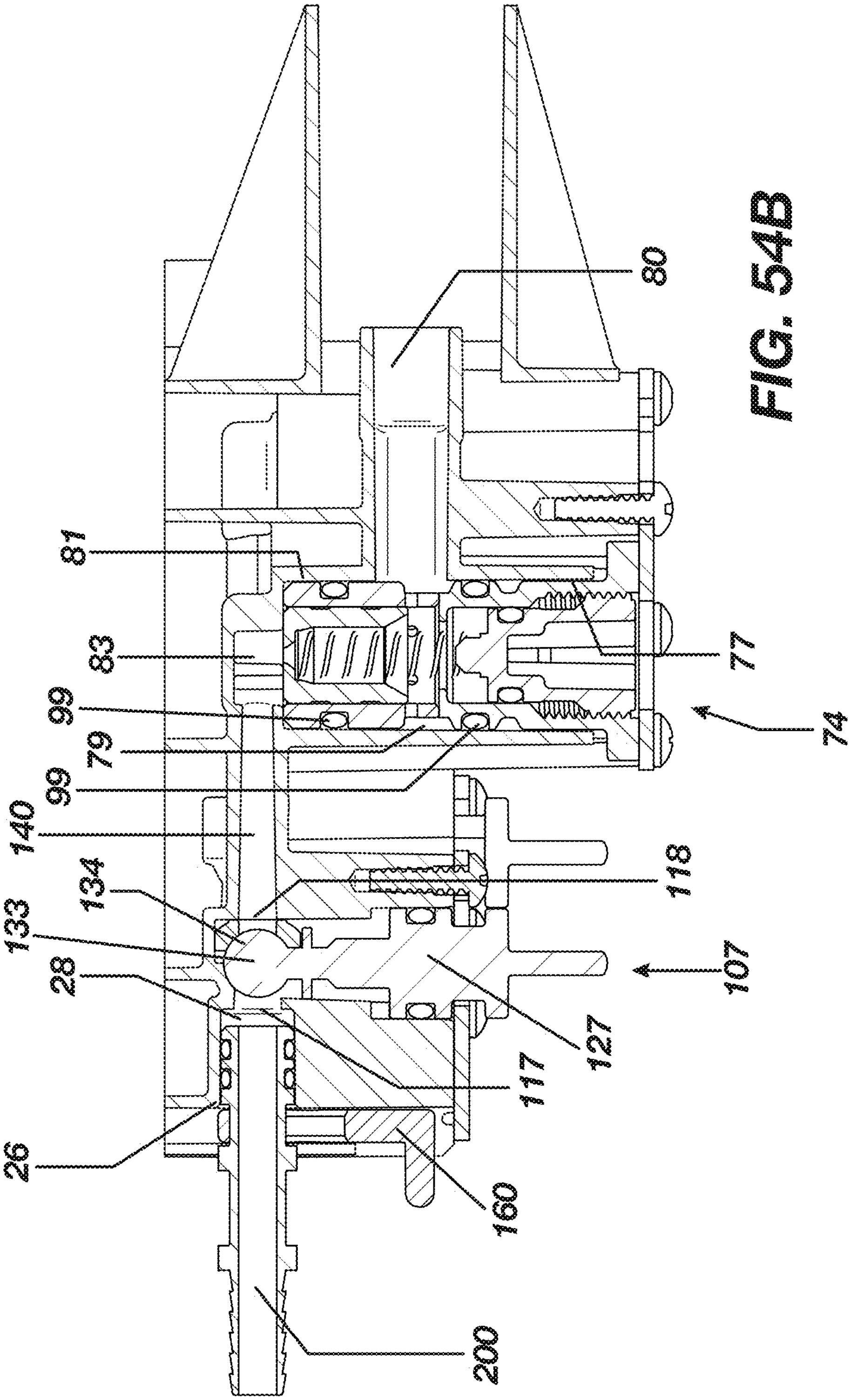

With the assembly body 10 now fully prepared for use in the fluid flow controller 5 of the present invention, FIGS. 40-42 shows various details of the exemplary mounting plate 300, as utilized in FIGS. 43-46 and 66, and illustrates attachment in use of the assembly body 10 to a mounting plate 300. As shown in FIG. 40, the mounting plate 300 most preferably comprises a plurality of downwardly oriented threaded studs 302 for engaging the previously described clearance holes 17 through the flanges 16 extending from the top side 15 of the assembly body 10. Because the mounting plate 300 will generally be flush mounted to the undersurface 296 or other suitable mounting location of a counter 295 or like structure before attachment of the assembly body 10, the most preferred threaded studs 302 are press fit otherwise operably attached at through holes 304 provided about the mounting plate 300. In any case, with the downwardly oriented threaded studs 302 fixed in place about the mounting plate 300, the mounting plate 300 is attached to the undersurface 296 or other suitable mounting location of a counter 295 or like structure utilizing an appropriate number of screws 305 or suitable hardware utilizing clearance holes 304 preferably liberally provided for selective use in otherwise conventionally attaching the mounting plate 302 to the undersurface 296 or other suitable mounting location of a counter 295 or like structure. Finally, the assembly body 10 is raised into engagement through the clearance holes 17 in the flanges 16, and fixed in place, as shown in FIGS. 43-46, using cap nuts 303 or like attachment hardware corresponding to the threaded studs 302.

Figure 55:
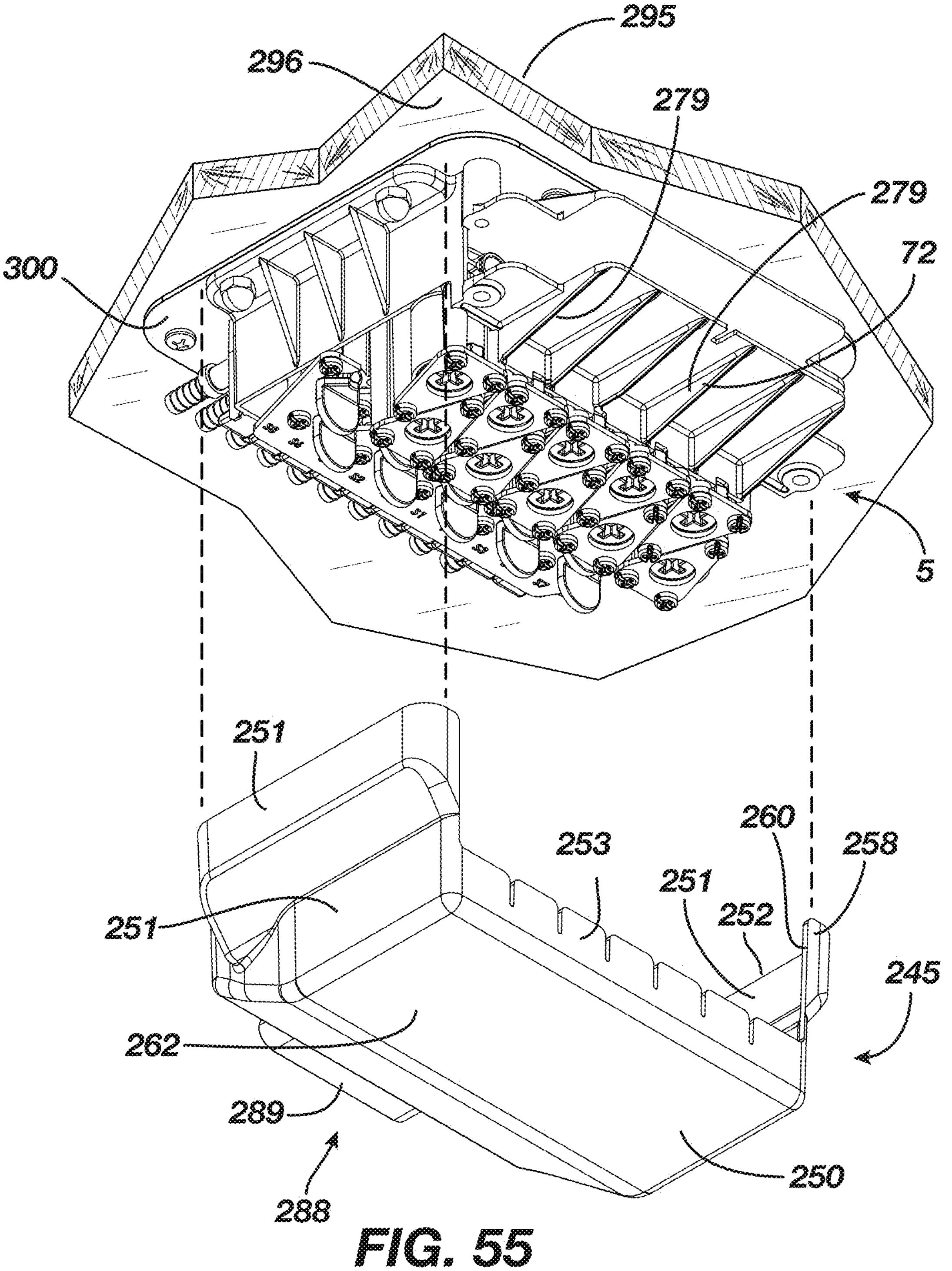

An exemplary splash cover 245 for use in connection with the exemplary implementation of the fluid flow controller 5 includes an enclosure 250 for preventing fluids or other undesirable matter from contacting all but minimal portions of the walls, bosses, ribs, gussets, and other structures of the fluid flow controller 5 or from otherwise infiltrating the spaces formed in or between the structures, as illustrated in FIG. 55. As particularly illustrated in FIGS. 56A-56B in addition to FIG. 55, the enclosure 250 generally includes a set of full-height sidewalls 251 connected one to the other by each of a front wall 253 and a rear wall 256, and a closed bottom 262 joining each of the front wall 253, rear wall 256 and sidewalls. The exemplary splash cover 245 also includes a toolless secure attachment arrangement 275 for the enclosure 250, and thus the splash cover 245, whereby the splash cover 245 is readily attached to or removed from the fluid flow controller 5, as described more fully herein.

As illustrated in FIGS. 57A-57C, each of the sidewalls is contoured to conform closely about a respective sidewall of the assembly body 10, bulging outwardly about, and thereby also conformingly enclosing, each of the gussets between the respective sidewall and the corresponding flange at the top side 15 of the assembly body 10. Each of the full-height sidewalls 251 is also sized, shaped or otherwise cooperatively configured with other features of the splash cover 245 such that the top edge of each sidewall is even with or slightly below the substantially planar top side 15 of the assembly body 10 when the exemplary splash cover 245 is operably secured in place about the exemplary fluid flow controller 5, as particularly illustrated in FIG. 57C.

Figure 56A:
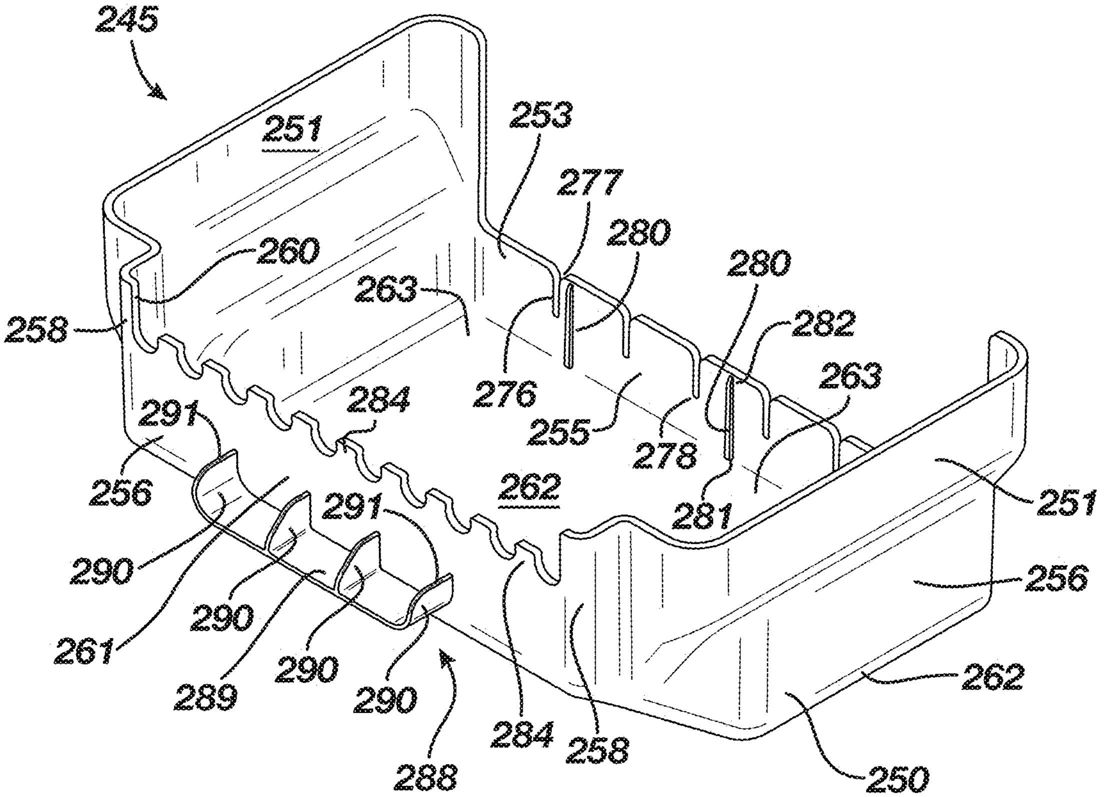

The front wall 253 of the enclosure 250 is sized, shaped or otherwise configured to be generally coextensive with the lower front wall 253 at the front end 45 of the assembly body 10, and the rear wall 256 of the enclosure 250 is sized, shaped or otherwise configured to be generally coextensive with a lower portion of the vertical face 31 at the rear end 25 of the assembly body 10, when the exemplary splash cover 245 is operably secured in place about the exemplary fluid flow controller 5. As particularly implemented in the exemplary splash cover 245, however, the rear wall 256 of the enclosure 250 includes an upwardly extending full-height portion 258 adjacent to each sidewall. Accordingly, the rear wall 256 of the enclosure 250 is also sized, shaped or otherwise cooperatively configured with other features of the splash cover 245 such that the top of each upwardly extending full-height portion 258 of the rear wall 256 is even with or slightly below the substantially planar top side 15 of the assembly body 10 when the exemplary splash cover 245 is operably secured in place about the exemplary fluid flow controller 5, as shown in FIG. 57C. As particularly shown in FIG. 56A illustrating the preferred implementation of the exemplary splash cover 245, the top of each upwardly extending full-height portion 258 is formed or otherwise provided as a unitary continuance of the top edge of the adjacent sidewall.

As illustrated in FIGS. 57A-57C, the closed bottom 262 of the enclosure 250 is sized, shaped or otherwise configured to be generally coextensive with the first tier 21 of the bottom side 20 of the assembly body 10, in close conformance about the flow rate controllers 90 implemented thereat, when the exemplary splash cover 245 is operably secured in place about the exemplary fluid flow controller 5. The closed bottom 262 of the enclosure 250 is also contoured to fold upwardly in close conformance about the shutoff valves implemented in and about the second tier 23 of the bottom side 20 of the assembly body 10 when the exemplary splash cover 245 is operably secured in place about the exemplary fluid flow controller 5, and ultimately interfaces with the rear wall 256 of the enclosure 250.

Figure 56B:
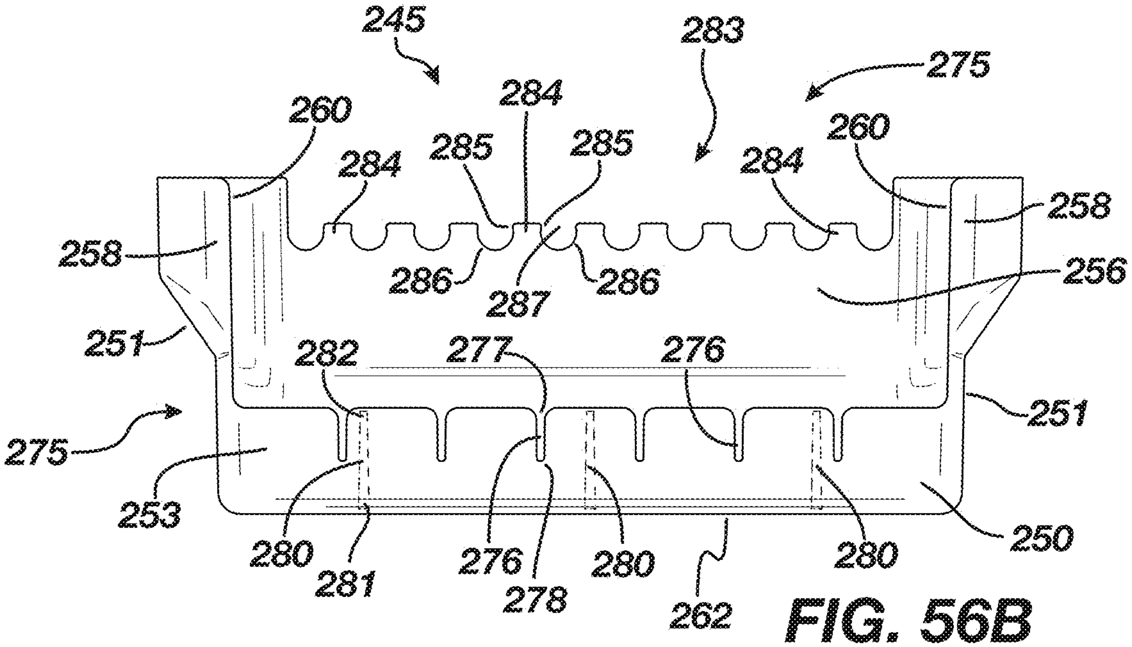

The secure toolless attachment arrangement 275 for the splash cover 245 generally includes specially formed or otherwise provided features of the splash cover 245 as cooperatively configured or otherwise adapted with various aspects of the assembly body 10, and of the specially formed barbed quick-connect fittings 200 as otherwise provided for use in supplying pressurized fluids to the fluid flow controller 5. In particular, a plurality of slots 276 are specially formed or otherwise provided through the top edge of the front wall 253 of the enclosure 250, as shown in FIGS. 56A-56B, for implementing an attachment of the splash cover 245 about the front end 45 of the assembly body 10, as described more fully herein. As also shown in FIGS. 56A-56B, a multiplicity of snaps 283 are specially formed or otherwise provided within a particularly castellated top edge of the rear wall 256 of the enclosure 250, for implementing an attachment of the splash cover 245 about the rear end 25 of the assembly body 10, as also described more fully herein.

The plurality of gussets 72 between the exterior, bottom side 68 of the lower guide member 64 and the lower front wall 253 of the assembly body 10, as provided in implementation of the fluid line attachment receptacle 55 of the fluid line attachment arrangement 275 for the exemplary fluid flow controller 5, includes a plurality of slot-engaging gussets 279 equal to the plurality of tapered slots 276 provided through the top edge of the front wall 253 of the enclosure 250 of the splash cover 245, and which form or otherwise provide a feature of the secure toolless attachment arrangement 275 for the splash cover 245. In accordance with the secure toolless attachment arrangement 275 for the splash cover 245 as implemented in connection with the exemplary fluid flow controller 5, the plurality of slot-engaging gussets 279 includes each of the plurality of gussets 72 between the exterior, bottom side 68 of the lower guide member 64 and the lower front wall 253 of the assembly body 10, as illustrated in FIG. 60 and more described fully herein. In alternative implementations, however, it is possible that only a subset of the of the gussets 72 between the exterior, bottom side 68 of the lower guide member 64 and the lower front wall 253 of the assembly body 10 implement a respective one of the slot-engaging gussets 279.

As illustrated in FIGS. 58A-58B for use in connection with the exemplary implementation of the fluid flow controller 5, each of the plurality of slots 276 in the front wall 253 of the enclosure 250 is specially formed or otherwise provided to releasably frictionally engage a corresponding one of the slot-engaging gussets 279 otherwise provided between the exterior, bottom side 68 of the lower guide member 64 and the lower front wall 253 of the assembly body 10. In particular, each slot tapers between an open end 277 at the top edge of the front wall 253 and a distal end 278, and is sized, shaped, located or otherwise cooperatively configured with the corresponding slot-engaging gusset to engage the gusset in a transition fit, whereby the operably engaged slots 276 and corresponding slot-engaging gussets 279 are readily manually separated one from another but otherwise remain securely fixed together. As described more fully herein, the exemplary implementation of the attachment about the front end 45 of the assembly body 10 also includes a plurality of substantially identical tapered rails 280, each of which is specially formed or otherwise provided along the interior side 255 of the front wall 253 of the enclosure 250, as illustrated in FIGS. 56A-56B. Each tapered rail is vertically oriented along the front wall 253, and as particularly implemented for the exemplary splash cover 245 each rail also tapers from the bottom end 281 of the rail, adjacent to the interior side 263 of the closed bottom 262 of the enclosure 250, to the top end 282 of the rail, adjacent to the top edge of the front wall 253 of the enclosure 250.

As illustrated in FIGS. 59A-59B for use in connection with the exemplary implementation of the fluid flow controller 5, each of the multiplicity of snaps 283 is specially formed or otherwise provided within the castellated top edge of the rear wall 256 of the enclosure 250 to releasably snap into place about, or otherwise similarly circumferentially engage, the barrel 217 between the upstream and intermediate collars of a corresponding one of the specially formed barbed quick-connect fittings 200, as otherwise operably secured in fluid communication with a corresponding inlet port 26 at the rear end 25 of the assembly body 10 for supplying a pressurized fluid to the fluid flow controller 5. In particular, each snap 283 other than the outermost two snaps 283 provided adjacent a respective one of the sidewalls of the enclosure 250 is formed or otherwise provided as an arcuate notch 286 between an adjacent pair of the evenly spaced parapets 284 forming the castellated top edge of the rear wall 256 of the enclosure 250. In the case of the outermost two snaps 283 provided adjacent a respective one of the sidewalls of the enclosure 250, each snap 283 is formed or otherwise provided as an arcuate notch 286 between the adjacent parapet 284 and a cooperatively configured or otherwise adapted inside edge 260 of an upwardly extending full-height portion 258 of the rear wall 256, as illustrated in FIGS. 56A-56B. Each of a pair of rounded corners 285 of each parapet 284 is formed or otherwise provided between the portion of the top edge of the rear wall 256 that is provided by the parapet 284 and an intersecting portion of an adjacent arcuate notch 286, and is preferably rounded or similarly relieved to facilitate engagement of the corresponding snap 283 with and about a specially formed barbed quick-connect fitting 200, and disengagement therefrom, as described more fully herein. An open mouth 287 for each snap 283 is thus formed or otherwise provided according to the divide across the arcuate notch 286 between the respective rounded or similarly relieved corners of the adjacent parapets 284, or, in the case of the two outmost snaps 283, according to the divide across the arcuate notch 286 between the rounded or similarly relieved corner of the adjacent parapet 284 and the inside edge 260 of the adjacent upwardly extending full-height portion 258 of the rear wall 256. As described more fully herein, the open mouth 287 and arcuate notch 286 of each snap 283 are sized, shaped, located or otherwise cooperatively configured such that each snap 283 is adapted to frictionally engage the barrel 217 of a corresponding one of the specially formed barbed quick-connect fittings 200 in a snap fit about the barrel 217, as particularly illustrated in FIGS. 59A-59B.

Although fewer could be implemented, the presently preferred embodiment of the exemplary splash cover 245, as provided for use in connection with the exemplary fluid flow controller 5, includes a multiplicity of snaps 283 equal to the multiplicity of inlet ports 26 implemented at the rear end 25 of the assembly body 10, as illustrated in FIG. 59A. As described more fully herein, the exemplary splash cover 245 is also cooperatively configured or otherwise adapted with the exemplary fluid flow controller 5 to substantially simultaneously engage the barrel 217 of each operably secured specially formed barbed quick-connect fitting 200 as the splash cover 245 is affixed in place about the fluid flow controller 5. Accordingly, the multiplicity of snaps 283 are vertically aligned and evenly spaced horizontally across the rear wall 256 of the enclosure 250, and otherwise arranged within the castellated top edge of the rear wall 256 of the enclosure 250, such that each implemented snap 283 is located in correspondence with one of the multiplicity of the inlet ports 26 at the rear end 25 of the assembly body 10 of the fluid flow controller 5. To this end, the exemplary splash cover 245 is further cooperatively configured or otherwise adapted with the exemplary fluid flow controller 5 such that the arcuate notch 286 of each snap 283 is axially aligned with a corresponding one of the inlet ports 26 when the exemplary splash cover 245 is operably affixed in place about the exemplary fluid flow controller 5, as particularly illustrated in FIGS. 59A-59B.

In the preferred embodiment of the secure toolless attachment arrangement 275 for the splash cover 245, each snap 283, as adapted for releasably engaging a specially formed barbed quick-connect fitting 200, is implemented to provide a sufficiently light snap fit about the barrel 217 of the barbed quick-connect fitting 200 so as to prevent inadvertent damage to, or interference with the operable placement of, any individual barbed quick-connect fitting 200, and to generally avoid having deleterious effects on the barbed quick-connect fittings 200 or their fluid tight engagement with the inlet ports 26, while nonetheless cumulatively providing a reliable securement for the splash cover 245. In the preferred embodiment of the exemplary splash cover 245 for use with the exemplary fluid flow controller 5, the arcuate notch 286 of each snap 283 has a diameter substantially corresponding to the cross-sectional diameter of the barrel 217 of the barbed quick-connect fitting 200, and the corresponding open mouth 287 across the arcuate notch 286 of each snap 283 spans a divide having a width on the order of about 95-97% of the cross-sectional diameter of the barrel 217. Those of ordinary skill in the relevant arts will recognize and understand, in light of this exemplary description, that this optimization is dependent on and must account for the physical properties of the material of construction for at least the enclosure 250 of the splash cover 245, including, for example, the malleability of the material. The required optimization is, however, well within the level of ordinary skill in the relevant arts, especially in light of this exemplary description. In accordance with the preferred implementation of the snaps 283, the width of each divide defining an open mouth 287 across a corresponding arcuate notch 286 is substantially equal to that of each other divide, except that each divide defining an open mouth 287 of an outermost snap 283 is slightly wider to accommodate the relatively rigid inside edge 260 of the adjacent upwardly extending full-height portion 258 of the rear wall 256 of the enclosure 250.

In addition to the foregoing optimizations, however, a specially formed or otherwise provided finger hold 288, as illustrated in FIGS. 57A-57C, is preferably implemented to further facilitate removal, and as necessary or otherwise desired by a user, to further facilitate application, of the exemplary splash cover 245, as described more fully herein in connection with the exemplary fluid flow controller 5. As particularly illustrated in FIGS. 56A and 59A-59B, the finger hold 288 includes a transversely oriented, rearwardly projecting elongate tab 289, which is formed with or otherwise provided at the exterior side 261 of the rear wall 256 of the enclosure 250. A plurality of gussets 290 are formed or otherwise provided between the elongate tab 289 and an adjacent exterior side 261 of the rear wall 256, one or two of which may also form a respective end of the elongate tab 289. As will be described more fully herein, the gussets 290 are spaced one to another or otherwise provided to readily accommodate and optimally locate a user's finger tips as the user interacts with the elongate tab 289 of the finger hold 288 to remove the splash cover 245 from the fluid flow controller 5. The gussets 290 also, however, operate in the typical fashion to prevent fatigue cracking or like damage at intersection of the elongate tab 289 and the exterior side 261 of the rear wall 256 of the enclosure 250 of the splash cover 245.

For use of the exemplary splash cover 245 in connection with the exemplary fluid flow controller 5, the splash cover 245 is raised by a user in place below and about various features of the fluid flow controller 5, as illustrated in FIG. 55, and is first affixed at the front end 45 of the assembly body 10. In particular, the user manually applies upward force against a portion of the closed bottom 262 of the enclosure 250 adjacent the front wall 253 of the enclosure 250 with, for example, the user's palm or other aspect of the user's typically open hand. As the user manually applies upward force to the front wall 253 of the enclosure 250 upward and about the assembly body 10, the tapered slots 276 provided through the top edge of the front wall 253 of the enclosure 250 of the splash cover 245 engage the corresponding slot-engaging gussets 279, as illustrated in FIGS. 58A-58B, as otherwise implemented as features of the assembly body 10, as illustrated in FIG. 60. As the user continues to apply upward force to the front wall 253 of the enclosure 250, the transition fit between each tapered slot and corresponding slot-engaging gusset tightens until the front wall 253 of the enclosure 250 is substantially operably in place, thereby providing partial support in place for the splash cover 245.

While the user initially effects the front attachment for the splash cover 245 about the front end 45 of the assembly body 10, the top edge of the rear wall 256 of the enclosure 250 is manually supported by the user just below the horizontally aligned set of specially formed barbed quick-connect fittings 200 as are otherwise operably secured in fluid communication with a corresponding inlet port 26 at the rear end 25 of the assembly body 10 for supplying a pressurized fluid to the fluid flow controller 5. With the splash cover 245 initially attached operably in place about the front end 45 of the assembly body 10, however, the rear attachment for the splash cover 245 is effected at the rear end 25 of the assembly body 10. In particular, the user manually applies upward force against a portion of the closed bottom 262 of the enclosure 250 adjacent the rear wall 256 of the enclosure 250 with, for example, the user's palm or other aspect of the user's typically open hand, or, if easier for or otherwise desired by the user, the user may manually apply upward force against the elongate tab 289 of the finger hold 288 with, for example, the user's finger tips. As illustrated in FIGS. 57A and 59A-59B, the snaps 283 provided within the top edge of the rear wall 256 of the enclosure 250 of the splash cover 245 releasably engage the respective barrels 217 of corresponding operably connected barbed quick-connect fittings 200 to snap the top edge of the rear wall 256 of the enclosure 250 of the splash cover 245 operably in place at the rear end 25 of the assembly body 10, as described more fully herein, thereby cooperating with the first attachment to provide full support in place for the splash cover 245, as illustrated in FIGS. 57A-57C and 60. Additional upward force, however, may be manually applied against the portion of the closed bottom 262 of the enclosure 250 adjacent to the front wall 253 of the enclosure 250, thereby doubly ensuring that following attachment of the splash cover 245 at the rear end 25 of the assembly body 10 the tapered slots 276 provided through the top edge of the front wall 253 of the enclosure 250 of the splash cover 245 remain fully engaged with the corresponding slot-engaging gussets 279.

In the exemplary implementation of the fluid flow controller 5, each of the plurality of slot-engaging gussets 279, as provided in connection with the secure toolless attachment arrangement 275 for the splash cover 245, is implemented as one of the plurality of gussets 72 between the exterior, bottom side 68 of the lower guide member 64 and the lower front wall 253 of the assembly body 10, as provided in connection with the fluid line attachment receptacle 55 of the exemplary implementation of the fluid flow controller 5 to give the lower guide member 64 rigidity against flexion. As previously described, the provided rigidity facilitates receiving and securing the fluid line attachment assembly within the fluid line attachment receptacle 55 at the front end 45 of the assembly body 10, and thereafter protects the lower guide member 64 from breaking away from the assembly body 10 under strain from support of the fluid line attachment assembly and associated fluid line assembly. The gussets 72 between the exterior, bottom side 68 of the lower guide member 64 and the lower front wall 253 of the assembly body 10 are formed or otherwise provided as unitary elements of the assembly body 10 consistent, to the extent practicable, with the various objects of the invention. In particular, and like other structural reinforcements of the assembly body 10, the gussets 72 as provided for strengthening of the lower guide member 64 of the fluid line attachment receptacle 55 are optimized for injection molding unitary with the assembly body 10, wherefore the gussets 72 are patterned to stiffen the lower guide member 64 to produce a lightweight yet stable and durable fluid line attachment arrangement 275 for the fluid flow controller 5. To meet the mold release draft requirements of the preferred injection molding process of the exemplary implementation of the assembly body 10, the gussets 72 taper away from the exterior, bottom side 68 of the lower guide member 64 and from the lower front wall 253 of the assembly body 10.

The mold release draft profile of each structural gusset forming a slot-engaging gusset must be reliably accounted for, notwithstanding the variance of the profile with distance away from the lower front wall 253 of the assembly body 10, for each slot in the front wall 253 of the enclosure 250 to frictionally engage a corresponding one of the slot-engaging gussets 279 in the desired transition fit, as is necessary to ensure reliably optimal attachment about the assembly body 10 of the front end of the splash cover 245. Consequently, for optimal implementation of the attachment about the front end 45 of the assembly body 10, each of the slots 276 provided in the front wall 253 of the enclosure 250 must intersect a slot-engaging gusset at the precise location along the gusset where exists a known thickness profile, and at which the slot is cooperatively configured with the gusset to obtain the desired transition fit of the slot about the gusset. The specially formed tapered rails 280 as provided along the interior side 255 of the front wall 253 of the enclosure 250 enable a user, with minimal effort and no peculiar skill being required, to consistently accurately position the front wall 253 of the enclosure 250 at the optimal location along the slot-engaging gussets 279 for attachment to the front end 45 of assembly body 10.

In particular, as the user initially affixes the front wall 253 of the enclosure 250 about the front end 45 of the assembly body 10, the user need only hold the top end 282 of each tapered rail firmly but slidingly against the lower front wall 253 of the assembly body 10, and thereafter simply maintain each tapered rail in sliding engagement with the lower front wall 253 as the user continues to manually provide upward force against a portion of the closed bottom 262 of the enclosure 250 adjacent the front wall 253 of the enclosure 250. As the front wall 253 of the enclosure 250 rides up the lower front wall 253 of the assembly body 10 against the tapered rails 280, each of the tapered slots 276 engages and thus tightens about a corresponding slot-engaging gusset. As the point of contact along each tapered rail with the lower front wall 253 of the assembly body 10 moves toward the bottom end 281 of the tapered rail, however, the thickening buttress-shaped tapered rails 280 concurrently push the enclosure 250, and thus the slots 276, slightly forward and away from the lower front wall 253 of the assembly body 10. As the enclosure 250 continues to be pushed forward, the tapered slots 276 continue to tighten about corresponding slot-engaging gussets 279, and ultimately converge with the implemented designed—for optimal location along the respective slot-engaging gussets 279 for attachment of the splash cover 245, where the desired transition fit is effected to provide a reliably secure attachment of the splash cover 245 about the front end 45 of the assembly body 10.

As a user manually applies upward force against the closed bottom 262 of the enclosure 250 of the splash cover 245 to attach the splash cover 245 about the rear end 25 of the assembly body 10, each snap 283 formed or otherwise provided within the top edge of the rear wall 256 of the enclosure 250 must freely engage the barrel 217 of any corresponding specially formed barbed quick-connect fitting 200 that is otherwise operably connected in fluid communication with an inlet port 26 at the rear end 25 of the assembly body 10. In particular, the snaps 283 must engage the operably placed barbed quick-connect fittings 200 free of interference by or with the adjacent upstream or downstream collars of the barbed quick-connect fittings 200, or by contact between the rear wall 256 of the enclosure 250 and the inlet connector retaining mechanism 150 or other feature of the fluid flow controller 5 at the rear end 25 of the assembly body 10. Accordingly, each snap 283 must engage the barrel 217 of a corresponding operably placed barbed quick-connect fitting 200 at a distance from the vertical face 31 at the rear end 25 of the assembly body 10 that is within a clear zone along the barbed quick-connect fitting 200, whereat the barbed quick-connect fitting 200 is acceptably clear of any features of the fluid flow controller 5 at the rear end 25 of the assembly body 10 as may pose risk of interference. Still further, the snaps 283 must substantially simultaneously engage the barrels 217 of the operably placed barbed quick-connect fittings 200 to ensure a desired substantially equal distribution of snapping forces among those snaps 283 engaging a corresponding one of the barbed quick-connect fittings 200, thereby minimizing any chance of damage to a barbed quick-connect fitting 200 dislodgement of a barbed quick-connect fitting 200 from operable fluid engagement with the assembly body 10. Accordingly the splash cover 245 should not twist or otherwise allow the top edge of the rear wall 256 of the enclosure 250 of the splash cover 245 to rotate out of substantially parallel alignment with the operably placed barbed quick-connect fittings 200 as the enclosure 250 is raised into place about the rear end 25 of the assembly body 10.

In accordance with the present invention, however, the enclosure 250 of the splash cover 245 is sized, shaped or otherwise configured such that optimally locating the front wall 253 of the enclosure 250 for attachment of the splash cover 245 about the front end 45 of the assembly body 10 concurrently locates the rear wall 256 of the enclosure 250 at a suitable distance from the vertical face 31 at the rear end 25 of the assembly body 10, and thus concurrently locates the snaps 283 provided along the top edge of the rear wall 256 within clear zones along and about the barbed quick-connect fittings 200, for attachment of the splash cover 245 about the rear end 25 of the assembly body 10. Engagement of the tapered slots 276, formed or otherwise provided in the front wall 253 of the enclosure 250, with the slot-engaging gussets 279, formed or otherwise provided as a feature of the assembly body 10, also concurrently establishes the required horizontal position of the splash cover 245 about the sides of the assembly body 10 for engagement about the barrels 217 of the operably connected barbed quick-connect fittings 200 by the snaps 283 provided along the top edge of the rear wall 256 of the enclosure 250. Still further, the front attachment of the enclosure 250 to the assembly body 10 operates in the manner of a frictional hinge configured to facilitate attachment of the enclosure 250 about the rear end 25 of the assembly body 10. In particular, the closed bottom 262 and rear wall 256 are hingedly constrained such that the top edge of the rear wall 256 of the enclosure 250 remains substantially parallel with the frictional hinge formed between the top edge of the front wall 253 of the enclosure 250 and the slot-engaging gussets 279 provided in implementation of the gussets 72 between the exterior, bottom side 68 of the lower guide member 64 and the lower front wall 253 of the assembly body 10. The secure toolless attachment arrangement 275 is thus configured or otherwise adapted to counter or otherwise arrest any torsional force or the like as may otherwise cause binding of the snaps 283 among the operably placed barbed quick-connect fittings 200, and any damage, degradation or other delirious effect concomitant thereto, and to ensure that the snaps 283 substantially simultaneously engage the barrels 217 of corresponding barbed quick-connect fittings 200.

Consequently, the user need only employ the very simple to use, yet consistently reliable attachment of the splash cover 245 about the front end 45 of the assembly body 10 in order to immediately, and without further concern for positioning, engage the snaps 283 with the barbed quick-connect fittings 200, and to otherwise continue to effect attachment of the splash cover 245 about the rear end 25 of the assembly body 10, all of which is readily achievable in a single continuous one-handed motion. That said, those of ordinary skill in the art will readily appreciate that fluid flow controller 5*s* for use in connection with hand-held beverage dispensers will often be attached in use to the underside of a counter or like structure, and in particular that the fluid lines for use in supplying pressurized fluids to a fluid flow controller 5, as are well-known to those of ordinary skill in the relevant arts, are typically located on a most concealed side of the fluid flow controller 5. In such a case a user of the exemplary fluid flow controller 5 may well utilize the provided finger hold 288 as an aid in attaching the splash cover 245, whereby the finger hold 288 is used to determine the location of the center line of the enclosure 250 about assembly body 10 and/or as a chosen contact interface, in lieu of the closed bottom 262 of the enclosure 250, for manual application of attachment force. In this manner, the secure toolless attachment arrangement 275 is configured or otherwise adapted for even blind affixation of the splash cover 245 about the assembly body 10 of the exemplary fluid flow controller 5.

In any case, as the user applies upward force to a rear portion of the enclosure 250, for attachment of the splash cover 245 about the rear end 25 of the assembly body 10, respective snaps 283 make contact with the barrel 217 of each operably placed barbed quick-connect fitting 200, each contacting snap 283 being aligned, spaced or otherwise positioned for simultaneous engagement with the barbed quick-connect fittings 200 as a consequence of the initial front attachment of the splash cover 245 at the front end 45 of the assembly body 10. The width of the divide across the open mouth 287 of each snap 283 is less than the cross-sectional diameter of the barrel 217 of the corresponding barbed quick-connect fitting 200, as previously described and particularly illustrated in FIGS. 59A-59B, and thus each initially contacting snap 283 is blocked by a rounded corner of each adjacent parapet 284 from further engaging the respective barrel 217. As also previously described, an optimization carried out to provide a desired characterized light snap fit about the barrel 217 of each barbed quick-connect fitting 200, while also providing a desired characterized securement for the splash cover 245, includes accounting for the malleability of the material of construction for at least the enclosure 250 of the splash cover 245. In particular, the implemented rounded corners 285 of the parapets 284, or the substantial equivalents thereof, must be sufficiently compressible, bendable and/or otherwise deformable as to enable passage of the barrel 217 of a barbed quick-connect fitting 200, or the substantially equivalent structure of an alternatively implemented fitting 200 or the like, through the open mouth 287 and into the arcuate notch 286 of a snap 283. Additionally, the rounded corners 285 of the parapets 284, or the substantial equivalents thereof, must be sufficiently resilient as to provide a reliably durable aggregate securement about the rear end 25 of the assembly body 10 for the splash cover 245. Accordingly, as the user continues to apply upward force to a rear portion of the enclosure 250, the rounded corners 285 of the parapets 284 substantially simultaneously give way to widen the divide defining the open mouths, and thereby allow the barrel 217 of each operably placed barbed quick-connect fitting 200 to pass through the open mouth 287 and be received conformingly within the arcuate notch 286 of the corresponding snap 283. Once the arcuate notches 286 are in place about the barrels 217, however, the rounded corners 285 of the parapets 284 snap back or otherwise return to their respective at-rest shapes, whereby the snaps 283 are operably engaged with the barbed quick-connect fittings 200, which are retained in place within the arcuate notches 286 by the rounded corners 285, to provide an attachment about the rear end 25 of the assembly body 10 for the splash cover 245.

Removal of the splash cover 245 to gain access to the assembly body 10 and other features of the fluid flow controller 5 broadly entails the reverse of the major steps undertaken for attachment of the splash cover 245 about the assembly body 10—particularly, manually applying a downward force to the rear wall 256 of the enclosure 250 to disengage or otherwise release the snap fits maintaining support of the splash cover 245 at the rear end 25 of the assembly body 10, and manually applying a generally downward force to the front wall 253 of the enclosure 250 to disengage or otherwise release the transition fits maintaining support of the splash cover 245 at the front end 45 of the assembly body 10. That said, the secure toolless attachment arrangement 275 is specially configured or otherwise adapted for rapid removal of the splash cover 245 from the assembly body 10 of the fluid flow controller 5, and includes various features or aspects facilitating ready removal of the splash cover 245. More particularly, the secure toolless attachment arrangement 275 is configured or otherwise adapted to effectuate rapid removal of the splash cover 245 with minimal risk of deleterious effects on either the splash cover 245 or the assembly body 10, or any barbed quick-connect fitting 200 or like connector that is operably or otherwise engaged with the splash cover 245 or the assembly body 10. Similarly, the secure toolless attachment arrangement 275 is configured or otherwise adapted to effectuate ready removal of the splash cover 245 without difficulty-physical or otherwise, and notwithstanding those features or aspects of the secure toolless attachment arrangement 275 specially configured or otherwise provided to ensure that the previously described frictional engagements are function to durably affix the splash cover 245 securely in place about the assembly body 10 while operably deployed in use.

To remove the exemplary splash cover 245 from the exemplary fluid flow controller 5, the splash cover 245 is first pulled by a user away from the rear end 25 of the assembly body 10. In particular, the user manually applies downward force to the rear wall 256 of the enclosure 250 of the splash cover 245 by engaging the transversely oriented, rearwardly projecting elongate tab 289 of the finger hold 288 specially provided at the exterior side 261 of the rear wall 256 of the enclosure 250 with, for example, a plurality of the user's fingertips. The finger hold 288, as previously generally described with reference to FIGS. 57A-57C, is provided as the only practical purchase on the enclosure 250 for use by a user to remove the splash cover 245 from operably deployment about the assembly body 10 of the exemplary fluid flow controller 5, the top edges of the full-height sidewalls 251, front wall 253 and rear wall 256, and even the top of the upwardly extending full-height portion 258 of the rear wall 256, all being rendered inaccessible by various adjacent aspects of the assembly body 10. Taking advantage of this feature of the splash cover 245, the gussets between the elongate tab 289 and the rear wall 256 of the enclosure 250, including those forming the ends 291 of the elongate tab 289, are specially arranged and otherwise provided, as particularly illustrated in FIGS. 56A and 57A, to most readily receive the three longest digits of the user's hand. As thusly naturally engaged with the finger hold 288, the user's grasp is precisely centered from side to side of the enclosure 250 and is located adjacent the barbed quick-connect fittings 200 about which the snaps 283 forming the rear attachment of the splash cover 245 are engaged. As such, the user's grasp of the enclosure 250 is intrinsically optimally located for disengagement of the top edge of the rear wall 256 of the enclosure 250, as described more fully herein, without binding with or snagging any of the barbed quick-connect fittings 200 and without regard to whether the user can see the finger hold 288 as it is engaged.

As the user manually applies downward force to the rear wall 256 of the enclosure 250 of the splash cover 245, each snap 283 provided within the top edge of the rear wall 256 is pulled in a direction that is downward and away from the barrel 217 of any corresponding specially formed barbed quick-connect fitting 200 that is otherwise operably connected in fluid communication with an inlet port 26 at the rear end 25 of the assembly body 10, and with and about which the respective snap 283 is configured to engage. As the downward force applied by the user to the rear wall 256 of the enclosure 250 increases to a substantial force, the applied force is distributed substantially evenly among the snap fits until the moderate force necessary to overcome the implement light snap fit for each engaged snap 283 is ultimately attained. Any snap fit hitherto established between a snap 283 and the respective barrel 217 of a corresponding one of the otherwise operably placed barbed quick-connect fittings 200 is the substantially simultaneously broken or otherwise released, whereby each corresponding snap 283 disengages or otherwise separates from the barrel 217 of the corresponding barbed quick-connect fitting 200 to free the castellated top edge of the rear wall 256 from attachment to the barbed quick-connect fittings 200.

Upon release of the snap fits at the rear end 25 of the assembly body 10, the substantial aggregate force applied through the rear wall 256 of the enclosure 250 works to propel the rear wall 256 downward and about the bottom side 20 of the assembly body 10. At this point the rear wall 256 and contoured closed bottom 262 of the enclosure 250 operate together in the manner of a class 2 lever arrangement, which is well known to those of ordinary skill in the relevant arts to be force multiplying in proportion to the length of the moment arm between the point of application of force and the location of resistance to the force—in this case, the rear wall 256 of the enclosure 250 and the location of the front attachment of the splash cover 245, respectively. Because the resistance maintained by the transition fit is nearly collocated with the fulcrum of the arrangement, the arrangement provides a very effective force multiplier for the residual energy from the release of the snap fits at the rear attachment of the splash cover 245. As a result, the frictional engagements of the transition fits of the front attachment are easily overcome, whereby the tapered slots 276 through the front wall 253 of the enclosure 250 readily rotate free from the slot-engaging gussets 279 provided at the front end 45 of the assembly body 10, notwithstanding the transition fits being made relatively tight in order to ensure the soundness of the front attachment. In any case, the removed splash cover 245 can then be set aside for access to the assembly body 10 and other features of the fluid flow controller 5.

Although the present invention has been described in terms of the foregoing preferred embodiments, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

What is claimed is:

1. A toolless (manually affixed) splash cover for a post-mix beverages fluid flow controller, said splash cover comprising:

an enclosure having a plurality of sides, and a substantially closed bottom; and wherein:

a first side of said enclosure includes a first plurality of frictional attachments, said first plurality of frictional attachments being configured to frictionally engage a structural feature of a post-mix beverages fluid flow controller;

the structural feature of the post-mix beverages fluid flow controller, comprising a plurality of gussets extending from the post-mix beverages fluid flow controller;

the first plurality of frictional attachments of the splash cover, comprising a plurality of tapered slots provided in the first side of the enclosure with each tapered slot being configured to receive therein one of the plurality of gussets thereby affixing the splash cover with the post-mix beverages fluid flow controller; and a second side of said enclosure includes a second plurality of frictional attachments, said second plurality of frictional attachments being configured to frictionally engage a structural feature temporarily affixed to said post-mix beverages fluid flow controller.

2. The toolless (manually affixed) splash cover for a post-mix beverages fluid flow controller of claim 1, wherein:

the structural feature temporarily affixed to the post-mix beverages fluid flow controller, comprising a multiplicity of barbed quick-connect fittings with each barbed quick-connect fitting being connectable with a fluid inlet port into the post-mix beverages fluid flow controller; and the second plurality of frictional attachments of the splash cover, comprising a plurality of snaps provided in the second side of the enclosure with each snap being configured to engage one of the multiplicity of barbed quick-connect fittings thereby affixing the splash cover with the post-mix beverages fluid flow controller.

3. The toolless (manually affixed) splash cover for a post-mix beverages fluid flow controller of claim 2, the plurality of snaps comprising a plurality of arcuate notches with each arcuate notch being configured to snap fit about a barrel of one of the multiplicity of barbed quick-connect fittings thereby affixing the splash cover with the post-mix beverages fluid flow controller.

4. A fluid flow controller, comprising:

an assembly body, comprising:

a multiplicity of discrete fluid flow paths with each discrete fluid flow path being between a single provided fluid inlet port into the assembly body and a single provided outlet port from the assembly body, and a multiplicity of flow rate controller and shutoff valve pairs with each flow rate controller and shutoff valve pair being disposed within each discrete fluid flow path; and a splash cover, comprising an enclosure having a plurality of sides, and a substantially closed bottom, wherein:

a first side of the enclosure includes a first plurality of frictional attachments, the first plurality of frictional attachments being configured to frictionally engage a structural feature of the assembly body, the structural feature of the assembly body, comprising a plurality of gussets extending from the assembly body, the first plurality of frictional attachments of the splash cover, comprising a plurality of tapered slots provided in the first side of the enclosure with each tapered slot being configured to receive therein one of the plurality of gussets thereby affixing the splash cover with the assembly body, and a second side of the enclosure includes a second plurality of frictional attachments, the second plurality of frictional attachments being configured to frictionally engage a structural feature temporarily affixed to the assembly body.

5. The fluid flow controller of claim 4, wherein:

the structural feature temporarily affixed to the assembly body, comprising a multiplicity of barbed quick-connect fittings with each barbed quick-connect fitting being connectable with one of the fluid inlet ports into the assembly body; and the second plurality of frictional attachments of the splash cover, comprising a plurality of snaps provided in the second side of the enclosure with each snap being configured to engage one of the multiplicity of barbed quick-connect fittings thereby affixing the splash cover with the assembly body.

6. The fluid flow controller of claim 5, wherein the plurality of snaps comprise a plurality of arcuate notches with each arcuate notch being configured to snap fit about a barrel of one of the multiplicity of barbed quick-connect fittings thereby affixing the splash cover with the assembly body.

7. A fluid flow controller, comprising:

an assembly body, comprising:

a multiplicity of discrete fluid flow paths with each discrete fluid flow path being between a single provided fluid inlet port into the assembly body and a single provided outlet port from the assembly body, a multiplicity of flow rate controller and shutoff valve pairs with each flow rate controller and shutoff valve pair being disposed within each discrete fluid flow path, and a multiplicity of linear guides with each linear guide being formed about each fluid inlet port into the assembly body, wherein each linear guide comprises sidewalls defining a vertical channel of the linear guide; and a multiplicity of L-shaped clips with each L-shaped clip being insertable into each linear guide, whereby each L-shaped clip is configured to receive therethrough a barbed quick-connect fitting that inserts within one of the fluid inlet ports into the assembly body, further whereby each L-shaped clip is configured to engage the barbed quick-connect fitting, thereby installing a barbed quick connect fitting within each of the inlet ports into the assembly body, wherein each L-shaped clip comprises a slotted aperture including a through hole configured to receive therethrough a male quick-connector of a barbed quick-connect fitting and an intersecting through hole configured to snap fit about a barrel of the barbed quick-connect fitting.

8. The fluid flow controller of claim 7, wherein a barbed quick-connect fitting at the male quick-connector thereof passes through each through hole of the L-shaped clips and inserts within one of the fluid inlet ports into the assembly body, further whereby each intersecting through hole of the L-shaped clips snap fits about the barrel of the barbed quick-connect fitting, thereby installing a barbed quick connect fitting within each of the inlet ports into the assembly body.

9. The fluid flow controller of claim 7, wherein each linear guide includes slots formed therein.

10. The fluid flow controller of claim 9, comprising a wire rod, whereby, after each linear guide is populated with one of the L-shaped clips, the wire rod secures within the slots thereby affixing the L-shaped clips within the linear guides.

11. The fluid flow controller of claim 10, comprising a retaining plate configured to seat atop the assembly body whereby the retaining plate maintains the shutoff valves within the assembly body, further whereby the retaining plate includes an extension that projects the retaining plate from the assembly body over the wire rod thereby retaining the wire rod within the slots.

* * * * *